United States Patent
Helmbrecht et al.

(10) Patent No.: US 7,120,632 B2
(45) Date of Patent: Oct. 10, 2006

(54) METHODS AND SYSTEMS FOR MANAGING BUSINESS INFORMATION ON A WEB SITE

(75) Inventors: Paul Kurits Helmbrecht, Elmhurst, IL (US); Barbara Kathleen Lippi, Chicago, IL (US)

(73) Assignee: General Electric Capital Corporation, Stamford, CT (US)

( * ) Notice: Subject to any disclaimer, the term of this patent is extended or adjusted under 35 U.S.C. 154(b) by 317 days.

(21) Appl. No.: 10/071,474

(22) Filed: Feb. 6, 2002

(65) Prior Publication Data

US 2003/0149707 A1    Aug. 7, 2003

(51) Int. Cl.
*G06F 17/30*    (2006.01)

(52) U.S. Cl. .............................. 707/8; 707/10; 707/200; 709/229

(58) Field of Classification Search ................... 707/10, 707/102, 103, 104, 4, 8; 709/229, 237, 203
See application file for complete search history.

(56) References Cited

U.S. PATENT DOCUMENTS

| | | | |
|---|---|---|---|
| 5,860,073 A | 1/1999 | Ferrel et al. | |
| 5,911,145 A | 6/1999 | Arora et al. | |
| 5,940,822 A | 8/1999 | Haderle et al. | |
| 6,199,082 B1 | 3/2001 | Ferrel et al. | |
| 6,230,173 B1 | 5/2001 | Ferrel et al. | |
| 6,304,886 B1 | 10/2001 | Bernardo et al. | |
| 6,308,188 B1 | 10/2001 | Bernardo et al. | |
| 6,314,425 B1 | 11/2001 | Serbinis et al. | |
| 6,496,827 B1* | 12/2002 | Kozam et al. ................. 707/10 |
| 2001/0034743 A1 | 10/2001 | Thomas | |
| 2001/0034765 A1 | 10/2001 | Bimson et al. | |
| 2003/0069983 A1* | 4/2003 | Mukund ..................... 709/229 |
| 2003/0074354 A1* | 4/2003 | Lee et al. ...................... 707/8 |

\* cited by examiner

*Primary Examiner*—Charles Rones
*Assistant Examiner*—Belix M. Ortiz
(74) *Attorney, Agent, or Firm*—Armstrong Teasdale LLP

(57) ABSTRACT

A method for managing information on a web site for a business entity using a server system is provided. The server system is coupled to a centralized database and at least one client system. The method includes storing information in the centralized database, and changing the centralized database such that duplicative information displayed on more than one web page within the business entity web site is changed on each respective web page configured to display the information.

41 Claims, 40 Drawing Sheets

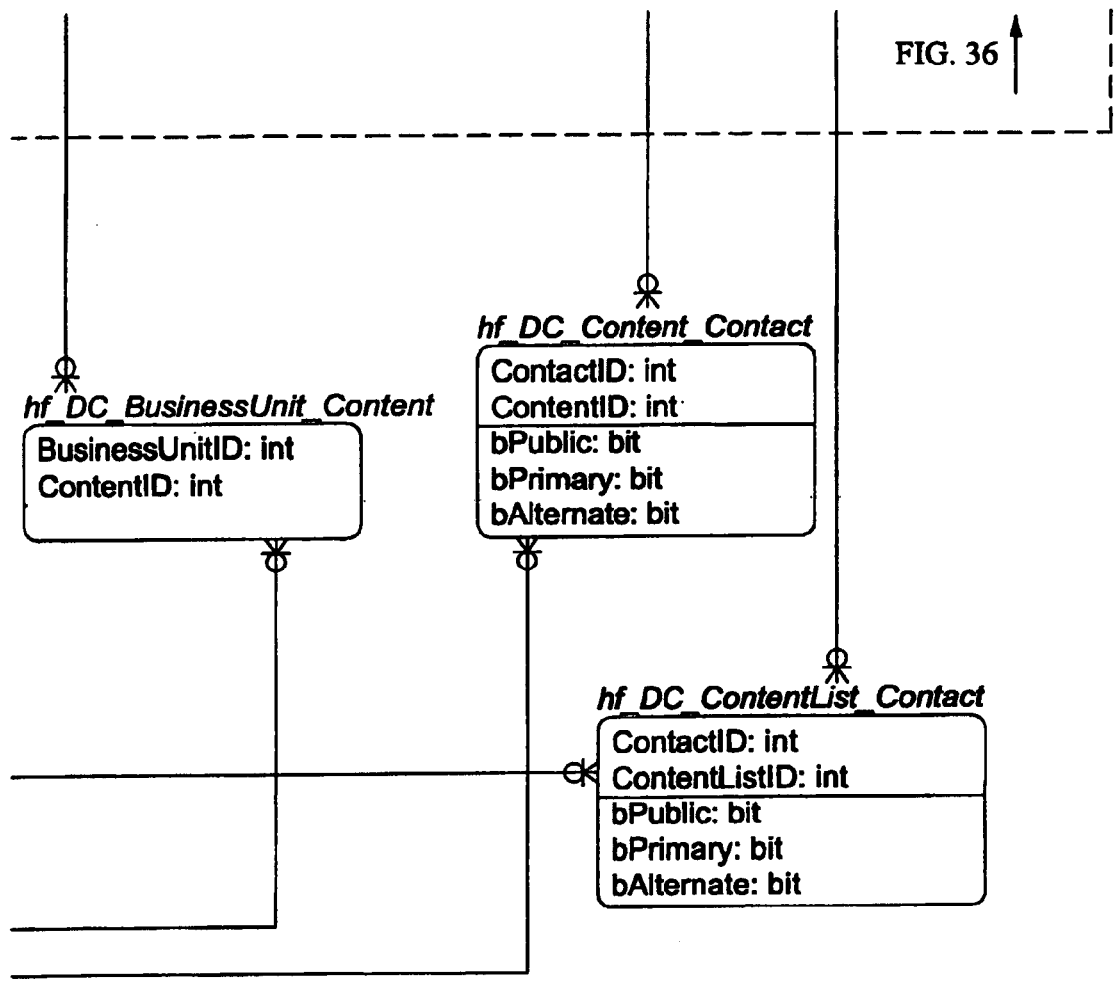
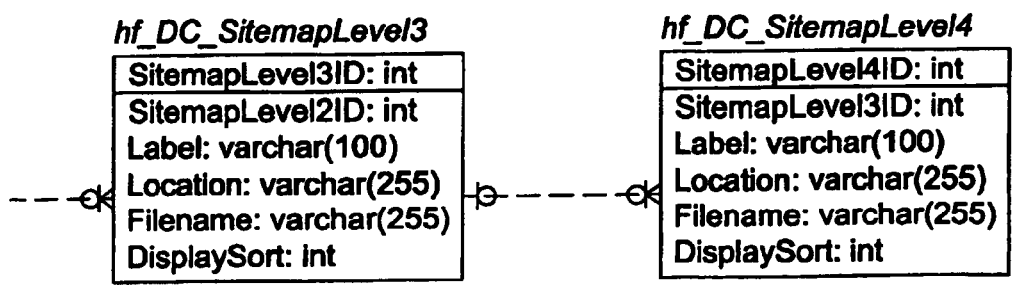
FIG. 37A
FIG. 37B

METHODS AND SYSTEMS FOR MANAGING BUSINESS INFORMATION ON A WEB SITE

BACKGROUND OF THE INVENTION

This invention relates generally to managing business information and, more particularly, to network-based methods and systems for managing business information on a web site.

At least some known web sites include multiple web pages that can be accessed via the Internet. Information displayed on at least one web page within a web site may also be displayed on other web pages within the same web site, and is oftentimes referred to as "re-purposed" information. For example, a business entity may have a web site that includes a description of its various business groups. When a user accesses the business entity's web site, the user may select a business group within the business entity to view a description of the selected business group. A description of the selected business group, however, may appear on more than one web page within the business entity's web site. Since the description of the selected business group appears on multiple web pages within the web site, the business description may be considered re-purposed (i.e., appearing on various web pages for different purposes) information.

Business entities routinely have to manage the information that appears on their web sites, including adding new information, updating existing information, and deleting old information. Information that requires updating sometimes is referred to as "dynamic" information. Typically, when a business entity manages re-purposed, dynamic information on its web site, the business entity must add, update, and delete information on each of the multiple web pages where the dynamic information appears. Accordingly, managing re-purposed, dynamic information may be very costly and time consuming. Moreover, because managing re-purposed, dynamic information requires multiple data entry, the likelihood of incorrect or inconsistent information appearing on different web pages within a business entity's web site is increased.

BRIEF DESCRIPTION OF THE INVENTION

In one aspect, a method for managing information on a web site for a business entity using a server system is provided. The server system is coupled to a centralized database and at least one client system. The method includes storing information in the centralized database, and changing the centralized database such that duplicative information displayed on more than one web page within the business entity web site is changed on each respective web page configured to display the information.

In another aspect, a method for managing business information on a web site for a business entity using a server system is provided. The sever system is coupled to a centralized database and at least one client system. The business information includes at least one of products and services, news, earnings releases, press releases, newsletters, papers, presentations, articles, perspectives, success stories, contact information, expertise, locations, net links, frequently asked questions, and industries served by the business entity. The method includes receiving business information through the client system, validating the business information, storing the validated business information in the centralized database, and changing the centralized database such that duplicative business information displayed on each respective web page within the business entity web site is updated with the validated business information.

In another aspect, a network based system for managing business information on a web site for a business entity is provided. The system includes a client system with a browser, a centralized database for storing information, and a server system configured to be coupled to the client system and the database. The server system is further configured to store business information in the centralized database, and change the centralized database such that duplicative business information displayed on more than one web page within the business entity web site is changed on each respective web page configured to display business information.

In another aspect, a network based system for managing, storing, and disseminating business information on a web site for a business entity is provided. The business information includes at least one of products and services, news, earnings releases, press releases, newsletters, papers, presentations, articles, perspectives, success stories, contact information, expertise, locations, net links, frequently asked questions, and industries served by said business entity. The system includes a client system having an external browser, an internal browser, and a content management tool. The system also includes a centralized database for storing information connected to the content management tool, and a server system having a staging site in communication with an administrative site. The server system is configured such that the staging site and the administrative site communicate with the client system through the internal browser, and the administrative site communicates with the database. The server system is further configured to receive business information from the client system, store business information in the centralized database, and change the centralized database by accessing the content management tool such that duplicative business information displayed on more than one web page within the business entity web site is changed on each respective web page configured to display business information.

In another aspect, a database for storing information used on a web site for a business entity is provided. The database includes a receiving component for receiving information including at least one of adding new information, updating existing information, and deleting existing information. The database also includes a storing component for storing information in the database, a linking component for linking duplicative information displayed on more than one web page within the business entity web site, and a changing component for changing linked information when new information is received such that linked information displayed on more than one web page within the business entity web site is changed on each respective web page configured to display the information.

In another aspect, a computer program embodied on a computer readable medium for managing business information on a web site for a business entity is provided. The business information including at least one of products and services, news, earnings releases, press releases, newsletters, papers, presentations, articles, perspectives, success stories, contact information, expertise, locations, net links, frequently asked questions, and industries served by the business entity. The program includes a code segment that receives business information and then maintains a database by adding, deleting and updating the business information, provides users with access to the business information, and compiles a report that includes at least one of information relating to products and services offered by the business entity, information relating to the business entity, information relating to a contact person within each business group in the business entity, and information relating to at least one of the business entity's expertise, worldwide presence, recommended Internet links, frequently asked questions, and industries served. The code segment also receives business information through the client system, validates business information received through the client system, stores the business information in the centralized database, and changes the centralized database such that duplicative business information displayed on more than one web page within the business entity web site is changed on each respective web page configured to display the validated business information.

BRIEF DESCRIPTION OF THE DRAWINGS

FIG. 8 is an example embodiment of a user interface of a WCMS displaying a home page for inputting information relating to products and services offered by a business entity.

FIG. 15 is an example embodiment of a user interface of a WCMS displaying a home page for inputting information relating to a business entity.

FIG. 16 is an example embodiment of a lower portion of a user interface of a WCMS illustrating a page for displaying and inputting source information for a business entity.

FIG. 27 is an example embodiment of a lower portion of a user interface of a WCMS illustrating a page for displaying and inputting address and telephone information relating to a contact person within a business entity.

FIG. 34 is an example embodiment of a user interface of a WCMS displaying a home page for inputting industry served information for a business entity.

FIGS. 37A and 37B illustrate a third portion of an example embodiment of at least one data specification chart for a WMCS.

DETAILED DESCRIPTION OF THE INVENTION

Figure 1:
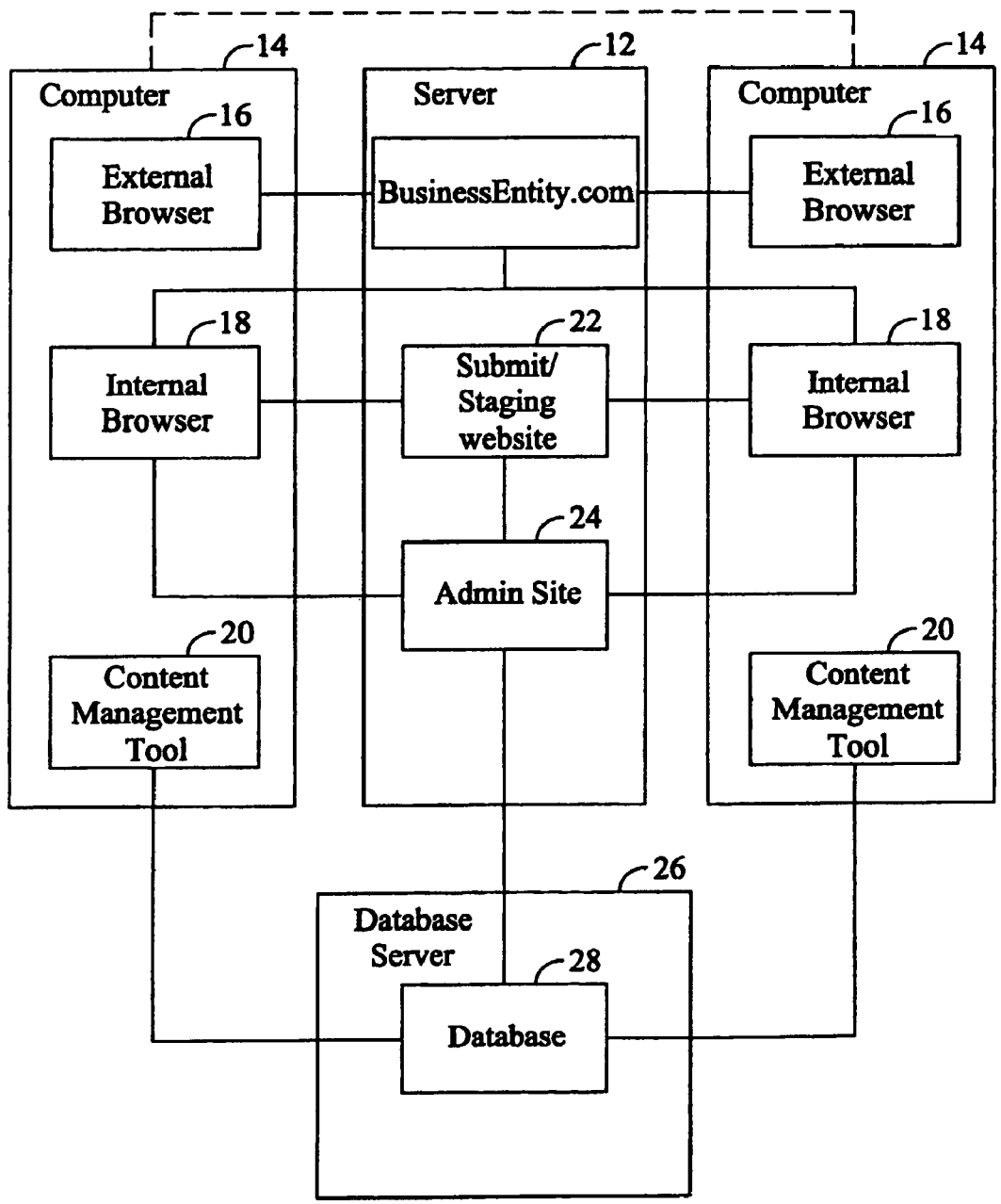
FIG. 1 is a simplified block diagram of one embodiment of a Web Content Management System (WCMS).

Example embodiments of systems and processes that facilitate integrated network-based electronic reporting and workflow process management related to a Web Content Management System (WCMS) are described below in detail. The systems and processes facilitate, for example, electronic submission of information using a client system, automated extraction of information, and web-based reporting for internal and external system users. The WCMS permits a business entity to manage and display information on a web site for a business entity to assure that the information displayed on the web site is correct and consistent throughout the web site.

In the example embodiment, the WCMS is utilized to collect, track, display, and disseminate real time business information relating to a business entity on a web site. The business information includes at least one of products and services, news, earnings releases, press releases, newsletters, papers, presentations, articles, perspectives, success stories, contact information, expertise, locations, net links, frequently asked questions, and industries served by the business entity. In addition, the WCMS enables a user to manage dynamic and re-purposed business information displayed on a business entity's web site. More specifically, the WCMS enables a user to add, update, and delete, dynamic and re-purposed business information from a single location on a single workstation. In other words, the WCMS enables a user to add, update, and delete business information that may be displayed on multiple web pages within a web site by only entering data at a single location on a single workstation, thus facilitating reducing multiple data entry on multiple web pages. Finally, the WCMS enables a user to validate the business information added, updated, and deleted on a business entity's web site prior to adding, updating, and deleting the selected business information.

Business information relating to a business entity is received by the WCMS which stores the business information in a database, updates the database with business information received, tracks the business information received, validates the business information received, and provides business information in response to an inquiry.

In the WCMS, the business information is stored in the database, and accordingly, a user must be authorized to gain access into the WCMS. In the example embodiment, the user must log onto the WCMS before accessing the WCMS home page. Once the home page is accessed, the user chooses from a list of business groups within the business entity that the user has been given access to manage, and then the user chooses from a list of content types that correspond to the selected business group. After selecting a content type, the authorized user is permitted to manage the information, including adding, updating, and deleting information for the selected business group and content type.

In one embodiment, a computer program is provided, and the program is embodied on a computer readable medium and utilizes a Structured Query Language (SQL) with a client user interface front-end for administration, and a web interface for standard user input and reports. In an example embodiment, the system is web-enabled and is operable through a business-entity intranet. In yet another embodiment, the system is fully accessed by individuals having an authorized access outside the firewall of the business-entity through the Internet. In a further example embodiment, the system is operated in a Windows® NT environment (Windows is a registered trademark of Microsoft Corporation, Redmond, Wash.).

The systems and processes are not limited to the specific embodiments described herein. In addition, components of each system and each process can be practiced independent and separate from other components and processes described herein. Each component and process also can be used in combination with other assembly packages and processes.

FIG. 1 is a simplified block diagram of a Web Content Management System (WCMS) 10 including a server system 12, and a plurality of client sub-systems, also referred to as client systems 14, connected to server system 12. In an example embodiment, client systems 14 are computers including an external browser 16, an internal browser 18, and a content management tool 20 such that server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment.

In the example embodiment, server system 12, which is also connected to the Internet, includes a submit/staging website 22 and an administrative site 24. Submit/staging website 22 is interconnected with internal browser 18 and administrative site 24. A database server 26 is connected to a database 28 containing information on a variety of matters, as described below in greater detail. Database 28 is interconnected with administrative site 24. In the example embodiment, content management tool 20 is configured on client system 14 such that content management tool 20 interacts directly with database 28 but is restricted from interacting directly with the Internet. In one embodiment, centralized database 28 is stored on server system 12 and can be accessed by potential users at one of client systems 14 by logging onto server system 12 through one of client systems 14. In an alternative embodiment database 28 is stored remotely from server system 12 and may be non-centralized.

Figure 2:
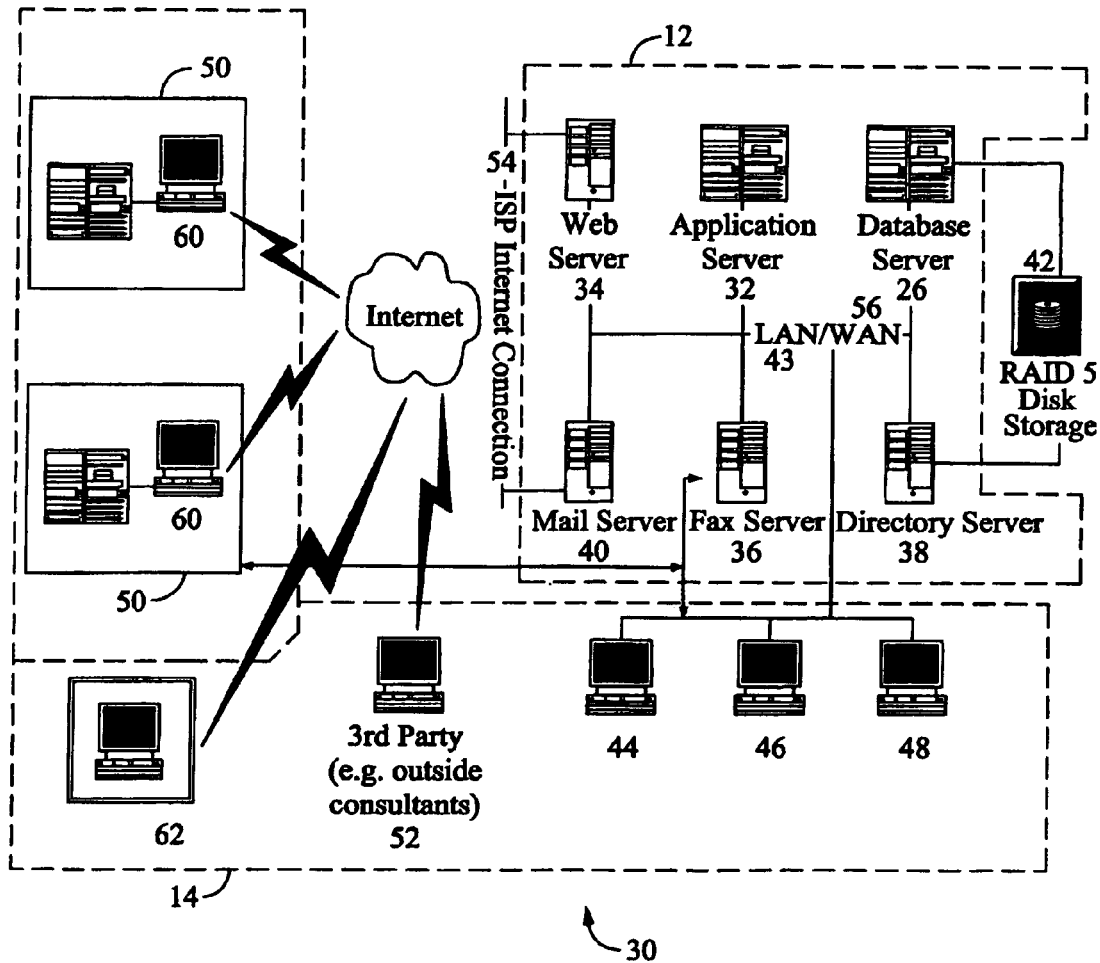
FIG. 2 is an expanded version block diagram of an example embodiment of a server architecture of the WCMS.

FIG. 2 is an expanded block diagram of an example embodiment of a server architecture of a WCMS 30. Components in system 30, identical to components of system 10 (shown in FIG. 1), are identified in FIG. 2 using the same reference numerals as used in FIG. 1. System 30 includes server system 12 and client systems 14. Server system 12 further includes database server 26, an application server 32, a web server 34, a fax server 36, a directory server 38, and a mail server 40. A disk storage unit 42 is coupled to database server 26 and directory server 38. Servers 26, 32, 34, 36, 38, and 40 are coupled in a local area network (LAN) 43. In addition, a system administrator's workstation 44, a user workstation 46, and a supervisor's workstation 48 are coupled to LAN 43. Alternatively, workstations 44, 46, and 48 are coupled to LAN 43 via an Internet link or are connected through an Intranet.

Each workstation, 44, 46, and 48 is a personal computer having a web browser. Although the functions performed at the workstations typically are illustrated as being performed at respective workstations 44, 46, and 48, such functions can be performed at one of many personal computers coupled to LAN 43. Workstations 44, 46, and 48 are illustrated as being associated with separate functions only to facilitate an understanding of the different types of functions that can be performed by individuals having access to LAN 43. In an exemplary embodiment, client system 14 includes workstation 46 which can be used by a user for the business entity to manage business information on WCMS 30.

Server system 12 is configured to be communicatively coupled to various individuals, including employees 50 and to third parties, e.g., outside consultants, 52 via an ISP Internet connection 54. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than WAN 56, local area network 43 could be used in place of WAN 56.

In the example embodiment, any authorized individual having a workstation 60 can access WCMS 30. At least one of the client systems includes a manager workstation 62 located at a remote location. Workstations 60 and 62 are personal computers having a web browser. Also, workstations 60 and 62 are configured to communicate with server system 12. Furthermore, fax server 36 communicates with remotely located client systems, including a client system 62 via a telephone link. Fax server 36 is configured to communicate with other client systems 44, 46, and 48 as well.

Figure 3:
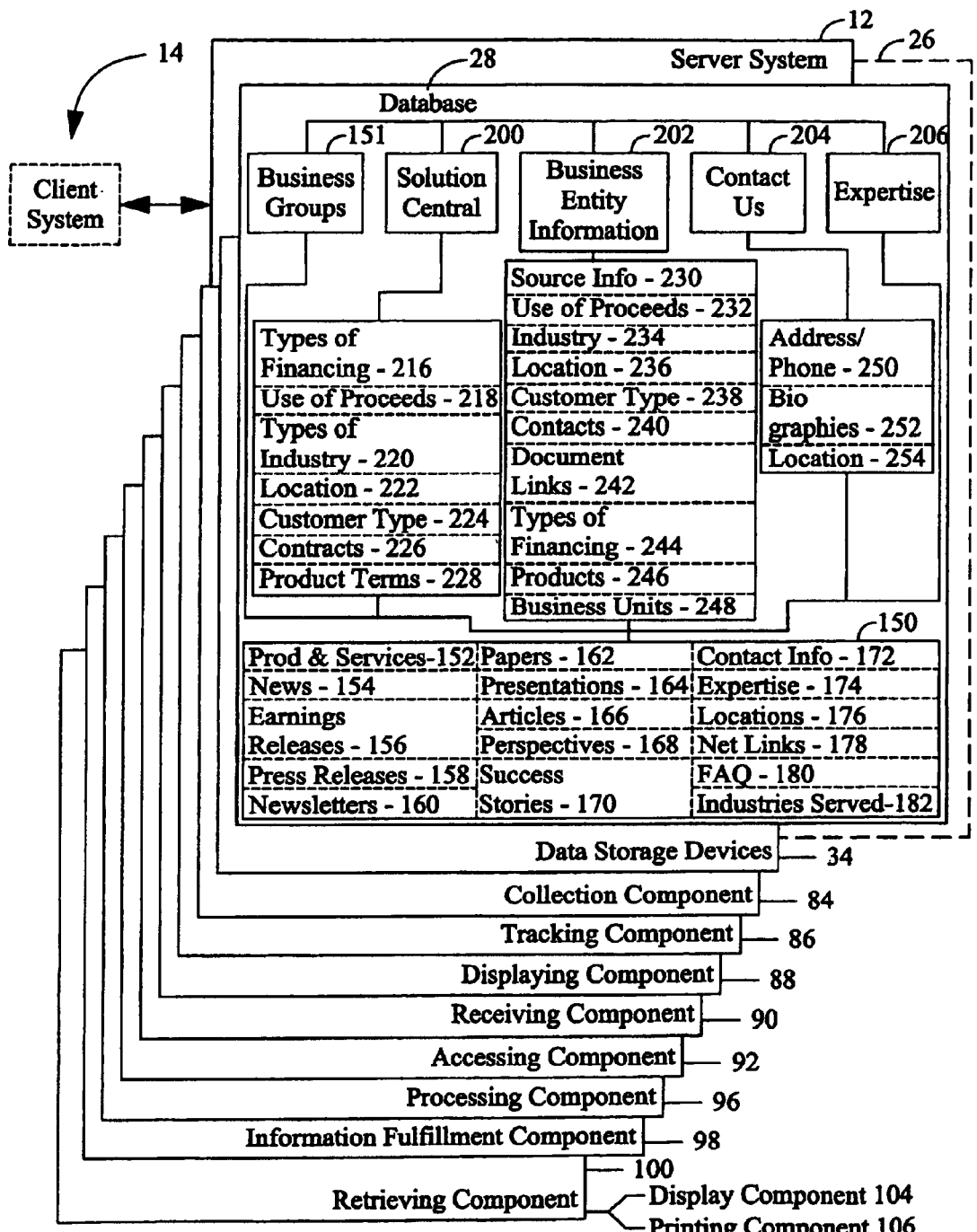
FIG. 3 illustrates an example configuration of a portion of a database within the database server of the server system including other related server components.
Figure 4:
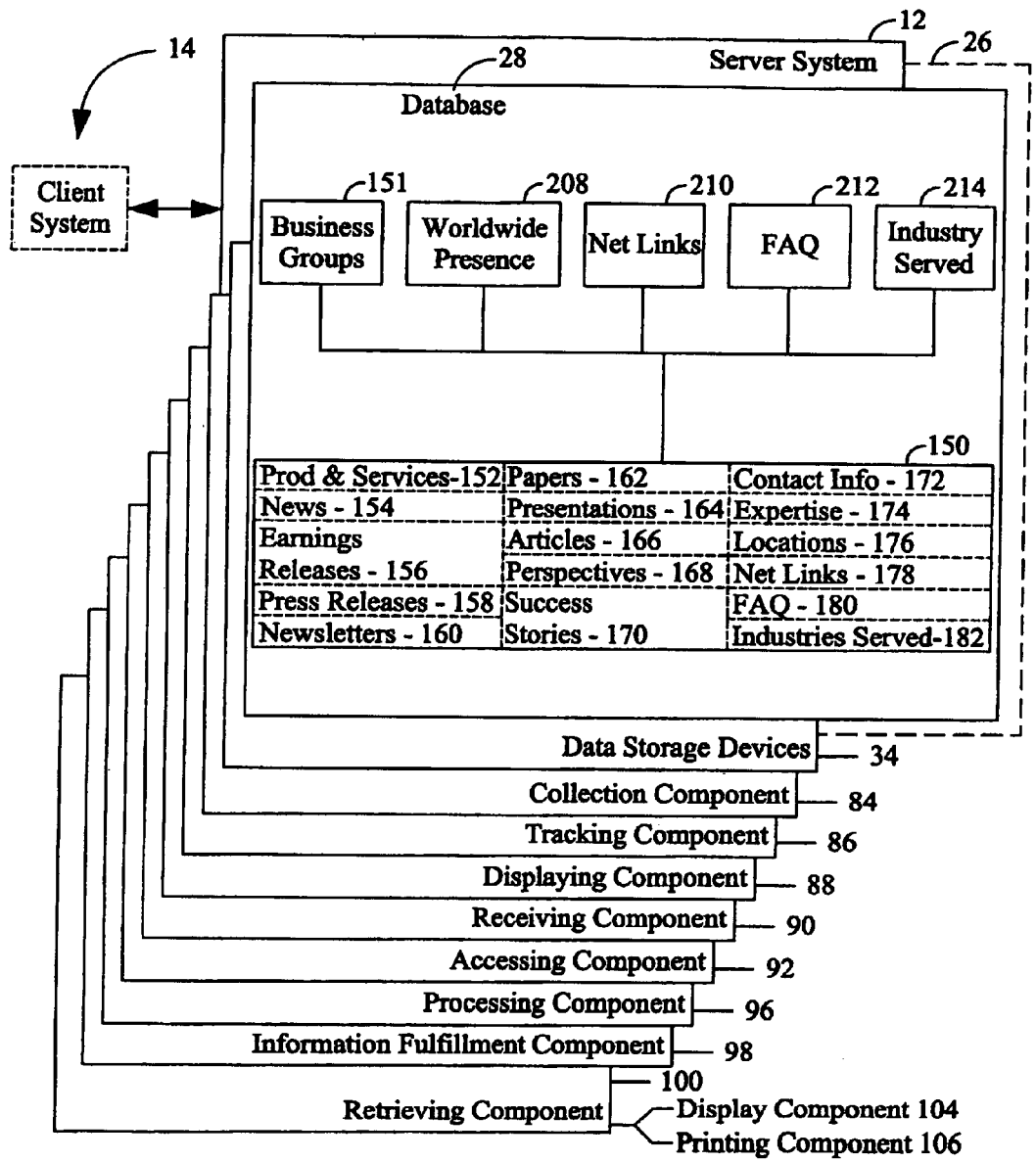
FIG. 4 illustrates an example configuration of another portion of the database shown in FIG. 3 including the other related server components.

FIGS. 3 and 4 illustrate an example configuration of database 28 within database server 26 of server system 12 shown in FIG. 1. Database 28 is coupled to several separate computer software components within server system 12 which perform specific tasks. In the example embodiment, server system 12 includes a collection component 84 for collecting data from users in database 28, a tracking component 86 for tracking data, and a displaying component 88 to display information. Tracking component 86 tracks and cross-references data, including modifying existing data on multiple web pages within the business entity's web site.

Server system 12 also includes a receiving component 90 to receive a specific query from client system 14, and an accessing component 92 to access database 28 within data storage device 42 (shown in FIG. 2). Receiving component 90 is programmed to receive a query from one of a plurality of users. Server system 12 further includes a processing component 96 for searching and processing received queries against database 28 containing a variety of information collected by collection component 84. An information fulfillment component 98, located in server system 12, enables the requested information to be downloaded to the plurality of users in response to the requests received by receiving component 90. Information fulfillment component 98 downloads the information after the information is retrieved from database 28 by a retrieving component 100. Retrieving component 100 retrieves, downloads and sends information to client system 14 based on a query received from client system 14.

Retrieving component 100 also includes a display component 104 that is configured to download information to be displayed on a client system's graphical user interface and a printing component 106 that is configured to print information. Retrieving component 100 generates reports requested by the user through client system 14 in a pre-determined format. System 10 is flexible to provide other alternative types of reports and is not constrained to the options set forth above.

In one embodiment, collection component 84, tracking component 86, displaying component 88, receiving component 90, processing component 96, information fulfillment component 98, retrieving component 100, display component 104, and printing component 106 are computer programs embodied on computer readable medium.

Database 28 stores business information 150 for each business group 151 within a business entity. Business information 150 includes at least one of products and services 152, news 154, earnings releases 156, press releases 158, newsletters 160, papers 162, presentations 164, articles 166, perspectives 168, success stories 170, contact information 172, expertise 174, locations 176, net links 178, frequently asked questions 180, and industries served 182 by the business entity.

Database 28 is divided into at least one of a Solution Central Section 200, a Business Entity Information Section 202, a Contact Us Section 204, an Expertise Section 206, a Worldwide Presence Section 208, a Net Links Section 210, a Frequently Asked Questions (FAQ) Section 212, and an Industry Served Section 214.

Solution Central Section 200 enables a user to input business information 150 for each business group within the business entity into WCMS 10 (shown in FIG. 1). More specifically, Solution Central Section 200 enables the user to input into WCMS 10 information relating to products and services 152 offered by the business entity. In the exemplary embodiment, to facilitate searching and data input, Solution Central Section 200 is sub-divided into at least one of Types of Financing Section 216, a Use of Proceeds Section 218, a Types of Industry Section 220, a Location Section 222, a Customer Type Section 224, a Contacts Section 226, and a Product Terms Section 228.

Business Entity Information Section 202 enables the user to manage business information 150 for each business group within the business entity included in WCMS 10 (shown in FIG. 1). More specifically, Business Entity Information Section 202 enables the user to add, update, and delete business information 150 relating to at least one of news 154, earnings releases 156, press releases 158, newsletters 160, papers 162, presentations 164, articles 166, perspectives 168, and success stories 170 relating to the business entity. In the exemplary embodiment, to facilitate managing business information, Business Entity Information Section 202 is sub-divided into at least one of a Source Info Section 230, a Use of Proceeds Section 232, an Industry Section 234, a Location Section 236, a Customer Type Section 238, a Contacts Section 240, a Document Links Section 242, a Types of Financing Section 244, a Products Section 246, and a Business Units Section 248.

Contact Us Section 204 enables a user to manage business information 150 for each business group within the business entity that is included in WCMS 10 (shown in FIG. 1). More specifically, Contact Us Section 204 enables the user to add, update, and delete business information 150 relating to contact information 172 for the business entity. In the example embodiment, to facilitate managing contact information, Contact Us Section 204 is sub-divided into at least one of a Address/Phone Section 250, a Biographies Section 252, and a Location Section 254.

Expertise Section 206 enables a user to manage business information 150 for each business group within the business entity that is included in WCMS 10 (shown in FIG. 1). More specifically, Expertise Section 206 enables the user to add, update, and delete business information 150 relating to expertise 174 within the business entity.

Worldwide Presence Section 208 enables a user to manage business information 150 for each business group within the business entity that is included in WCMS 10 (shown in FIG. 1). More specifically, Worldwide Presence Section 208 enables the user to add, update, and delete business information 150 relating to locations 176 of the business entity.

Net Links Section 210 enables a user to manage business information 150 for each business group within the business entity that is included in WCMS 10 (shown in FIG. 1). More specifically, Net Links Section 210 enables the user to add, update, and delete business information 150 relating to net links 178 that may be helpful to a user or customer of the business entity.

FAQ Section 212 enables a user to manage business information 150 for each business group within the business entity that is included in WCMS 10 (shown in FIG. 1). More specifically, FAQ Section 212 enables the user to add, update, and delete business information 150 relating to frequently asked questions (FAQ) 180 that are asked of the business entity by other users or customers.

Industry Served Section 214 enables a user to manage business information 150 for each business group within the business entity that is included in WCMS 10 (shown in FIG. 1). More specifically, Industry Served Section 214 enables the user to add, update, and delete business information 150 relating to industries served 182 by the business entity.

In at least one embodiment, business information 150 that is stored on database 28 may include re-purposed and dynamic information. WCMS 10 is configured to link re-purposed and dynamic information when it is stored in database 28. Database 28 therefore receives business information 150, including re-purposed and dynamic information, and stores business information 150 thereon. Database 28 then links the information that is duplicated on more than one web page within the web site. Accordingly, when new business information is received by WCMS 10, database 28 changes business information 150 stored thereon such that the linked information is changed on each respective web page configured to display business information 150.

System 10 accumulates a variety of confidential data and has different access levels to control and monitor the security of and access to system 10. Authorization for access is assigned by system administrators on a need to know basis. In one embodiment, access is provided based on job functions. In yet another embodiment, system 10 provides access based on business-entity. The administration/editing capabilities within system 10 are also restricted to ensure that only authorized individuals have access to modify or edit the data existing in the system. System 10 manages and controls access to system data and information.

The architecture of system 10 as well as various components of system 10 are examples only. Other architectures are possible and can be utilized in connection with practicing the processes described below.

Figure 5:
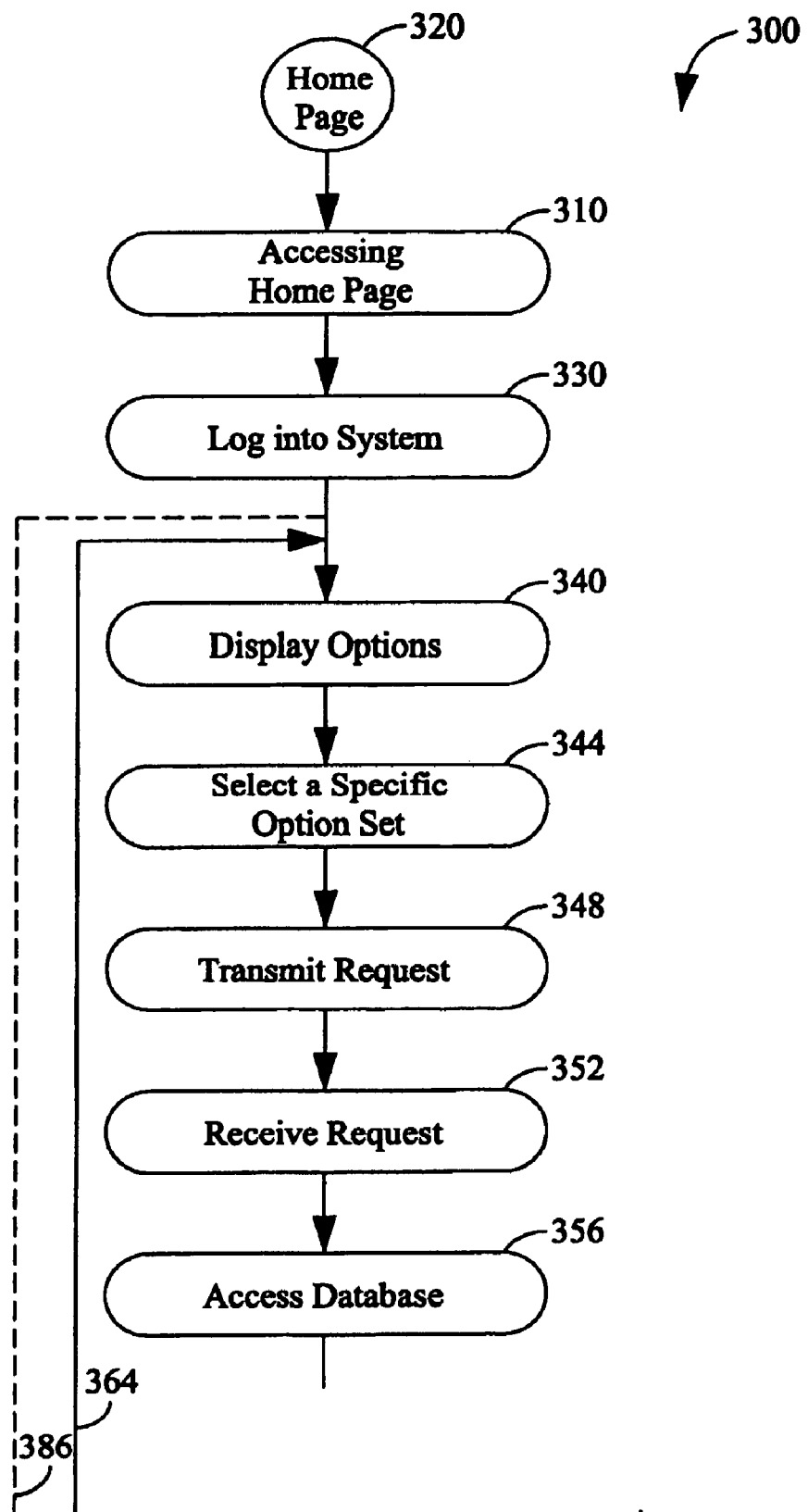
FIG. 5 is a first portion of a flowchart illustrating an example processes utilized by a WCMS.
Figure 6:
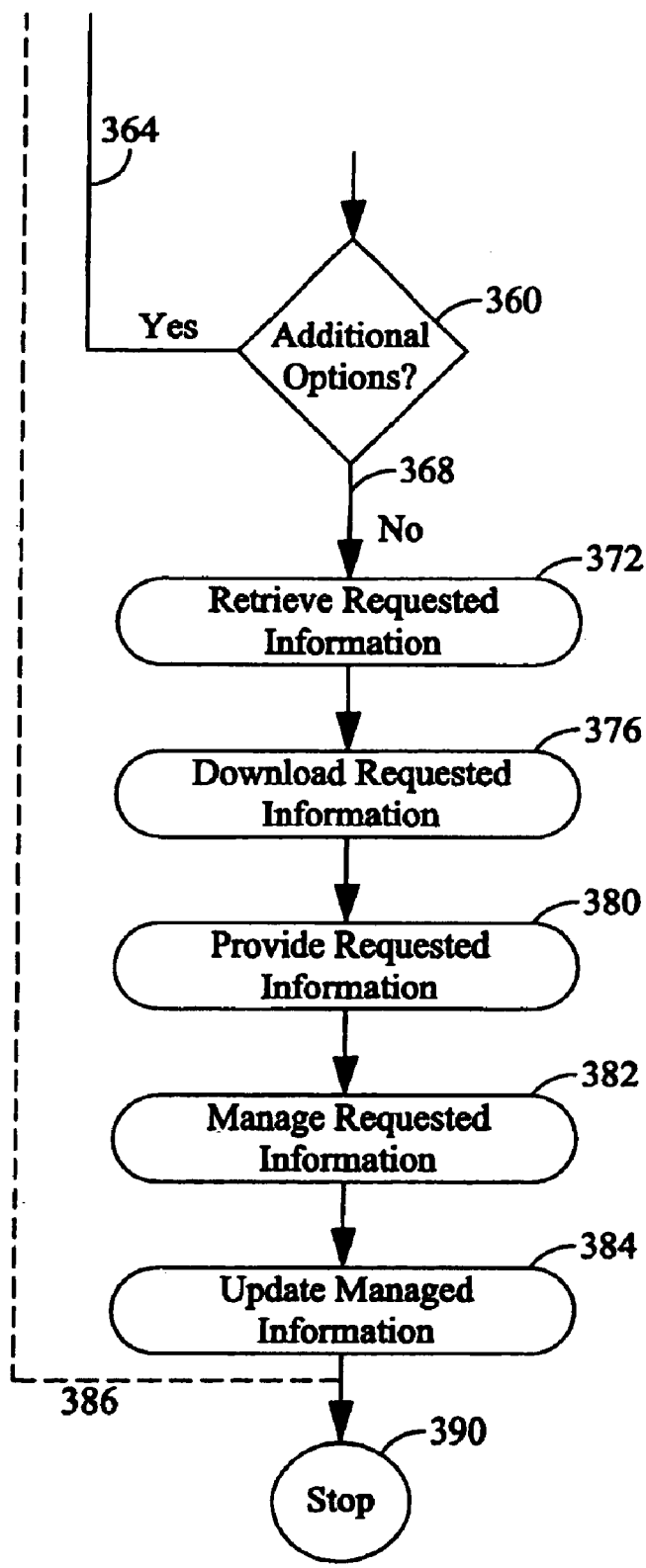
FIG. 6 is a second portion of a flowchart illustrating the example processes utilized by WCMS as shown in FIG. 5.

FIGS. 5 and 6 illustrate a flowchart 300 for example processes executed by system 10. Initially, a user accesses 310 a user interface, such as a home page 320, of a web site through client system 14 (shown in FIG. 1). In one embodiment, client system 14, as well as server system 12, are protected from access by unauthorized individuals. The user logs-in 330 to system 10 using a password (not shown) or an employee payroll number for security. In the example embodiment, a user must be authorized to access system 10 and must be authorized to access designated business groups 151 (shown in FIGS. 3 and 4) within system 10.

Client system 14 displays 340 options available to the user through links, check boxes, or pull-down lists. Once the user selects 344 an option (in one embodiment, relating to business group 151 within the business entity) from the available links, the request is transmitted 348 to server system 12. Transmitting 348 the request is accomplished, in one embodiment, either by click of a mouse or by a voice command. Once server system 12 (shown in FIG. 1) receives 352 the request, server system 12 accesses 356 database 28 (shown in FIG. 1). System 10 determines 360 if additional narrowing options are available. In one embodiment, additional narrowing options include various topics included in business information 150 (shown in FIGS. 3 and 4). If additional narrowing options are available 364, system 10 displays 340 the options relating to the prior option selected by the user on client system 14. The user selects 344 the desired option and transmits the request 348. Server system 12 receives the request 352 and accesses 356 database 28. When system 10 determines that additional options 360 are not available 368, system 10 retrieves 372 requested information from database 28. The requested information is downloaded 376 and provided 380 to client system 14 from server 12. System 10 then enables the user through client system 14 to manage the requested information 382, which includes at least one of adding, updating, and deleting the requested information stored on database 28. After validating the managed information, system 10 then updates the managed information 384 on database 28 such that the managed information is managed throughout system 10. The user may continue to search 386 database 28 for other information or exit 390 from system 10.

Figure 7:
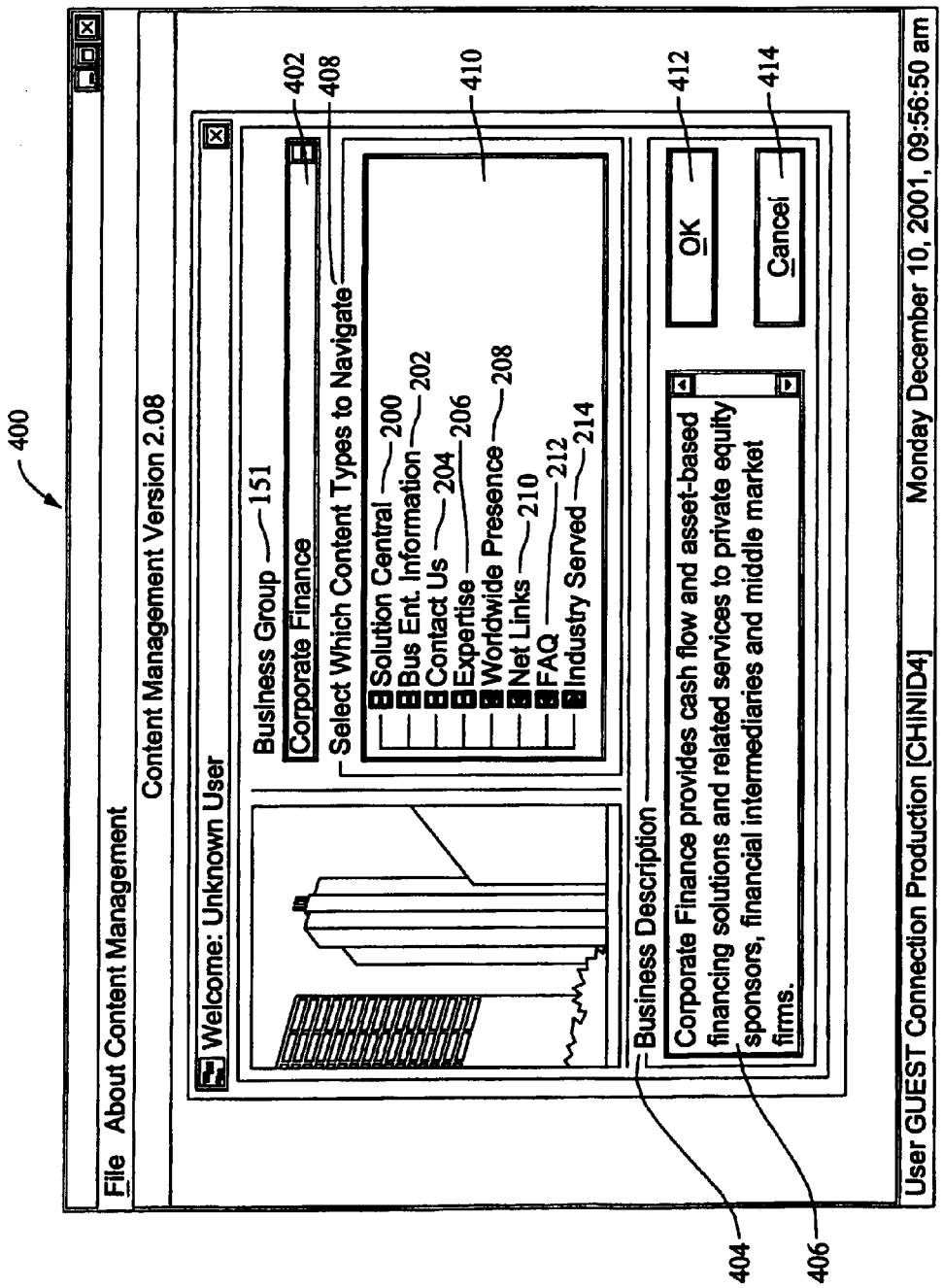
FIG. 7 is an example embodiment of a user interface displaying a home page of a WCMS.

FIG. 7 is an example embodiment of a user interface 400 displaying a home page of WCMS 10 (shown in FIG. 1) after a user has logged onto WCMS 10. Items shown on user interface 400 that are identical to items shown in FIGS. 3 and 4 are identified on FIG. 7 using the same reference numerals as used in FIGS. 3 and 4. User interface 400 welcomes the user to WCMS 10 and prompts the user to input business group 151 in Business Group pull-down list 402. In the exemplary embodiment, business groups 151 displayed in Business Group pull-down list 402 include only those business groups that the user is authorized to access. After the user selects business group 151, a business description 404 is displayed for selected business group 151 in field 406.

Once business group 151 is selected by a user, the user is then prompted to select a content type 408 from a data field list 410. In the example embodiment, content types 408 displayed in data field list 410 include only those content types that the user is authorized to access. In the example embodiment, content types 408 displayed in data field list 410 include at least one of the following: Solution Central 200, Business Entity Information 202, Contact Us 204, Expertise 206, Worldwide Presence 208, Net Links 210, Frequently Asked Questions (FAQ) 212, and Industry Served 214. User interface 400 also includes an OK button 412 and a Cancel button 414. Although pull-down lists, data fields, and buttons are illustrated in the example embodiment, check boxes and other means for inputting information could also be used. After the user selects business group 151, content type 408, and OK button 412, the user is given access to manage business information 150 (shown in FIG. 3) in WCMS 10.

Figure 8:
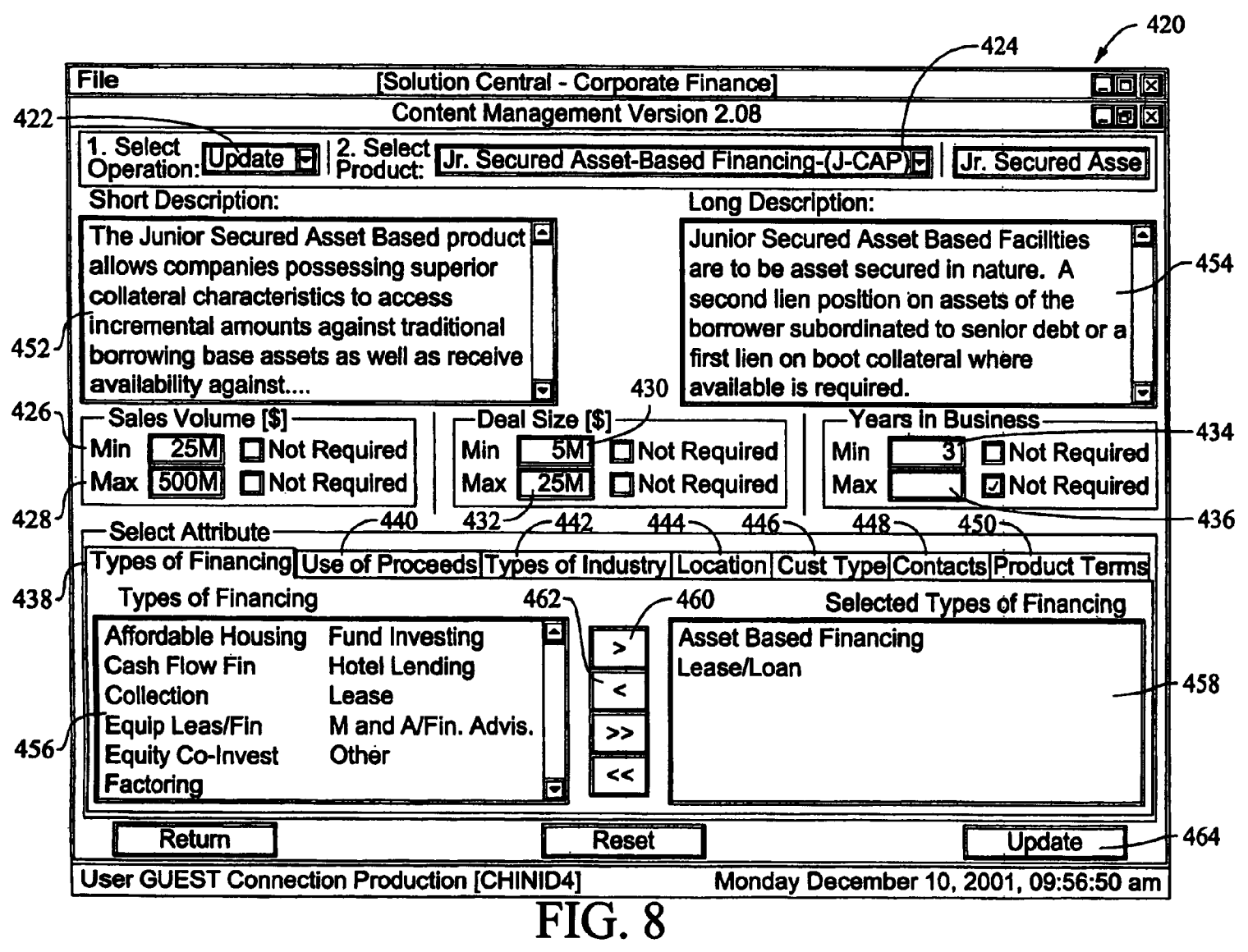

FIG. 8 is an example embodiment of a user interface 420 displaying a home page in WCMS 10 (shown in FIG. 1) after a user has selected business group 151 (shown in FIG. 7), Solution Central 200 (shown in FIG. 7), and OK button 412

(shown in FIG. 7). User interface 420 enables a user to input business information relating to products and services offered by a business entity. The functions that can be performed at user interface 420 include: adding new products, updating existing products, and deleting existing products. In an example embodiment, user interface 420 illustrates a plurality of pull-down fields, data fields, and menu tabs including at least one of Select Operation pull-down field 422, Select Product pull-down field 424, Minimum Sales Volume field 426, Maximum Sales Volume field 428, Minimum Deal Size field 430, Maximum Deal Size field 432, Minimum Years in Business field 434, Maximum Years in Business field 436, Types of Financing tab 438, Use of Proceeds tab 440, Types of Industry tab 442, Location tab 444, Customer Type tab 446, Contacts tab 448, and Product Terms tab 450.

User interface 420 also displays a short description field 452 and a long description field 454 that provide the user with a description of the selected product. In the example embodiment, user interface also displays a Types of Financing data field 456 that includes a list of a plurality of types of financing that may be associated with the selected product, and a Selected Types of Financing data field 458 that list the types of financing selected by the user for the selected product. In the example embodiment, user interface 420 also displays a right arrow button 460 and a left arrow button 462, which enable the user to add or delete a selected type of financing from Selected Types of Financing data field 458. When the user has input business information 150 (shown in FIGS. 3 and 4) at user interface 420, the user selects Update button 464. WCMS 10 then updates business information 150 stored on database 28 (shown in FIGS. 3 and 4) such that business information 150, including dynamic and re-purposed information, displayed on the business entity's web site is updated on all web pages within the web site.

Figure 9:
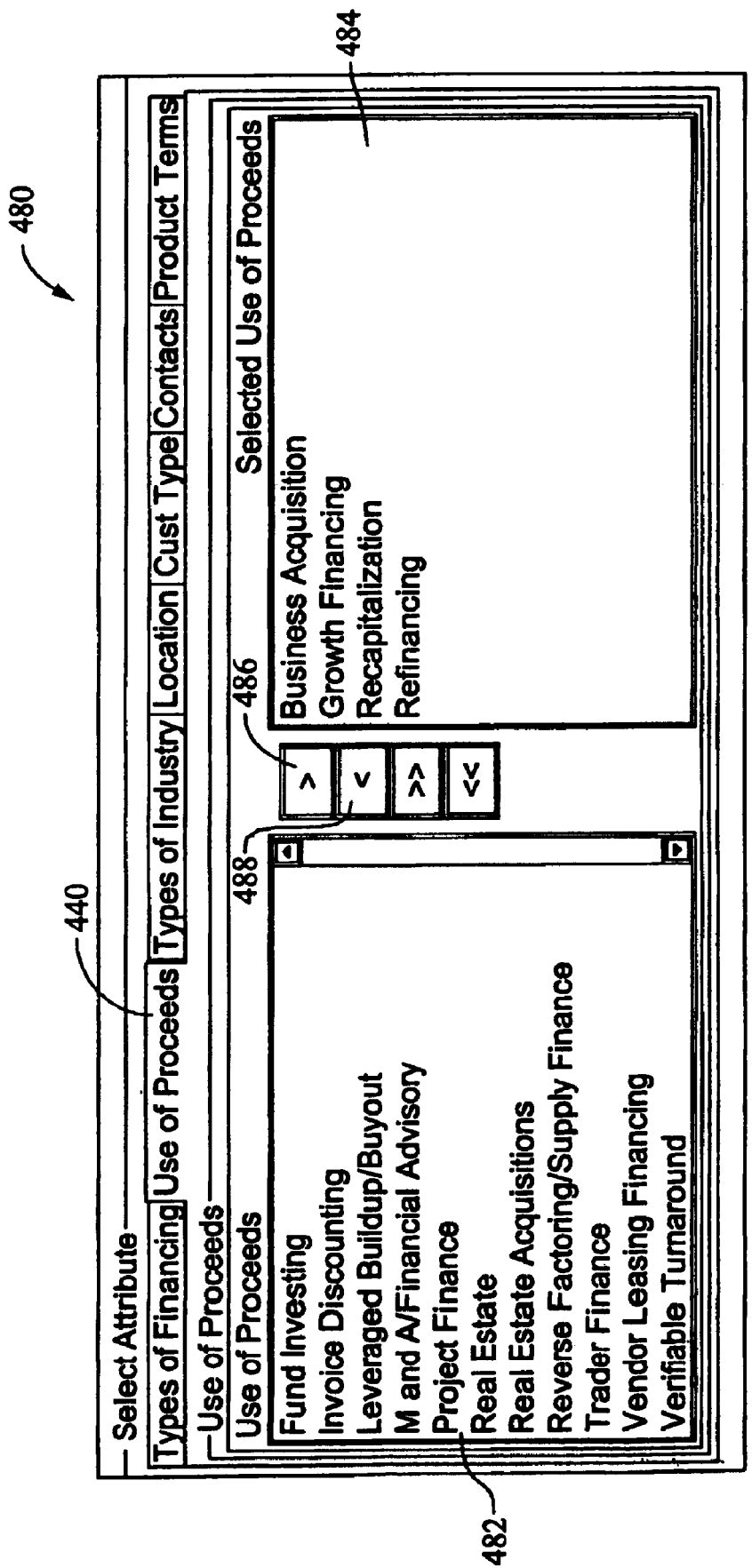
FIG. 9 is an example embodiment of a lower portion of a user interface of a WCMS illustrating a page for displaying and inputting use of proceeds information for a product or service offered by a business entity.

FIG. 9 is an example embodiment of a lower portion of a user interface 480 displaying a lower portion of a screen within WCMS 10 (shown in FIG. 1) after a user has selected Use of Proceeds tab 440 on user interface 420 (shown in FIG. 8). User interface 480 displays a Use of Proceeds data field 482 and a Selected Use of Proceeds data field 484. Use of Proceeds data field 482 includes a predetermined list of a plurality of use of proceeds that may be applicable to the selected product being added or updated on WCMS 10 (shown in FIG. 1). In the example embodiment, user interface 480 displays a right arrow button 486 and a left arrow button 488. Right arrow button 486 enables the user to add a highlighted use of proceeds from Use of Proceeds data field 482 to Selected Use of Proceeds data field 484. Left arrow button 488 enables the user to delete a use of proceeds from Selected Use of Proceeds data field 484. When the user has input business information 150 (shown in FIGS. 3 and 4) at user interface 480, the user selects Update button (not shown in FIG. 9). WCMS 10 then updates business information 150 stored on database 28 (shown in FIGS. 3 and 4) such that business information 150, including dynamic and re-purposed information, displayed on the business entity's web site is updated on all web pages within the web site.

Figure 10:
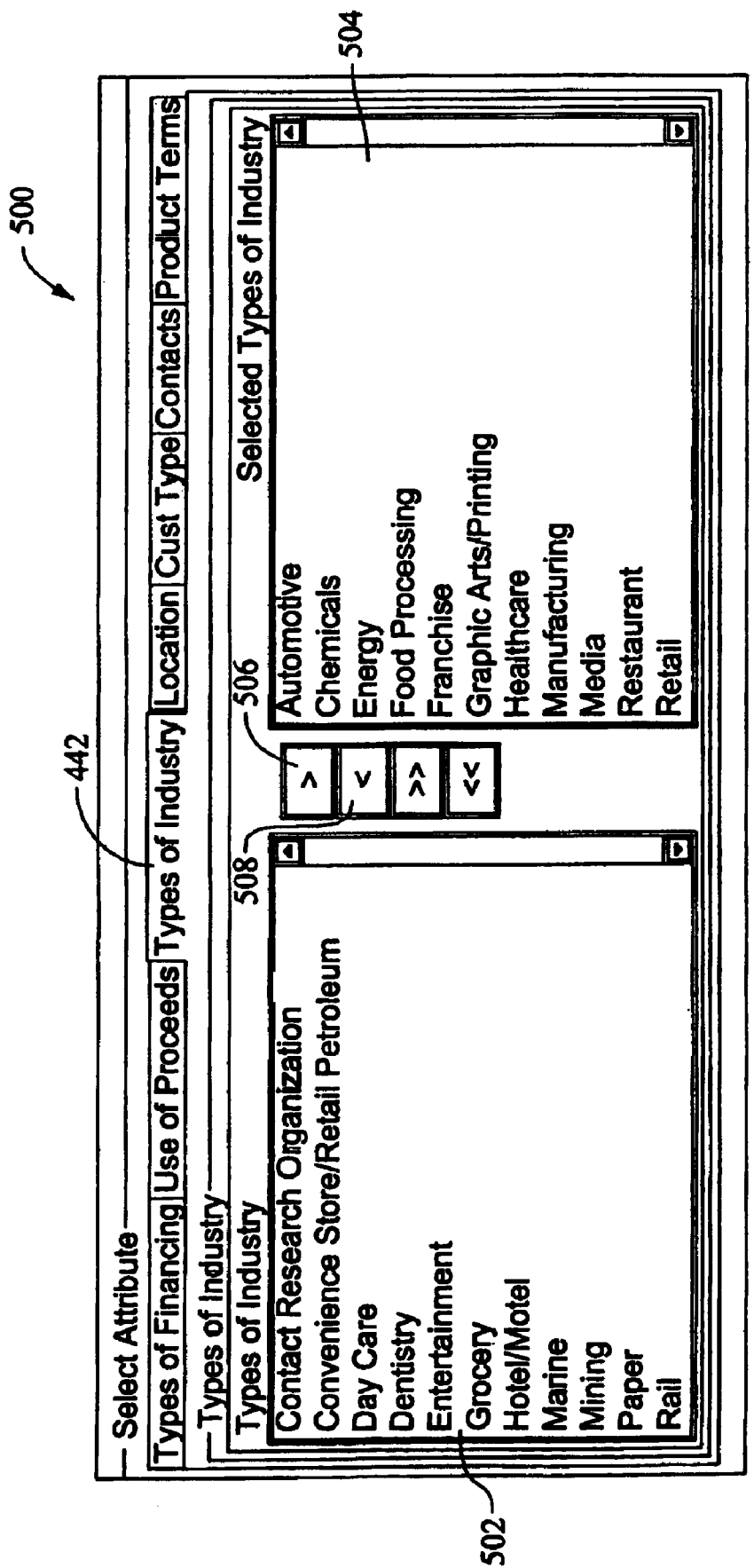
FIG. 10 is an example embodiment of a lower portion of a user interface of a WCMS illustrating a page for displaying and inputting types of industry information for a product or service offered by a business entity.

FIG. 10 is an example embodiment of a lower portion of a user interface 500 displaying a lower portion of a screen within WCMS 10 (shown in FIG. 1) after a user has selected Types of Industry tab 442 on user interface 420 (shown in FIG. 8). User interface 500 displays a Types of Industry data field 502 and a Selected Types of Industry data field 504. Types of Industry data field 502 includes a predetermined list of a plurality of types of industry that may be applicable to the selected product being added or updated on WCMS 10 (shown in FIG. 1). In the example embodiment, user interface 500 displays a right arrow button 506 and a left arrow button 508. Right arrow button 506 enables the user to add a highlighted type of industry from Types of Industry data field 502 to Selected Types of Industry data field 504. Left arrow button 508 enables the user to delete a type of industry from Selected Types of Industry data field 504. When the user has input the appropriate types of industry within Selected Types of Industry data field 504, the user selects Update button (not shown in FIG. 10) which updates business information 150 (shown in FIGS. 3 and 4) stored on database 28 (shown in FIGS. 3 and 4) such that business information 150 (shown in FIGS. 3 and 4), including dynamic and re-purposed information, displayed on the business entity's web site is updated on all web pages within the web site.

Figure 11:
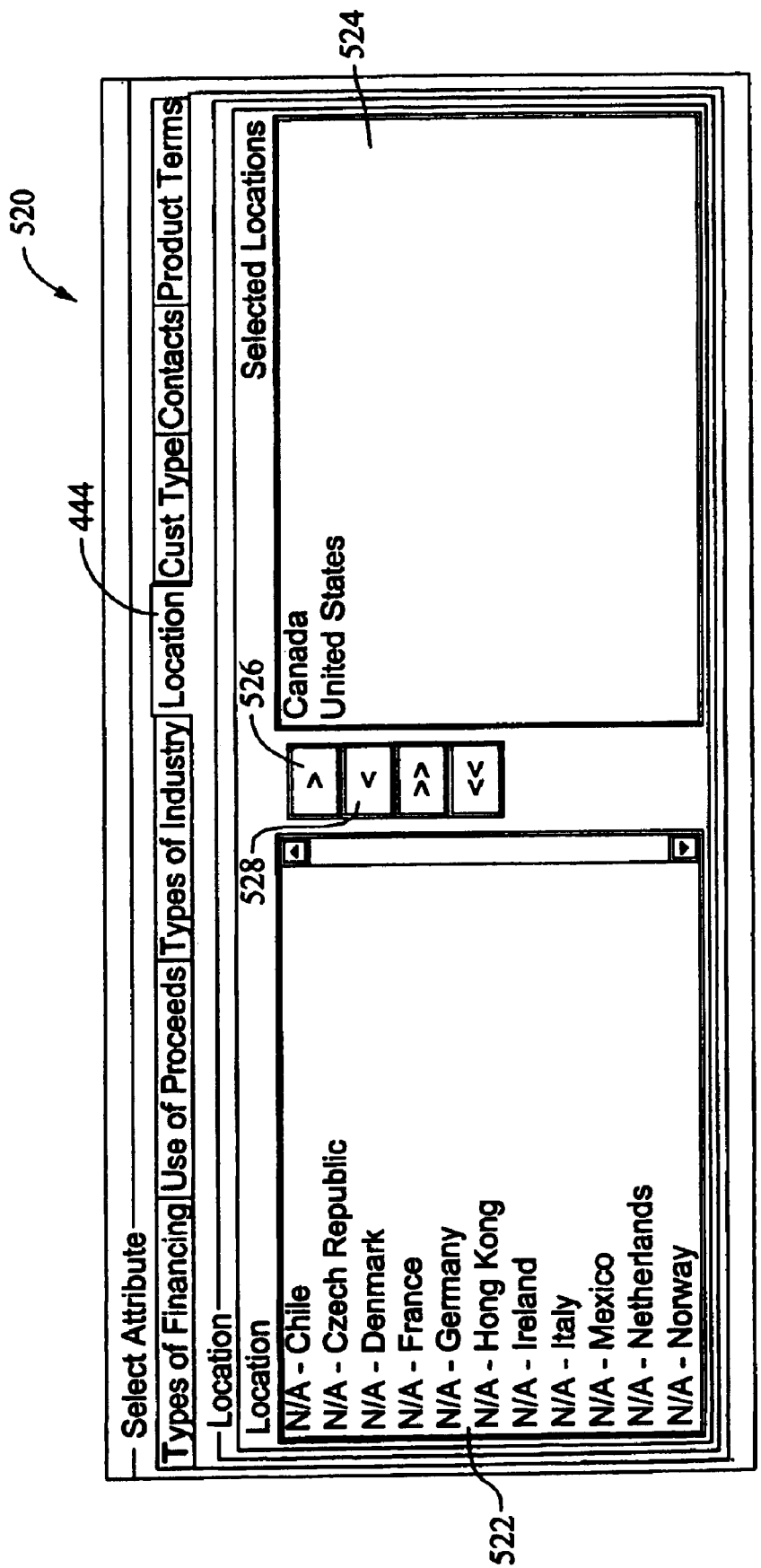
FIG. 11 is an example embodiment of a lower portion of a user interface of a WCMS illustrating a page for displaying and inputting location information for a product or service offered by a business entity.

FIG. 11 is an example embodiment of a lower portion of a user interface 520 displaying a lower portion of a screen within WCMS 10 (shown in FIG. 1) after a user has selected Location tab 444 on user interface 420 (shown in FIG. 8). User interface 520 displays a Locations data field 522 and a Selected Locations data field 524. Locations data field 522 includes a predetermined list of a plurality of locations that may be applicable to the selected product being added or updated on WCMS 10 (shown in FIG. 1). In the example embodiment, user interface 520 displays a right arrow button 526 and a left arrow button 528. Right arrow button 526 enables the user to add a highlighted location from Locations data field 522 to Selected Locations data field 524. Left arrow button 528 enables the user to delete a location from Selected Locations data field 524. When the user has input the appropriate locations for the selected product within Selected Locations data field 524, the user selects Update button (not shown in FIG. 11) which updates business information 150 (shown in FIGS. 3 and 4) stored on database 28 (shown in FIGS. 3 and 4) such that business information 150, including dynamic and re-purposed information, displayed on the business entity's web site is updated on all web pages within the web site.

Figure 12:
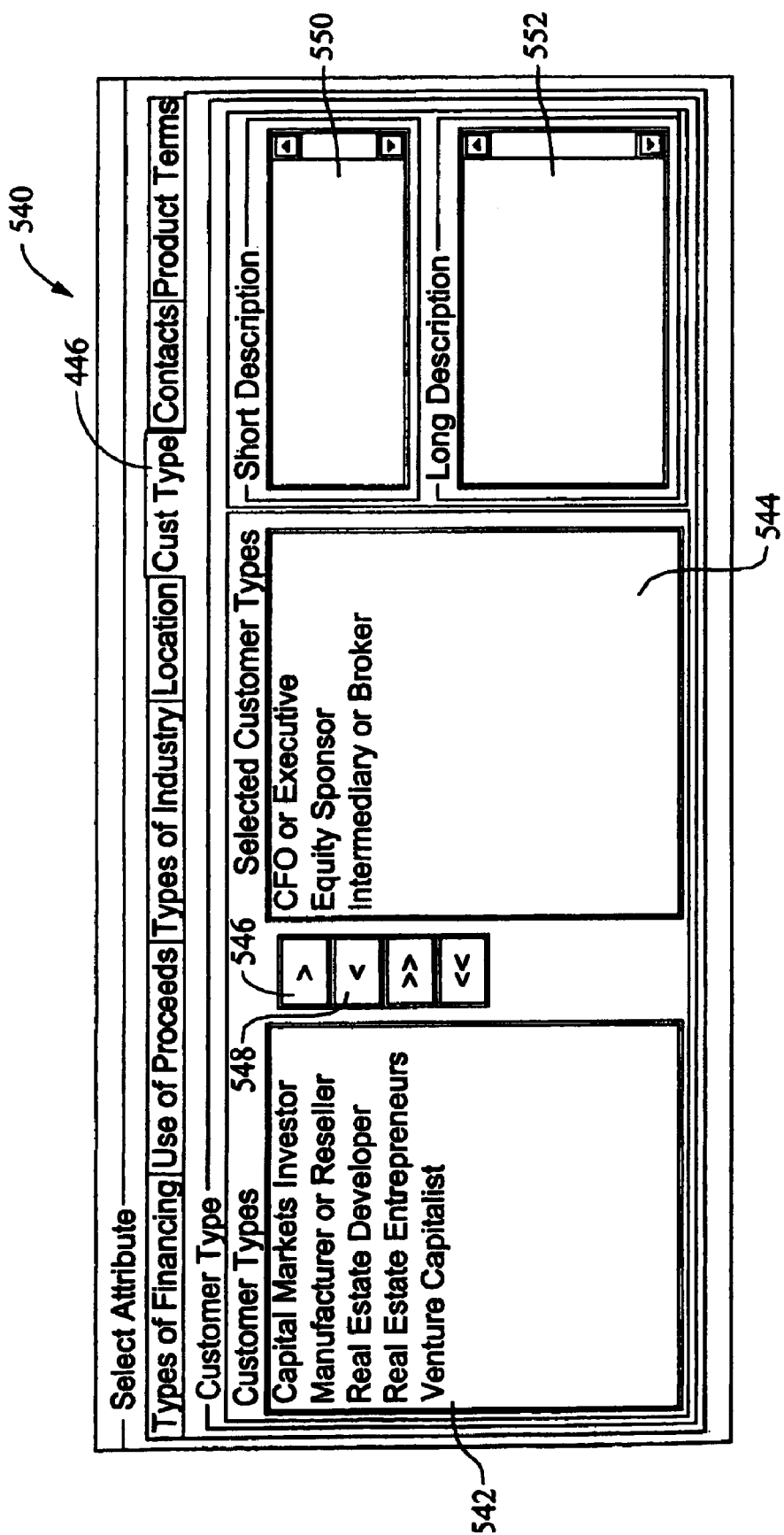
FIG. 12 is an example embodiment of a lower portion of a user interface of a WCMS illustrating a page for displaying and inputting customer type information for a product or service offered by a business entity.

FIG. 12 is an example embodiment of a lower portion of a user interface 540 displaying a lower portion of a screen within WCMS 10 (shown in FIG. 1) after a user has selected Customer Type tab 446 on user interface 420 (shown in FIG. 8). User interface 540 displays a Customer Type data field 542 and a Selected Customer Type data field 544. Customer Type data field 542 includes a predetermined list of a plurality of customer types that may be applicable to the selected product being added or updated on WCMS 10 (shown in FIG. 1). In the example embodiment, user interface 540 also displays a right arrow button 546 and a left arrow button 548. Right arrow button 546 enables the user to add a highlighted customer type from Customer Type data field 542 to Selected Customer Type data field 544. Left arrow button 548 enables the user to delete a customer type from Selected Customer Type data field 544. User interface 540 also displays a Short Description data field 550 and a Long Description data field 552, which enable the user to input and customize the description for each selected customer type. When the user has input the appropriate customer type for the selected product within Selected Customer Type data field 544, the user selects Update button (not shown in FIG. 12). WCMS 10 then updates business information 150 (shown in FIGS. 3 and 4) stored on database 28 (shown in FIGS. 3 and 4) such that business information 150, including dynamic and re-purposed information, displayed on the business entity's web site is updated on all web pages within the web site.

Figure 13:
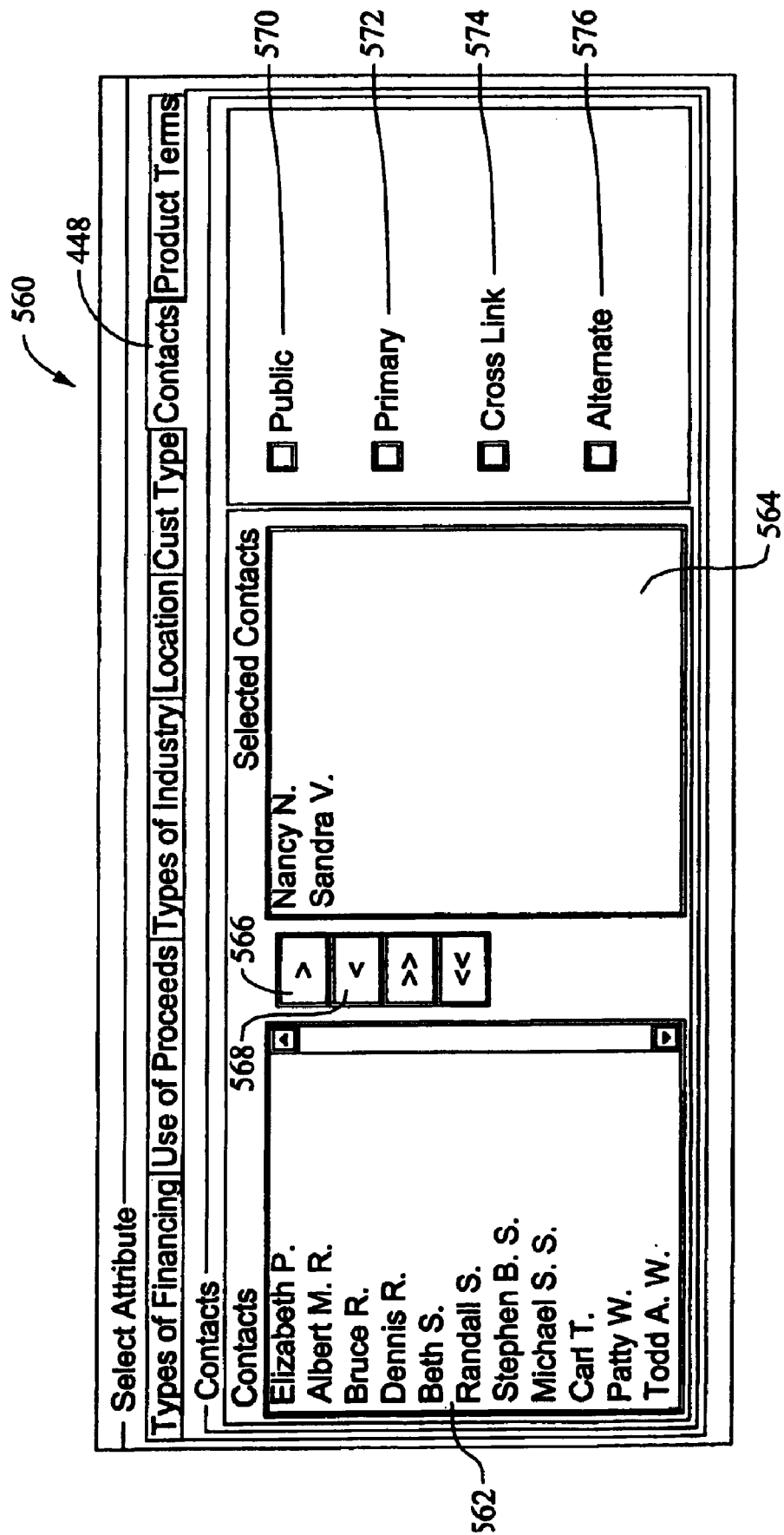
FIG. 13 is an example embodiment of a lower portion of a user interface of a WCMS illustrating a page for displaying and inputting contacts information for a product or service offered by a business entity.

FIG. 13 is an example embodiment of a lower portion of a user interface 560 displaying a lower portion of a screen within WCMS 10 (shown in FIG. 1) after a user has selected Contacts tab 448 on user interface 420 (shown in FIG. 8). User interface 560 displays a Contacts data field 562 and a Selected Contacts data field 564. Contacts data field 562 includes a predetermined list of a plurality of contacts that may be applicable to the selected product being added or updated on WCMS 10 (shown in FIG. 1). In the example embodiment, user interface 560 displays a right arrow button 566 and a left arrow button 568. Right arrow button 566 enables the user to add a highlighted contact from Contacts data field 562 to Selected Contacts data field 564. Left arrow button 568 enables the user to delete a contact from Contacts data field 564. User interface 560 also displays a Public check-box 570 that enables the user to display a contact on the business entity's web site, a Primary check-box 572 that enables the user to display a contact on the business entity's web site and designate the contact for internal use, a Cross Link check-box 574 that enables the user to designate a contact for an internal referral program, and an Alternate check-box 576 that enables the user to designate a contact for a product. When the user has input the appropriate contacts for the selected product within Selected Contacts data field 564, the user selects Update button (not shown in FIG. 13). WCMS 10 then updates business information 150 (shown in FIGS. 3 and 4) stored on database 28 (shown in FIGS. 3 and 4) such that business information 150, including dynamic and re-purposed information, displayed on the business entity's web site is updated on all web pages within the web site.

Figure 14:
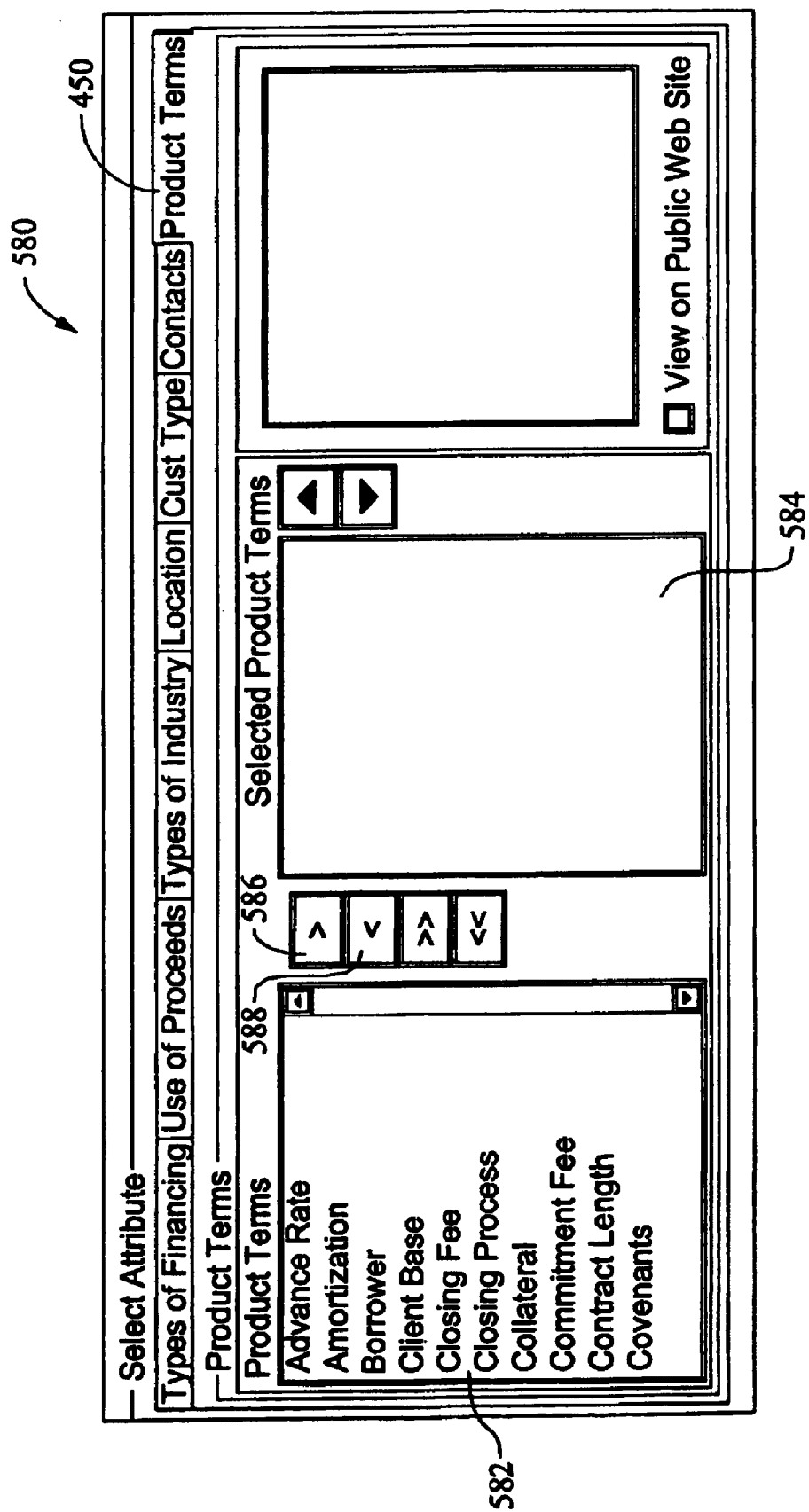
FIG. 14 is an example embodiment of a lower portion of a user interface of a WCMS illustrating a page for displaying and inputting product terms information for a product or service offered by a business entity.

FIG. 14 is an example embodiment of a lower portion of a user interface 580 displaying a lower portion of a screen within WCMS 10 (shown in FIG. 1) after a user has selected Product Terms tab 450 on user interface 420 (shown in FIG. 8). User interface 580 displays a Product Terms data field 582 and a Selected Product Terms data field 584. Product Terms data field 582 includes a predetermined list of a plurality of product terms that may be applicable to the selected product being added or updated on WCMS 10 (shown in FIG. 1). In the example embodiment, user interface 580 displays a right arrow button 586 and a left arrow button 588. Right arrow button 586 enables the user to add a highlighted product term from Product Terms data field 582 to Selected Product Terms data field 584. Left arrow button 588 enables the user to delete a product term from Selected Product Terms data field 584. User interface 580 also enables the user to customize the terms of a selected product term. When the user has input the appropriate product terms for the selected product within Selected Product Terms data field 524, the user selects Update button (not shown in FIG. 14). WCMS 10 then updates business information 150 (shown in FIGS. 3 and 4) stored on database 28 (shown in FIGS. 3 and 4) such that business information 150, including dynamic and re-purposed information, displayed on the business entity's web site is updated on all web pages within the web site.

Figure 15:
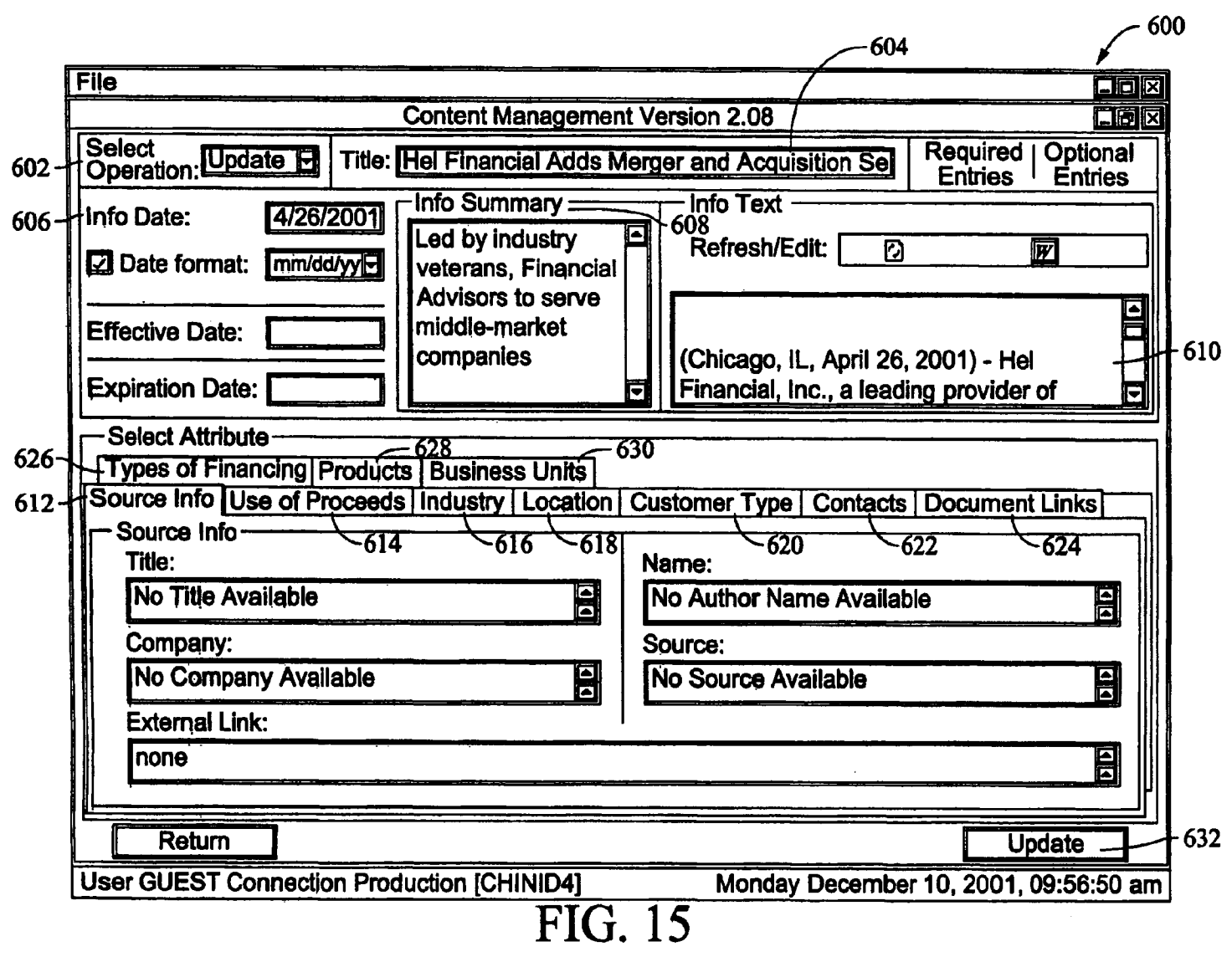

FIG. 15 is an example embodiment of a user interface 600 displaying a home page of WCMS 10 (shown in FIG. 1) after a user has selected business group 151 (shown in FIG. 7), Business Entity Information 202 (shown in FIG. 7), and OK button 412 (shown in FIG. 7). User interface 600 enables a user to input business information relating to the business entity into WCMS 10. The functions that can be performed at user interface 600 include: adding new information relating to the business entity, updating existing information relating to the business entity, and deleting existing information relating to the business entity. In an example embodiment, user interface 600 illustrates a plurality of pull-down fields, data fields, and menu tabs including at least one of Select Operation pull-down field 602, Title data field 604, Info Date data field 606, Info Summary data field 608, Info Text data field 610, Source Info Tab 612, Use of Proceeds tab 614, Industry tab 616, Location tab 618, Customer Type tab 620, Contacts tab 622, Document Links 624, Types of Financing tab 626, Products tab 628, and Business Units tab 630. After the user has input business information 150 (shown in FIGS. 3 and 4) into WCMS 10, the user selects Update button 632. WCMS 10 then updates business information 150 stored on database 28 (shown in FIGS. 3 and 4) such that business information 150, including dynamic and re-purposed information, displayed on the business entity's web site is updated on all web pages within the web site.

Figure 16:
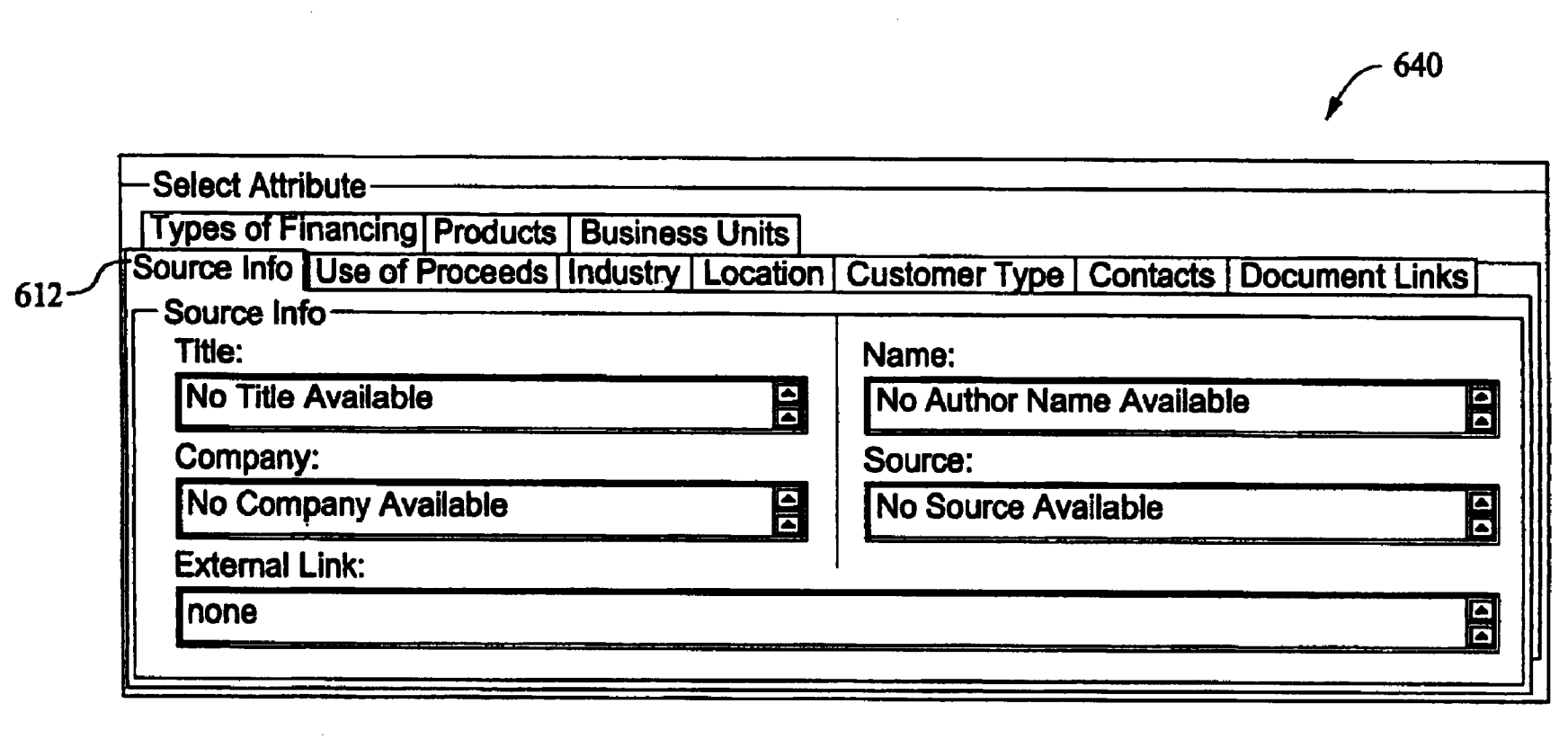

FIG. 16 is an example embodiment of a lower portion of a user interface 640 displaying a lower portion of a screen within WCMS 10 (shown in FIG. 1) after a user has selected Source Info tab 612 on user interface 600 (shown in FIG. 15). User interface 640 displays and tracks the source of the business information, including at least one of who authored the business information, the company the author works for, and other web sites that may be used as a reference. When the user has input the source information, the user selects Update button 632 (shown in FIG. 15). WCMS 10 then updates business information 150 (shown in FIGS. 3 and 4) stored on database 28 (shown in FIGS. 3 and 4) such that business information 150, including dynamic and re-purposed information, displayed on the business entity's web site is updated on all web pages within the web site.

Figure 17:
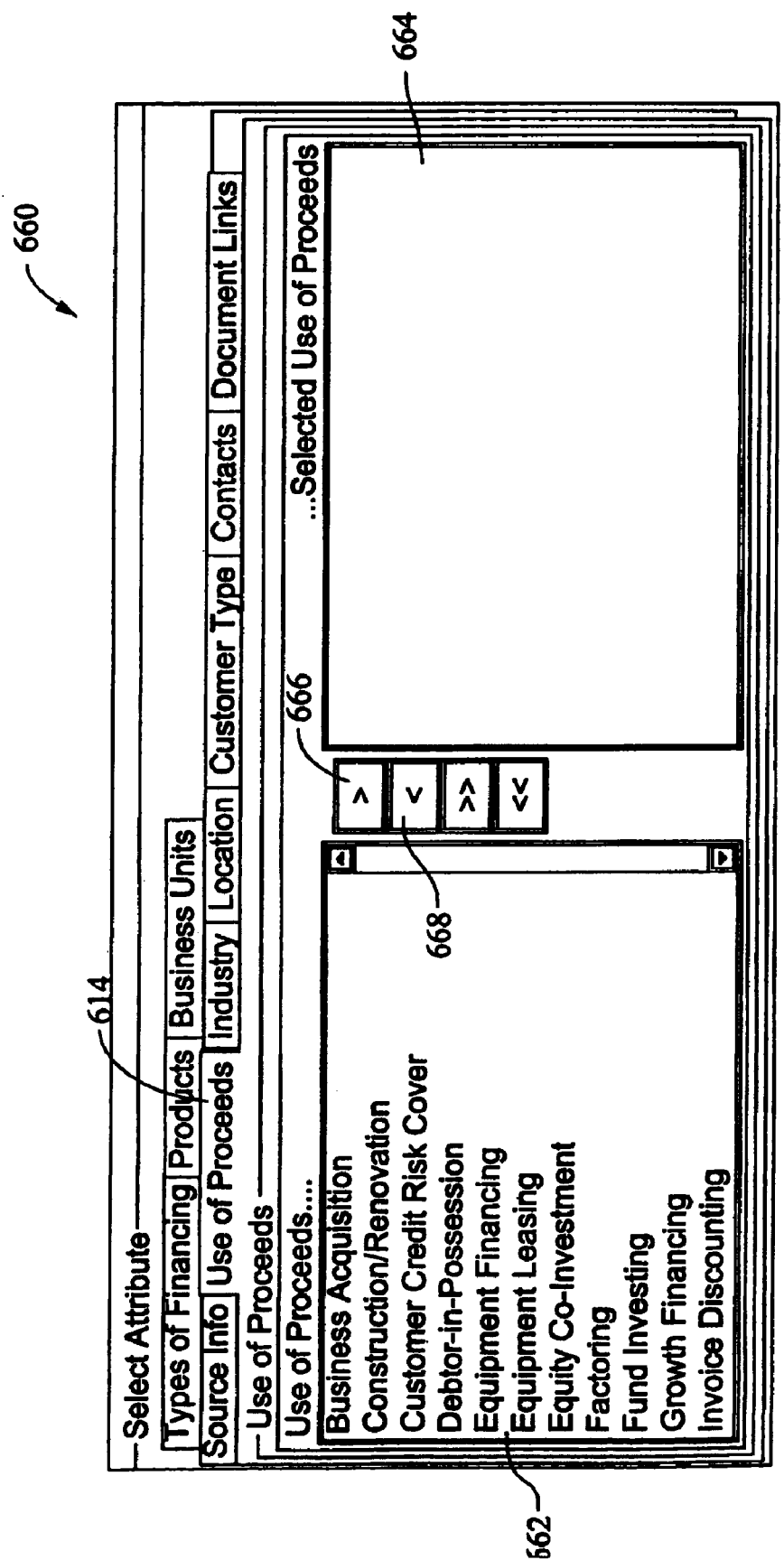
FIG. 17 is an example embodiment of a lower portion of a user interface of a WCMS illustrating a page for displaying and inputting use of proceeds information relating to a business entity.

FIG. 17 is an exemplary embodiment of a lower portion of a user interface 660 displaying a lower portion of a screen within WCMS 10 (shown in FIG. 1) after a user has selected Use of Proceeds tab 614 on user interface 600 (shown in FIG. 15). User interface 660 displays a Use of Proceeds data field 662 and a Selected Use of Proceeds data field 664. Use of Proceeds data field 662 includes a predetermined list of a plurality of use of proceeds that may be applicable to the information being added or updated on WCMS 10 (shown in FIG. 1). In the example embodiment, user interface 660 displays a right arrow button 666 and a left arrow button 668. Right arrow button 666 enables the user to add a highlighted use of proceeds from Use of Proceeds data field 662 to Selected Use of Proceeds data field 664. Left arrow button 668 enables the user to delete a use of proceeds from Selected Use of Proceeds data field 664. When the user has input the appropriate use of proceeds within Selected Use of Proceeds data field 664, the user selects Update button 632 (shown in FIG. 15). WCMS 10 then updates business information 150 (shown in FIGS. 3 and 4) stored on database 28 (shown in FIGS. 3 and 4) such that business information, including dynamic and re-purposed information, displayed on the business entity's web site is updated on all web pages within the web site.

Figure 18:
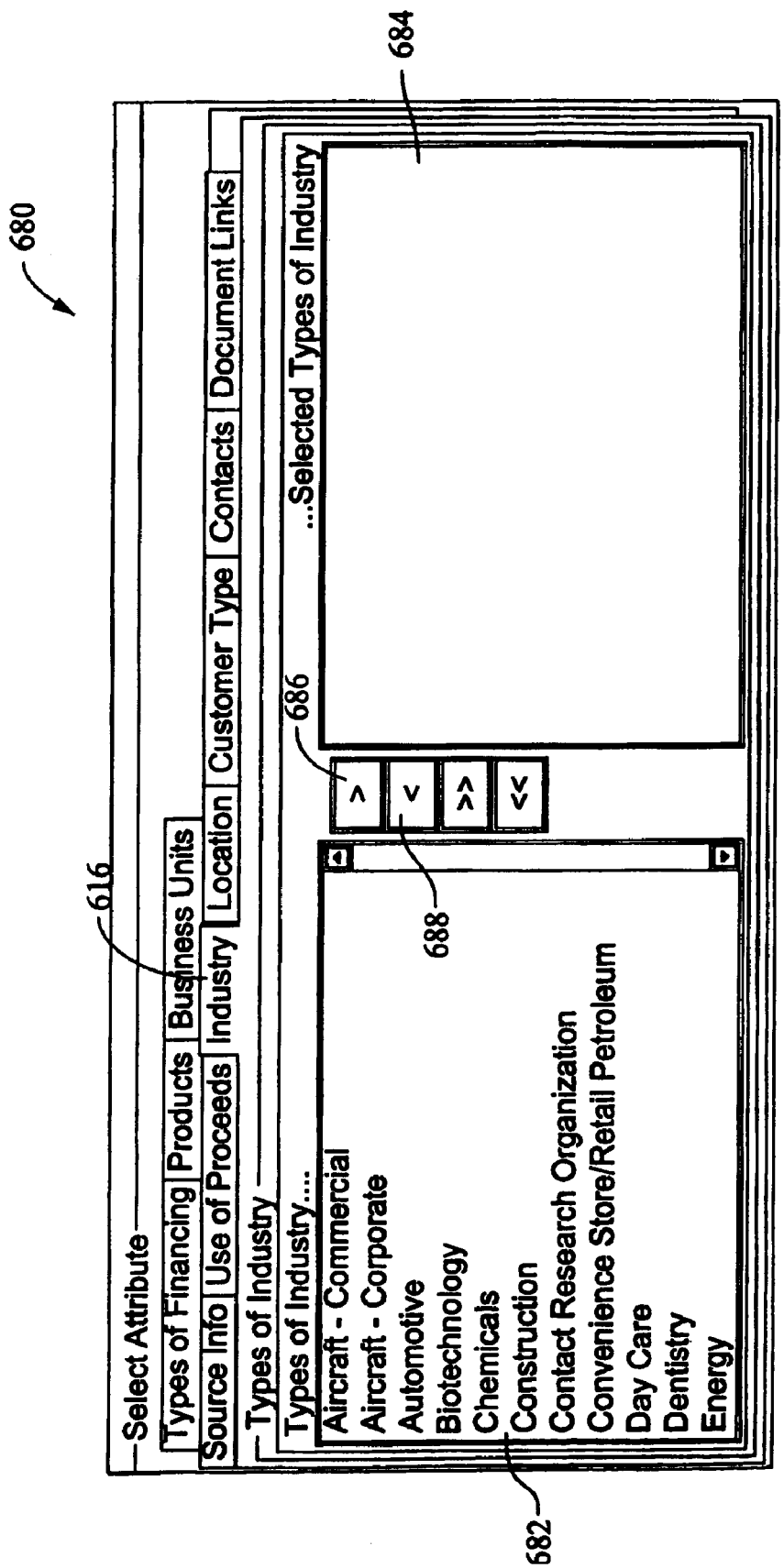
FIG. 18 is an example embodiment of a lower portion of a user interface of a WCMS illustrating a page for displaying and inputting industry information relating to a business entity.

FIG. 18 is an example embodiment of a lower portion of a user interface 680 displaying a lower portion of a screen within WCMS 10 (shown in FIG. 1) after a user has selected Industry tab 616 on user interface 600 (shown in FIG. 15). User interface 680 displays a Industry data field 682 and a Selected Industry data field 684. Industry data field 682 includes a predetermined list of a plurality of industries that may be applicable to the information being added or updated on WCMS 10 (shown in FIG. 1). In the example embodiment, user interface 680 displays a right arrow button 686 and a left arrow button 688. Right arrow button 686 enables the user to add a highlighted industry from Industry data field 682 to Selected Industry data field 684. Left arrow button 688 enables the user to delete an industry from Selected Industry data field 684. When the user has input the appropriate industry(ies) within Selected Industry data field 684, the user selects Update button 632 (shown in FIG. 15). WCMS 10 then updates business information 150 (shown in FIGS. 3 and 4) stored on database 28 (shown in FIGS. 3 and 4) such that business information 150, including dynamic and re-purposed information, displayed on the business entity's web site is updated on all web pages within the web site.

Figure 19:
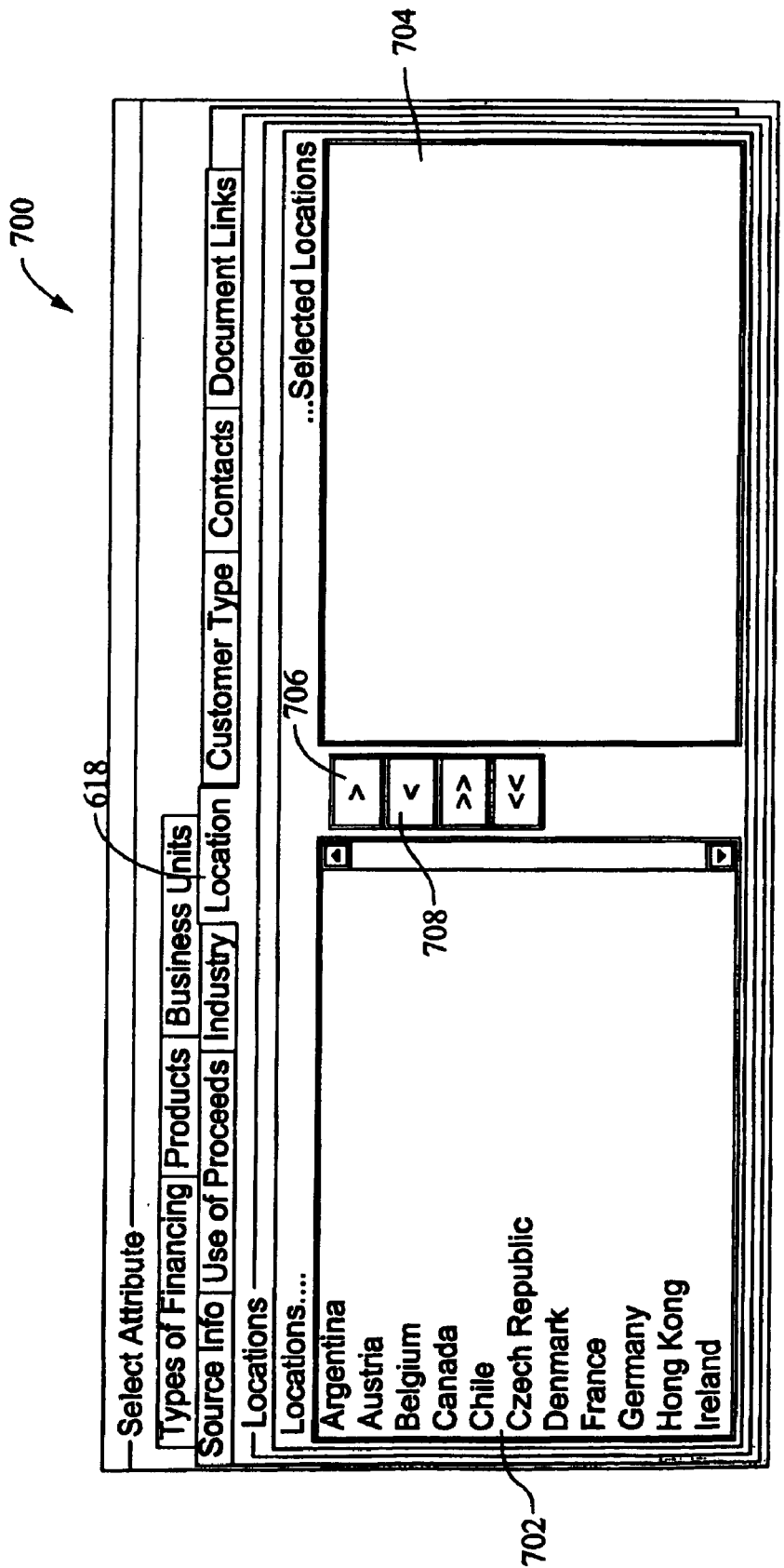
FIG. 19 is an example embodiment of a lower portion of a user interface of a WCMS illustrating a page for displaying and inputting location information relating to a business entity.

FIG. 19 is an example embodiment of a lower portion of a user interface 700 displaying a lower portion of a screen within WCMS 10 (shown in FIG. 1) after a user has selected Location tab 618 on user interface 600 (shown in FIG. 15). User interface 700 displays a Locations data field 702 and a Selected Locations data field 704. Locations data field 702 includes a predetermined list of a plurality of locations that may be applicable to the business information being entered or updated on WCMS 10 (shown in FIG. 1). In the example embodiment, user interface 700 displays a right arrow button 706 and a left arrow button 708. Right arrow button 706 enables the user to add a highlighted location from Locations data field 702 to Selected Locations data field 704. Left arrow button 708 enables the user to delete a location from Selected Locations data field 704. When the user has input the appropriate locations within Selected Locations data field 704, the user selects Update button 632 (shown in FIG. 15). WCMS 10 then updates business information 150 (shown in FIGS. 3 and 4) stored on database 28 (shown in FIGS. 3 and 4) such that business information 150, including dynamic and re-purposed information, displayed on the business entity's web site is updated on all web pages within the web site.

Figure 20:
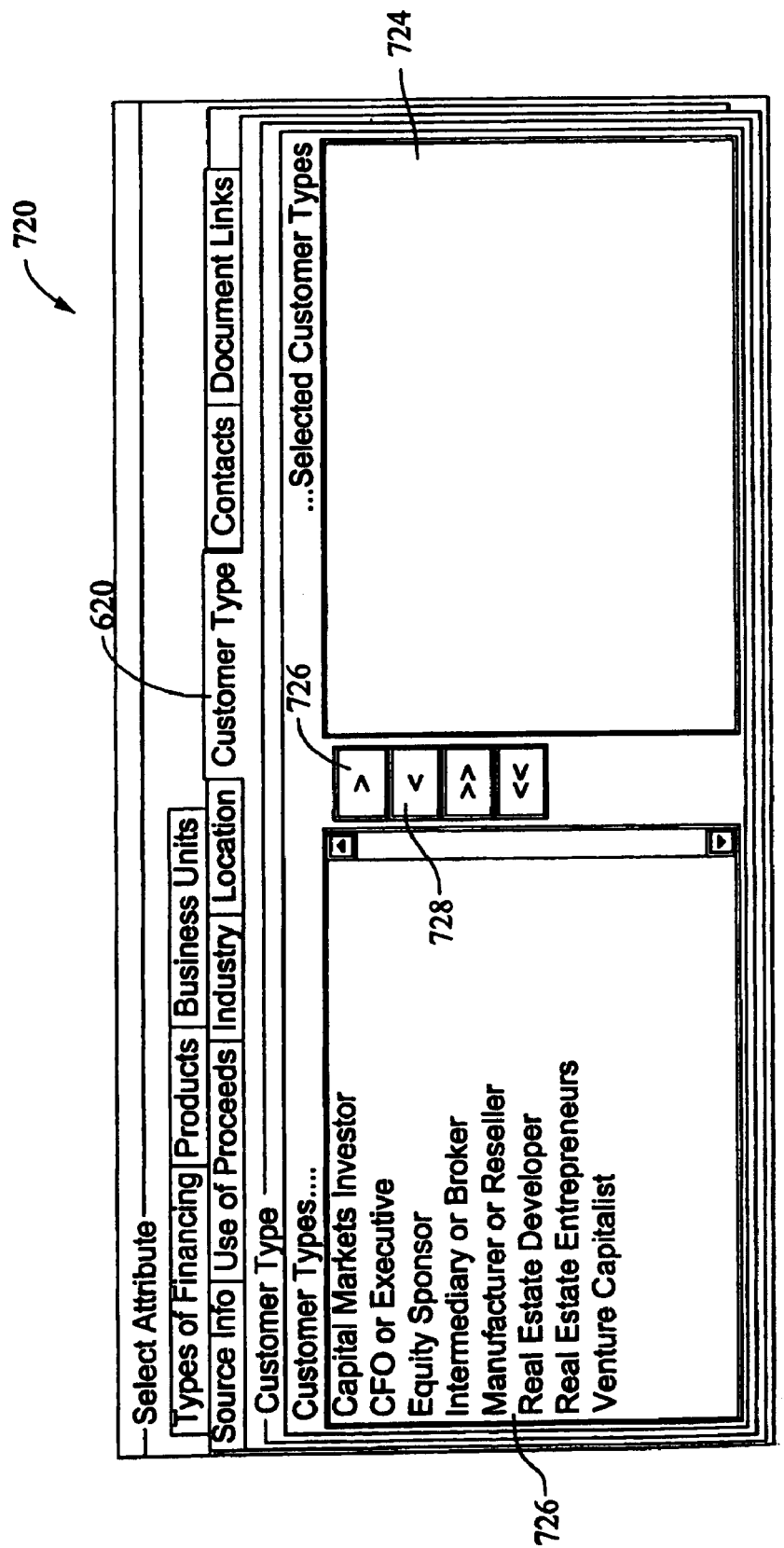
FIG. 20 is an example embodiment of a lower portion of a user interface of a WCMS illustrating a page for displaying and inputting customer type information relating to a business entity.

FIG. 20 is an example embodiment of a lower portion of a user interface 720 displaying a lower portion of a screen within WCMS 10 (shown in FIG. 1) after a user has selected Customer Type tab 620 on user interface 600 (shown in FIG. 15). User interface 720 displays a Customer Type data field 722 and a Selected Customer Type data field 724. Customer Type data field 722 includes a predetermined list of a plurality of customer types that may be applicable to the information being added or updated on WCMS 10 (shown in FIG. 1). In the example embodiment, user interface 720 displays a right arrow button 726 and a left arrow button 728. Right arrow button 726 enables the user to add a highlighted customer type from Customer Type data field 722 to Selected Customer Type data field 724. Left arrow button 728 enables the user to delete a customer type from Selected Customer Type data field 724. When the user has input the appropriate customer type within Selected Customer Type data field 724, the user selects Update button 632 (shown in FIG. 15). WCMS 10 then updates business information 150 (shown in FIGS. 3 and 4) stored on database 28 (shown in FIGS. 3 and 4) such that business information 150, including dynamic and re-purposed information, displayed on the business entity's web site is updated on all web pages within the web site.

Figure 21:
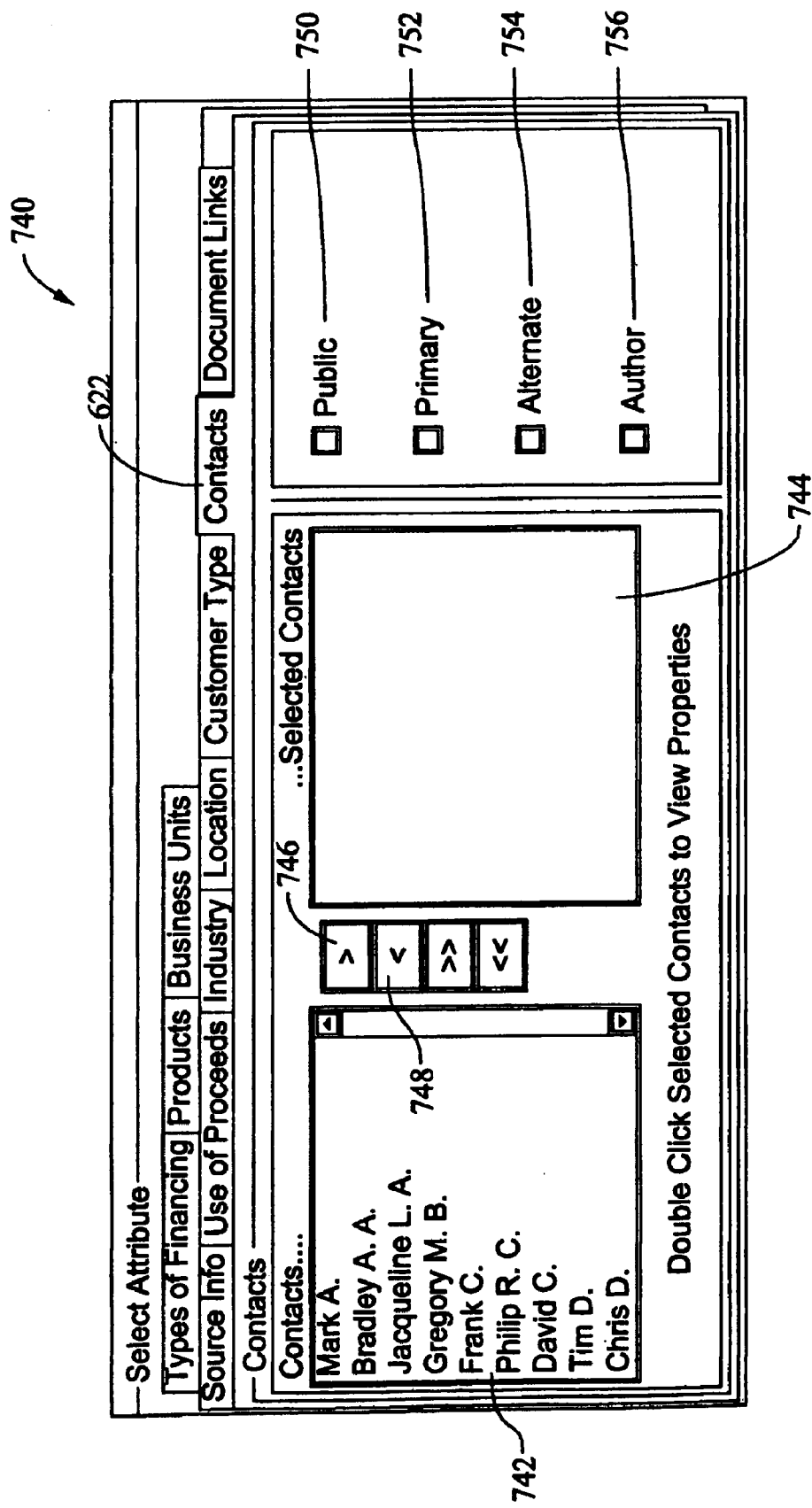
FIG. 21 is an example embodiment of a lower portion of a user interface of a WCMS illustrating a page for displaying and inputting contact information relating to a business entity.

FIG. 21 is an example embodiment of a lower portion of a user interface 740 displaying a lower portion of a screen within WCMS 10 (shown in FIG. 1) after a user has selected Contacts tab 622 on user interface 600 (shown in FIG. 15). User interface 740 displays a Contacts data field 742 and a Selected Contacts data field 744. Contacts data field 742 includes a predetermined list of a plurality of contacts that may be applicable to the information being added or updated on WCMS 10 (shown in FIG. 1). In the example embodiment, user interface 740 displays a right arrow button 746 and a left arrow button 748. Right arrow button 746 enables the user to add a highlighted contact from Contacts data field 742 to Selected Contacts data field 744. Left arrow button 748 enables the user to delete a contact from Selected Contacts data field 744. User interface 740 also displays a Public check-box 750 that enables the user to display a contact on the business entity's web site, a Primary check-box 752 that enables the user to display a contact on the business entity's web site and designate the contact for internal use, an Alternate check-box 754 that enables the user to designate a contact for the business information, and an Author check-box 756 that enables the user to display the author of the business information. When the user has input the appropriate contacts within Selected Contacts data field 744, the user selects Update button 632 (shown in FIG. 15). WCMS 10 then updates business information 150 (shown in FIGS. 3 and 4) stored on database 28 (shown in FIGS. 3 and 4) such that business information 150, including dynamic and re-purposed information, displayed on the business entity's web site is updated on all web pages within the web site.

Figure 22:
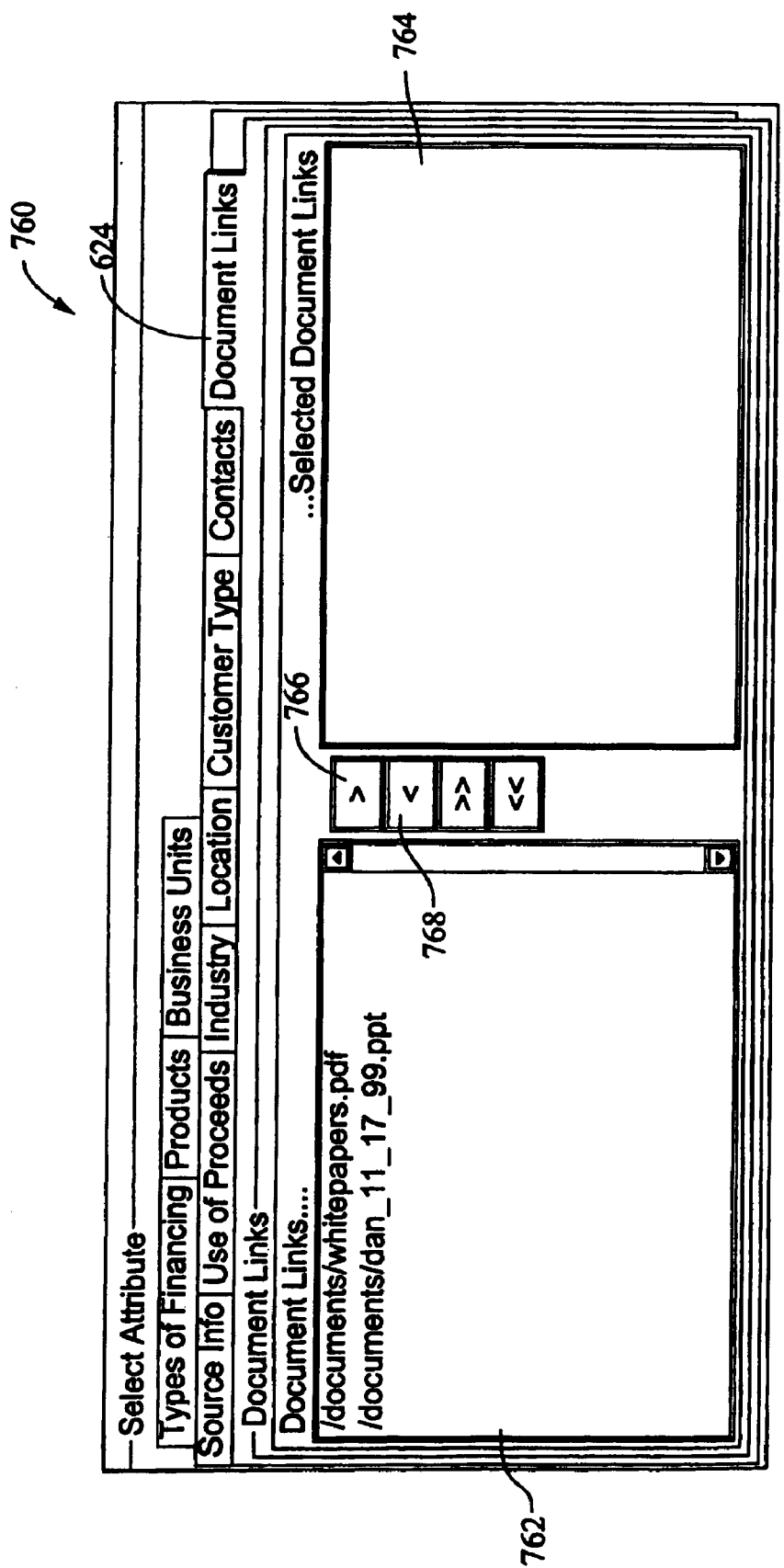
FIG. 22 is an example embodiment of a lower portion of a user interface of a WCMS illustrating a page for displaying and inputting document links information relating to a business entity.

FIG. 22 is an example embodiment of a lower portion of a user interface 760 displaying a lower portion of a screen within WCMS 10 (shown in FIG. 1) after a user has selected Document Links tab 624 on user interface 600 (shown in FIG. 15). User interface 760 displays a Document Links data field 762 and a Selected Document Links data field 764. Document Links data field 762 includes a predetermined list of a plurality of document links that may be applicable to the information being added or updated on WCMS 10 (shown in FIG. 1). In the example embodiment, user interface 760 also displays a right arrow button 766 and a left arrow button 768. Right arrow button 766 enables the user to add a highlighted document link from Document Links data field 762 to Selected Document Links data field 764. Left arrow button 768 enables the user to delete a document link from Selected Document Links data field 764. When the user has input the appropriate document links within Selected Document Links data field 764, the user selects Update button 632 (shown in FIG. 15). WCMS 10 then updates business information 150 (shown in FIGS. 3 and 4) stored on database 28 (shown in FIGS. 3 and 4) such that business information 150, including dynamic and re-purposed information, displayed on the business entity's web site is updated on all web pages within the web site.

Figure 23:
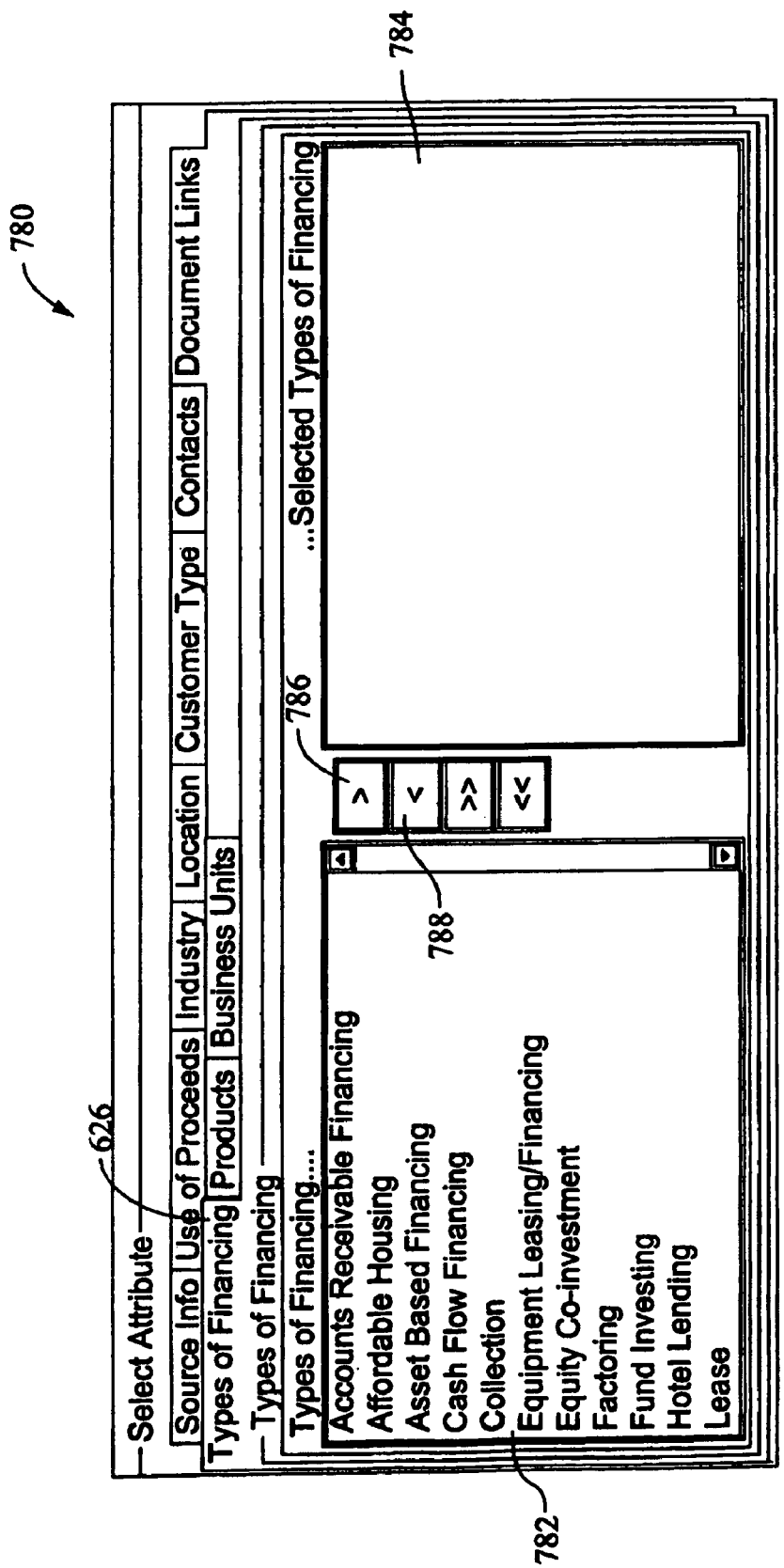
FIG. 23 is an example embodiment of a lower portion of a user interface of a WCMS illustrating a page for displaying and inputting types of financing information relating to a business entity.

FIG. 23 is an example embodiment of a lower portion of a user interface 780 displaying a lower portion of a screen within WCMS 10 (shown in FIG. 1) after a user has selected Types of Financing tab 626 on user interface 600 (shown in FIG. 15). User interface 780 displays a Types of Financing data field 782 and a Selected Types of Financing data field 784. Types of Financing data field 782 includes a predetermined list of a plurality of types of financing that may be applicable to the information being added or updated on WCMS 10 (shown in FIG. 1). In the example embodiment, user interface 780 displays a right arrow button 786 and a left arrow button 788. Right arrow button 786 enables the user to add a highlighted type of financing from Types of Financing data field 782 to Selected Types of Financing data field 784. Left arrow button 788 enables the user to delete a type of financing from Selected Types of Financing data field 784. When the user has input the appropriate types of financing within Selected Types of Financing data field 784, the user selects Update button 632 (shown in FIG. 15). WCMS 10 then updates business information 150 (shown in FIGS. 3 and 4) stored on database 28 (shown in FIGS. 3 and 4) such that business information 150, including dynamic and re-purposed information, displayed on the business entity's web site is updated on all web pages within the web site.

Figure 24:
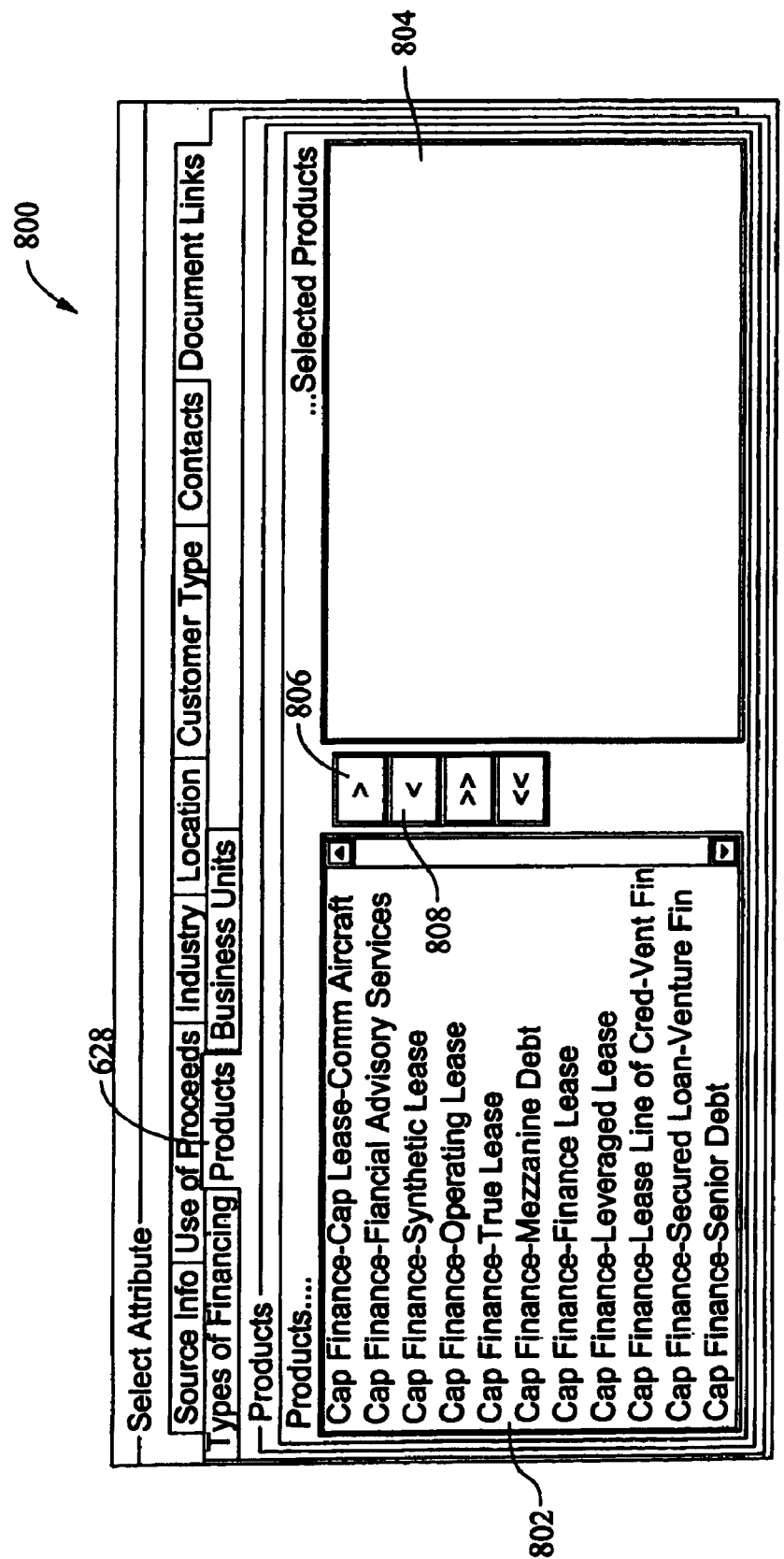
FIG. 24 is an example embodiment of a lower portion of a user interface of a WCMS illustrating a page for displaying and inputting product information relating to a business entity.

FIG. 24 is an example embodiment of a lower portion of a user interface 800 displaying a lower portion of a screen within WCMS 10 (shown in FIG. 1) after a user has selected Products tab 628 on user interface 600 (shown in FIG. 15). User interface 800 displays a Products data field 802 and a Selected Products data field 804. Products data field 802 includes a predetermined list of a plurality of products that may be applicable to the information being added or updated on WCMS 10 (shown in FIG. 1). In the exemplary embodiment, user interface 800 displays a right arrow button 806 and a left arrow button 808. Right arrow button 806 enables the user to add a highlighted product from Products data field 802 to Selected Products data field 804. Left arrow button 808 enables the user to delete a product from Selected Products data field 804. When the user has input the appropriate products within Selected Products data field 804, the user selects Update button 632 (shown in FIG. 15). WCMS 10 then updates business information 150 (shown in FIGS. 3 and 4) stored on database 28 (shown in FIGS. 3 and 4) such that business information, including dynamic and re-purposed information, displayed on the business entity's web site is updated on all web pages within the web site.

Figure 25:
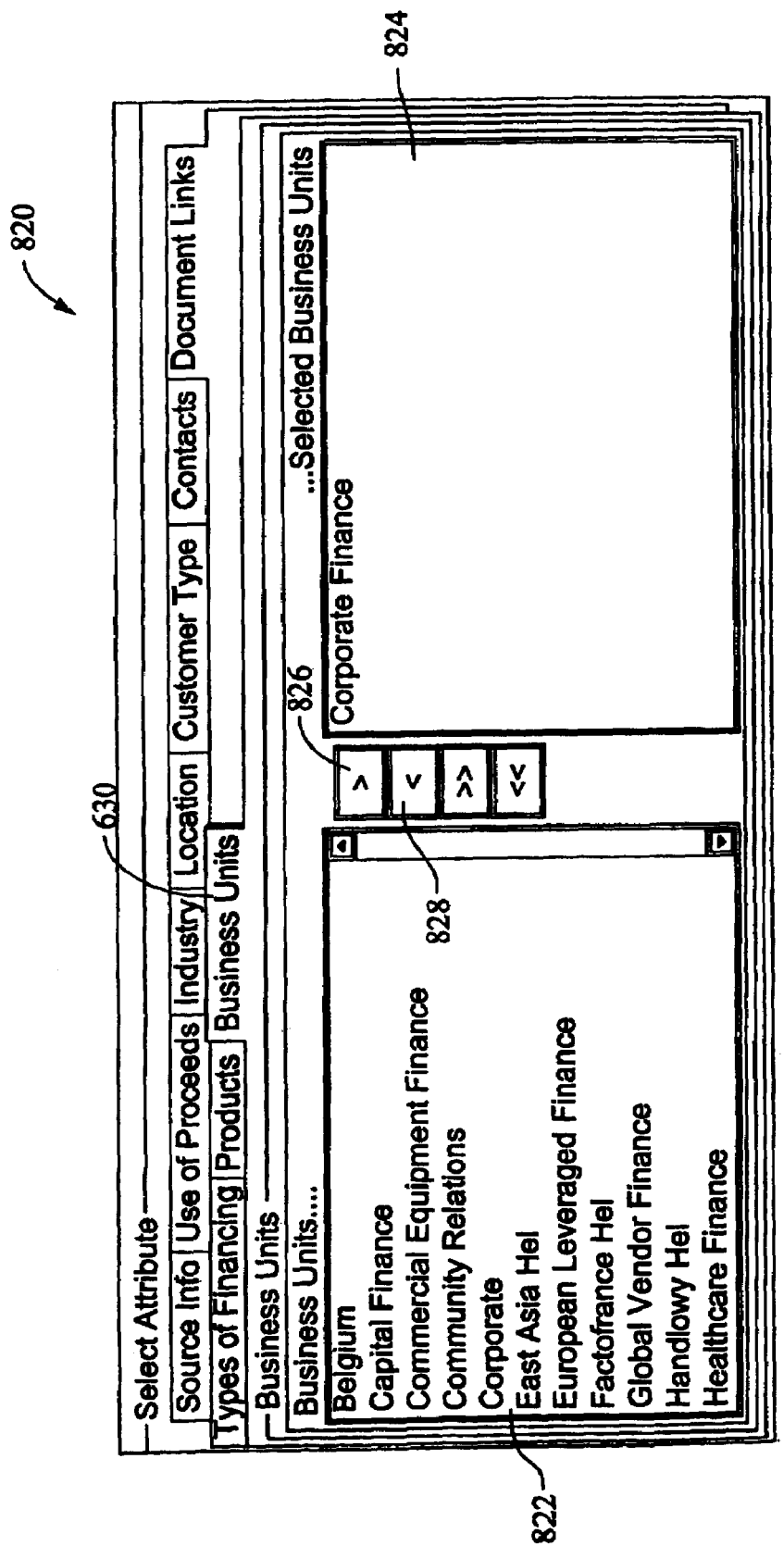
FIG. 25 is an example embodiment of a lower portion of a user interface of a WCMS illustrating a page for displaying and inputting business units information relating to a business entity.

FIG. 25 is an example embodiment of a lower portion of a user interface 820 displaying a lower portion of a screen within WCMS 10 (shown in FIG. 1) after a user has selected Business Units tab 630 on user interface 600 (shown in FIG. 15). User interface 820 displays a Business Units data field 822 and a Selected Business Units data field 824. Business Units data field 822 includes a predetermined list of a plurality of business units that may be applicable to the information being added or updated on WCMS 10 (shown in FIG. 1). In the exemplary embodiment, user interface 820 displays a right arrow button 826 and a left arrow button 828. Right arrow button 826 enables the user to add a highlighted business unit from Business Units data field 822 to Selected Business Units data field 824. Left arrow button 828 enables the user to delete a business unit from Selected Business Units data field 824. When the user has input the appropriate business units within Selected Business Units data field 824, the user selects Update button 632 (shown in FIG. 15). WCMS 10 then updates business information 150 (shown in FIGS. 3 and 4) stored on database 28 (shown in FIGS. 3 and 4) such that business information, including dynamic and re-purposed information, displayed on the business entity's web site is updated on all web pages within the web site.

Figure 26:
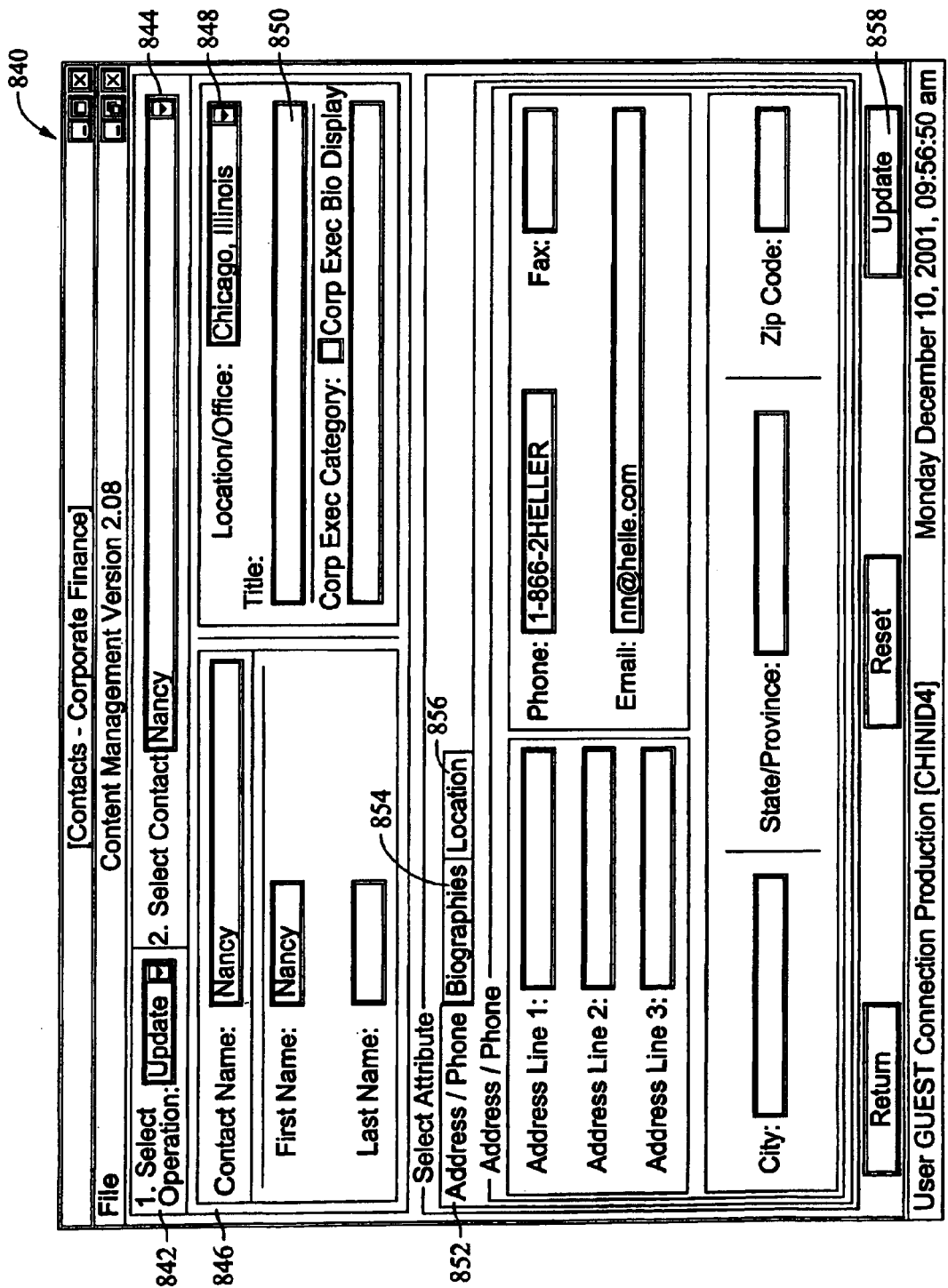
FIG. 26 is an example embodiment of a user interface of a WCMS displaying a home page for inputting information relating to contacts within a business entity.

FIG. 26 is an example embodiment of a user interface 840 displaying a home page in WCMS 10 (shown in FIG. 1) after a user has selected business group 151 (shown in FIG. 7), Contact Us 204 (shown in FIG. 7), and OK button 412 (shown in FIG. 7). User interface 840 enables a user to input contact information regarding persons to be contacted within each business group of a business entity. User interface 840 also enables the user to input and maintain biographies relating to the contact persons. The user has the option of creating a new record or updating an existing one. The user may also identify whether the contact person is for someone in a corporate executive group, i.e., CEO, CIO, CFO, etc. If the contact person is in the corporate executive group, then the user can designate the information such that the information is displayed on a corporate section on the business entity's web site as well as a business group section of the web site. In an example embodiment, user interface 840 illustrates a plurality of pull-down fields, data fields, and menu tabs including at least one of a Select Operation pull-down field 842, a Select Contact pull-down field 844, a Contact Name data field 846, a Location pull-down field 848, a Title data field 850, an Address/Phone tab 852, Biographies tab 854, and a Location tab 856. After the user has input business information 150 (shown in FIGS. 3 and 4) into WCMS 10, the user selects an Update button 858. WCMS 10 then updates business information 150 stored on database 28 (shown in FIGS. 3 and 4) such that business information 150, including dynamic and re-purposed information, displayed on the business entity's web site is updated on all web pages within the web site.

Figure 27:
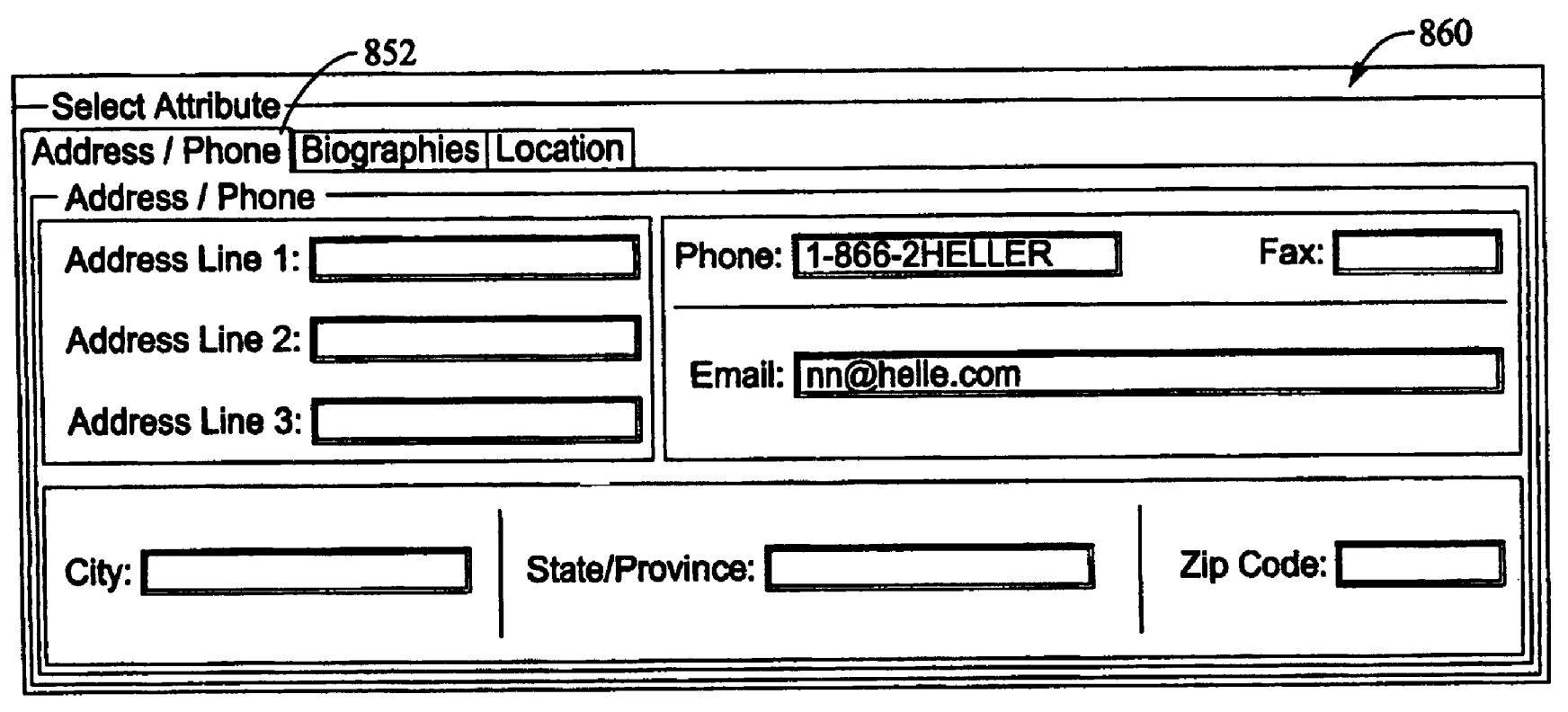

FIG. 27 is an example embodiment of a lower portion of a user interface 860 displaying a lower portion of a screen within WCMS 10 (shown in FIG. 1) after a user has selected Address/Phone tab 852 on user interface 840 (shown in FIG. 26). User interface 860 displays a plurality of data fields relating to a contact person's address and telephone number. The user inputs the information into the data fields, including the contact person's address, telephone number, facsimile number, and email address. When the user has input the appropriate information, the user selects Update button 858 (shown in FIG. 26). WCMS 10 then updates business information 150 (shown in FIGS. 3 and 4) stored on database 28 (shown in FIGS. 3 and 4) such that business information 150, including dynamic and re-purposed information, displayed on the business entity's web site is updated on all web pages within the web site.

Figure 28:
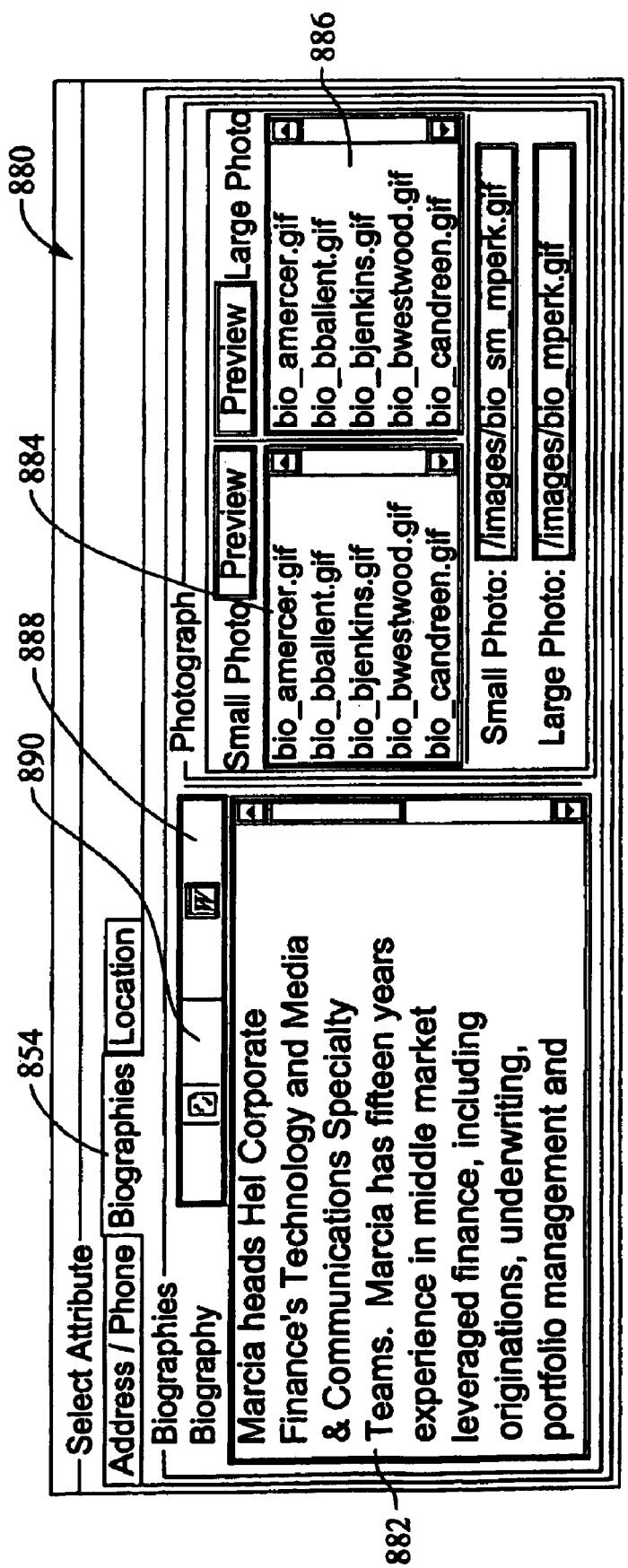
FIG. 28 is an example embodiment of a lower portion of a user interface of a WCMS illustrating a page for displaying and inputting biography information relating to a contact person within a business entity.

FIG. 28 is an example embodiment of a lower portion of a user interface 880 displaying a lower portion of a screen within WCMS 10 (shown in FIG. 1) after a user has selected Biographies tab 854 on user interface 840 (shown in FIG. 26). User interface 880 displays a plurality of data fields relating to a contact person's biography, including a biography data field 882, a small photo list 884, and a large photo list 886. User interface 880 enables a user to display and input biographical information relating to a contact person listed in WCMS 10, including business group executives. User interface 880 permits the user to format the biographical information as it will appear on the web page. In the example embodiment, to facilitate this data entry and HTML formatting, user interface 880 utilizes a word processing editor, for example Microsoft Word™ (Word is a trademark of Microsoft Corporation, Redmond, Wash.), which can be accessed directly from user interface 880 by selecting a Microsoft Word™ icon 888. In the example embodiment, when the user has completed utilizing the word processing program, the user selects a save button in the word processing interface and then refreshes user interface 880 by selecting a refresh icon 890 to display the updated information. In the example embodiment, user interface 880 permits the user to select at least two different images from small photo list 884 and large photo list 886 to be displayed on the business entity's web site with the contact person's biography.

Figure 29:
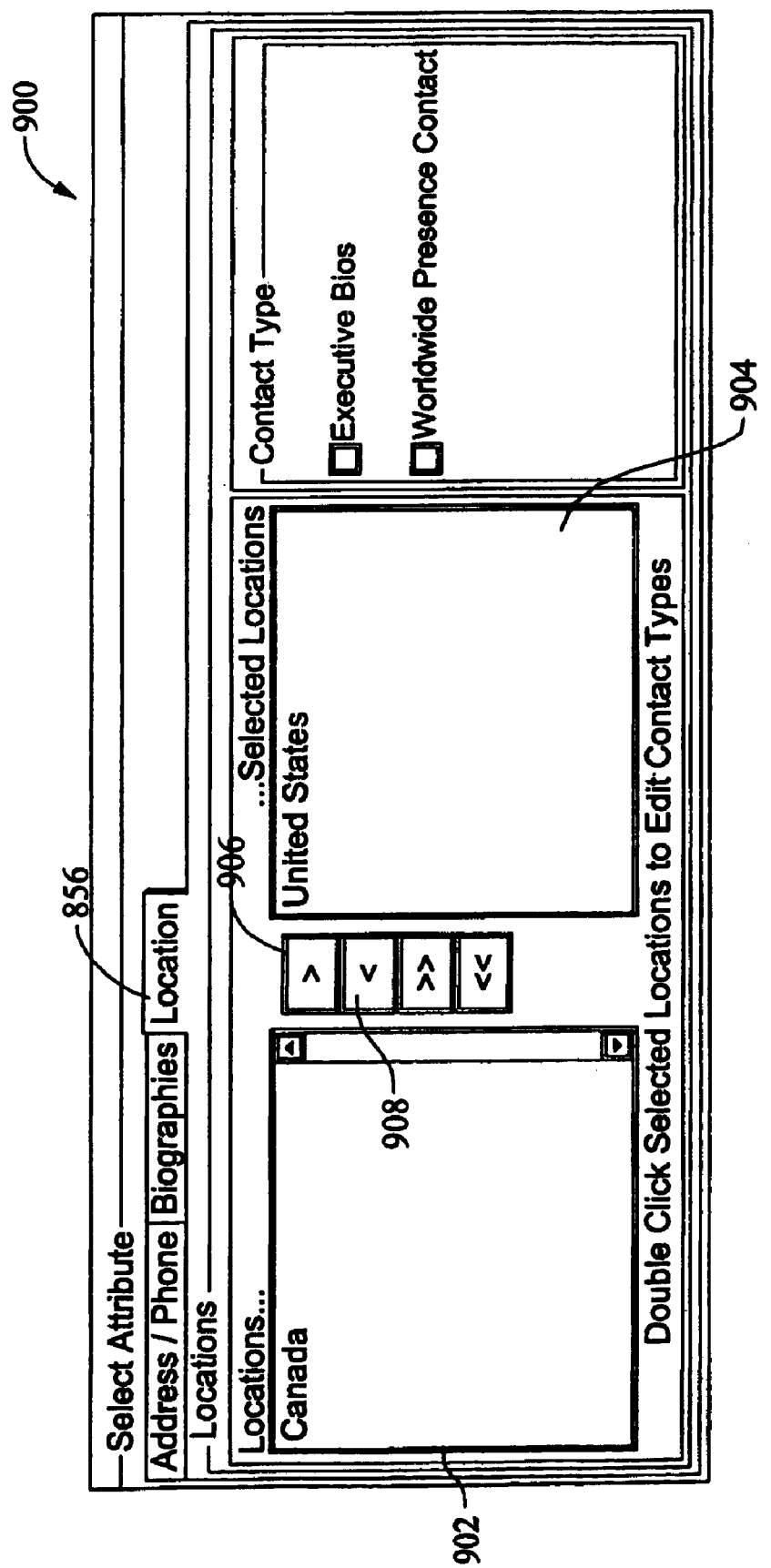
FIG. 29 is an example embodiment of a lower portion of a user interface of a WCMS illustrating a page for displaying and inputting location information relating to a contact person within a business entity.

FIG. 29 is an example embodiment of a lower portion of a user interface 900 displaying a lower portion of a screen within WCMS 10 (shown in FIG. 1) after a user has selected Location tab 856 on user interface 840 (shown in FIG. 26). User interface 900 displays a Locations field 902 and a Selected Locations data field 904. Locations data field 902 includes a predetermined list of a plurality of locations that the user may select from to identify where the contact person is located. In the example embodiment, user interface 900 displays a right arrow button 906 and a left arrow button 908. Right arrow button 906 enables the user to add a highlighted location from Locations data field 902 to Selected Locations data field 904. Left arrow button 908 enables the user to delete a location from Selected Locations data field 904. When the user has input the appropriate locations within Selected Locations data field 904, the user selects Update button 858 (shown in FIG. 26). WCMS 10 then updates business information 150 (shown in FIGS. 3 and 4) stored on database 28 (shown in FIGS. 3 and 4) such that business information 150, including dynamic and re-purposed information, displayed on the business entity's web site is updated on all web pages within the web site.

Figure 30:
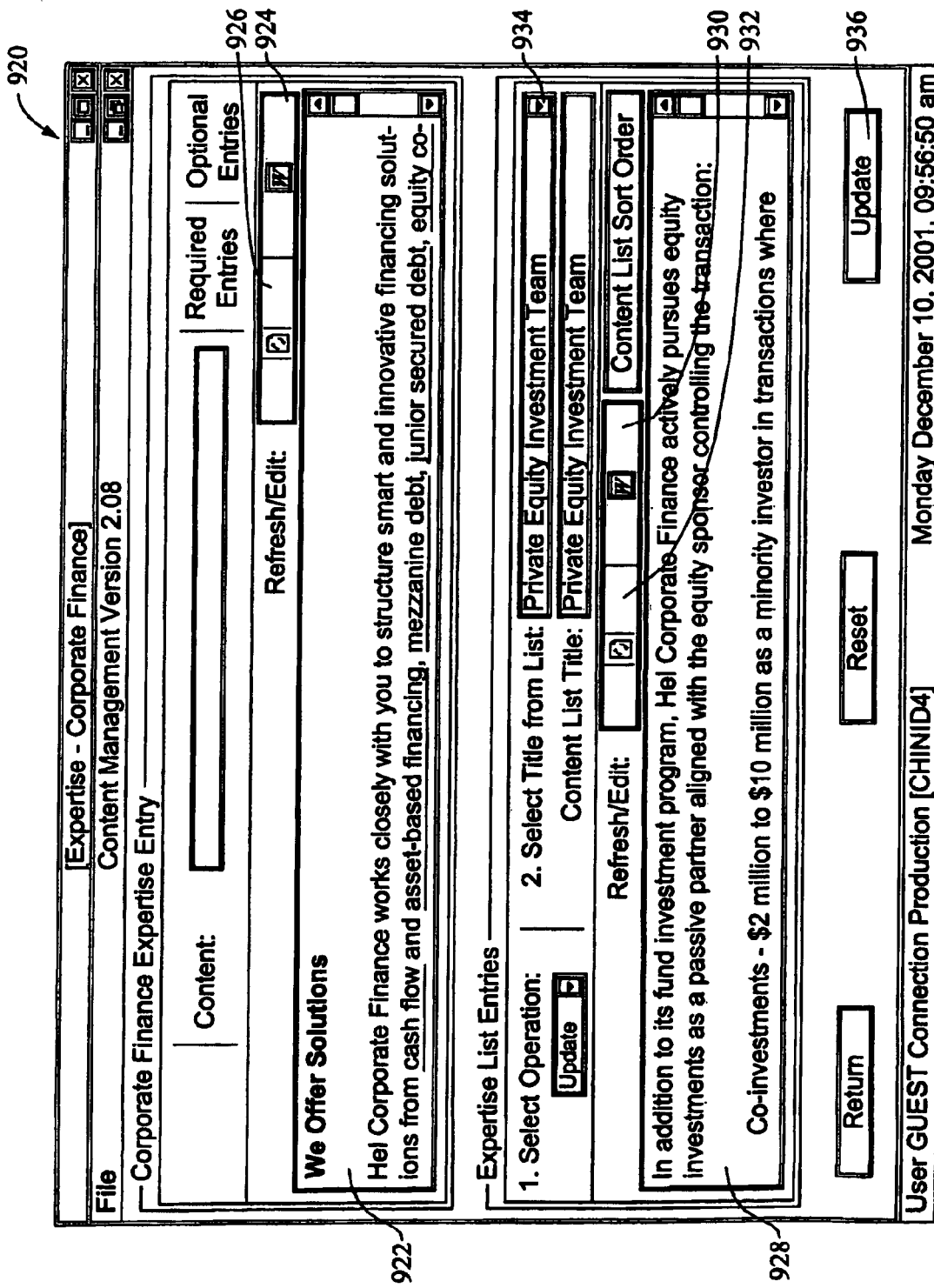
FIG. 30 is an example embodiment of a user interface of a WCMS displaying a home page for inputting information relating to a business entity's expertise.

FIG. 30 is an example embodiment of a user interface 920 displaying a home page in WCMS 10 (shown in FIG. 1) after a user has selected business group 151 (shown in FIG. 7), Expertise 206 (shown in FIG. 7), and OK button 412 (shown in FIG. 7). User interface 920 enables a user to input areas of expertise for each business group within a business entity. In the example embodiment, user interface 920 permits the user to input general information relating to an expertise of a business group in general data field 922. User interface 920 permits the user to format the general information using a word processing editor, for example Microsoft Word™ (Word is a trademark of Microsoft Corporation, Redmond, Wash.), which can be accessed directly from user interface 920 by selecting a Microsoft Word™ icon 924. In the example embodiment, when the user has completed using the word processing program for inputting the general expertise information, the user selects a save button in the word processing interface and then selects a refresh/edit button 926 to display the updated information.

In the example embodiment, user interface 920 also permits the user to input specific information relating to an expertise of each business group within the business entity. The user inputs the specific information in specific data field 928. User interface 920 permits the user to format the specific information using a word processing editor, for example Microsoft Word™ (Word is a trademark of Microsoft Corporation, Redmond, Wash.), which can be accessed directly from user interface 920 by selecting a Microsoft Word™ icon 930. In the example embodiment, when the user has completed using the word processing program for inputting the specific expertise information, the user selects a save button in the word processing interface and then selects a refresh/edit button 932 to display the updated information. User interface 920 also displays a content list pull-down field 934, which includes the areas of expertise for a corresponding business group. In the exemplary embodiment, the areas of expertise include at least one of the following: Intermediary Team; Private Equity Investment Team; Corporate Finance Capital Markets; Financial Advisors; Industries, Transactors, Sample Deals; Cash Flow Financing; and Asset-Based Financing. After the user has input business information 150 (shown in FIGS. 3 and 4) into WCMS 10, the user selects Update button 936. WCMS 10 then updates business information 150 stored on database 28 (shown in FIGS. 3 and 4) such that business information 150, including dynamic and re-purposed information, displayed on the business entity's web site is updated on all web pages within the web site.

Figure 31:
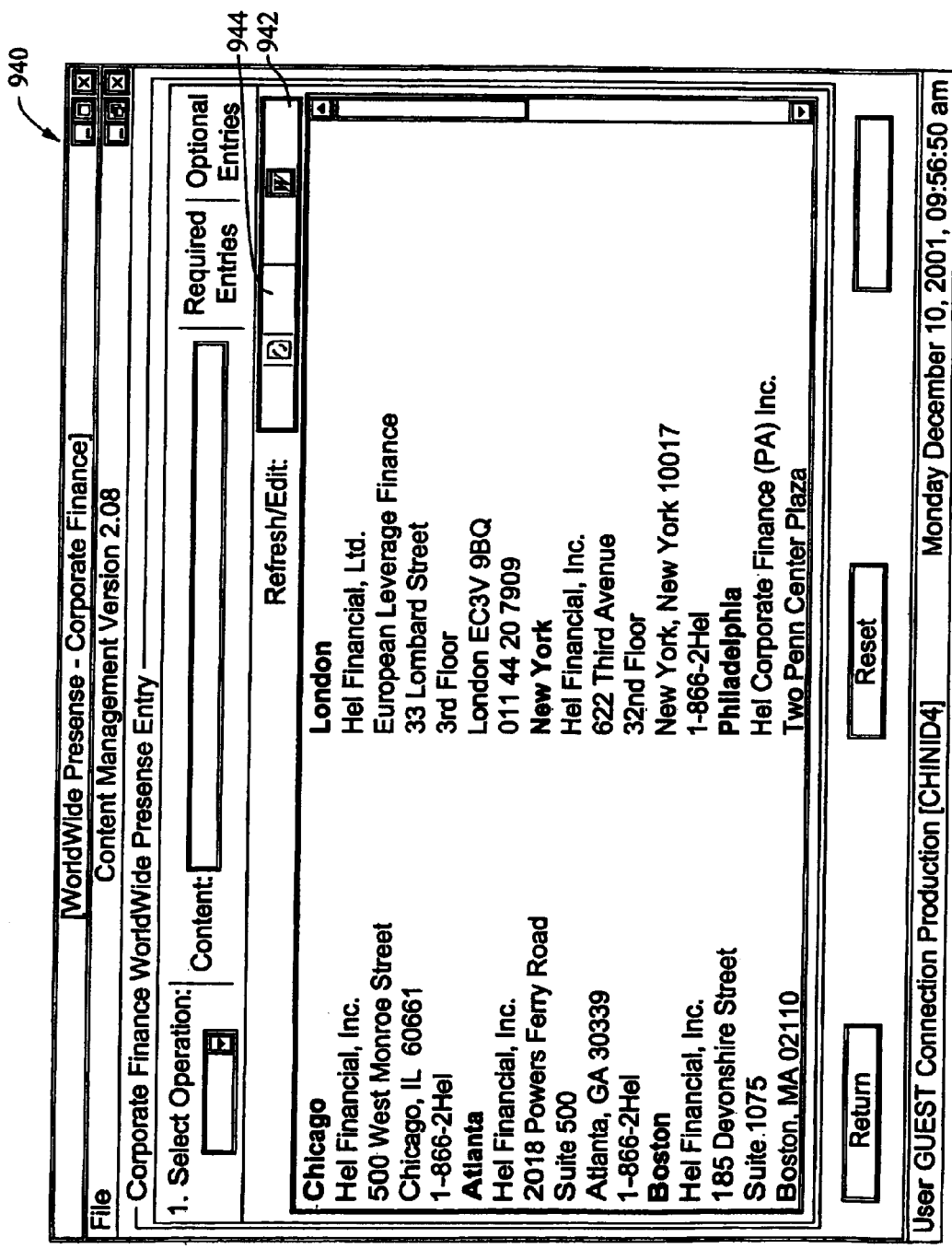
FIG. 31 is an example embodiment of a user interface of a WCMS displaying a home page for inputting information relating to a business entity's worldwide presence.

FIG. 31 is an example embodiment of a user interface 940 displaying a home page in WCMS 10 (shown in FIG. 1) after a user has selected business group 151 (shown in FIG. 7), Worldwide Presence 208 (shown in FIG. 7), and OK button 412 (shown in FIG. 7). User interface 940 enables a user to input and display the locations throughout the world where each business group within the business entity does business. In the example embodiment, user interface 940 permits the user to format the location information using a word processing editor, for example Microsoft Word™ (Word is a trademark of Microsoft Corporation, Redmond, Wash.), which can be accessed directly from user interface 940 by selecting a Microsoft Word™ icon 942. In the example embodiment, when the user has completed using the word processing program for inputting the location information, the user selects a save button in the word processing interface and then refreshes user interface 940 by selecting a refresh/edit icon 944 to display the updated location information. After the user has input business information 150 (shown in FIGS. 3 and 4) into WCMS 10, the user selects Update button (not shown in FIG. 31). WCMS 10 then updates business information 150 stored on database 28 (shown in FIGS. 3 and 4) such that business information 150, including dynamic and re-purposed information, displayed on the business entity's web site is updated on all web pages within the web site.

Figure 32:
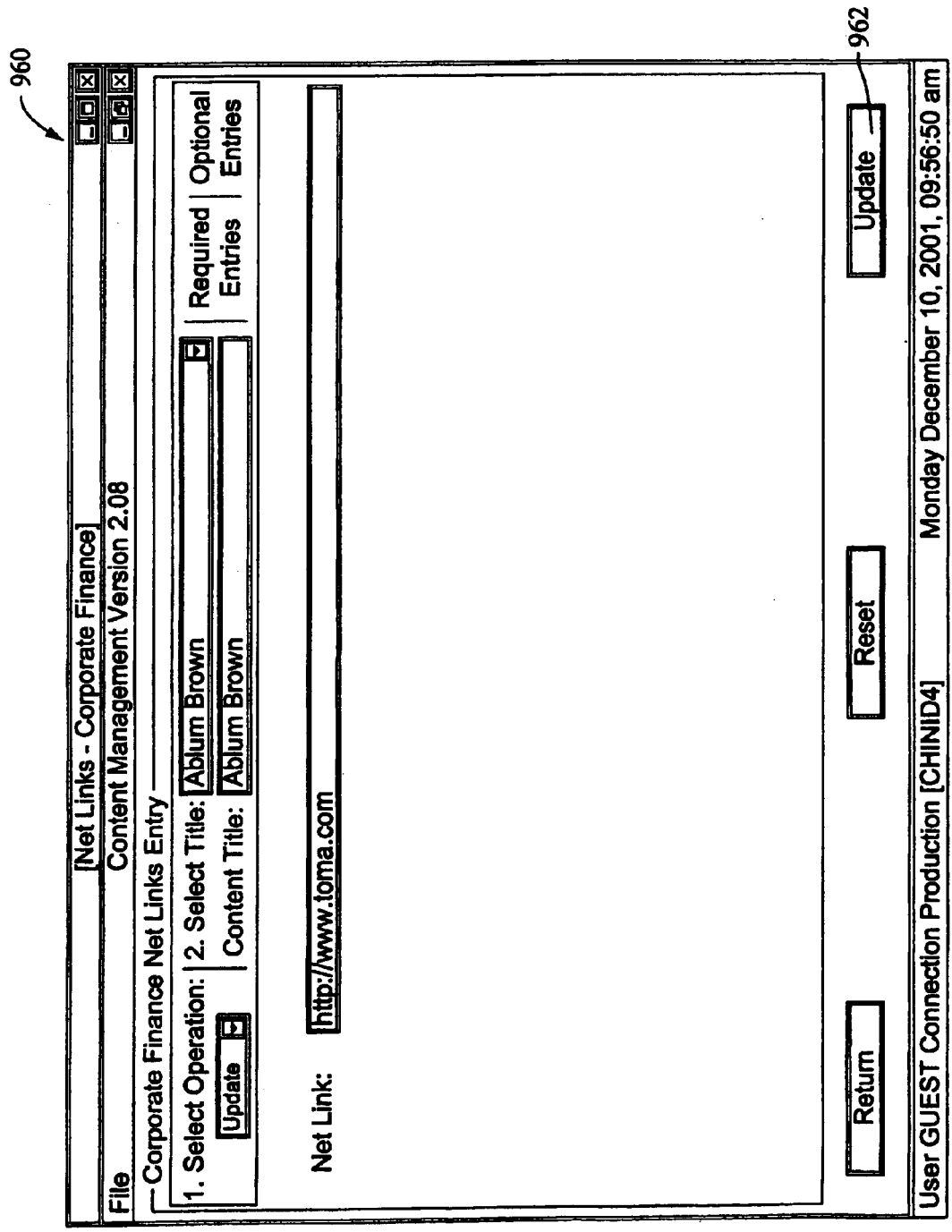
FIG. 32 is an example embodiment of a user interface of a WCMS displaying a home page for inputting information relating to net links for a business entity.

FIG. 32 is an example embodiment of a user interface 960 displaying a home page in WCMS 10 (shown in FIG. 1) after a user has selected business group 151 (shown in FIG. 7), Net Links 210 (shown in FIG. 7), and OK button 412 (shown in FIG. 7). User interface 960 enables a user to input and display a plurality of web sites that relate to each business group within a business entity. When the user has input the appropriate information, the user selects an Update button 962. WCMS 10 then updates business information 150 (shown in FIGS. 3 and 4) stored on database 28 (shown in FIGS. 3 and 4) such that business information 150, including dynamic and re-purposed information, displayed on the business entity's web site is updated on all web pages within the web site.

Figure 33:
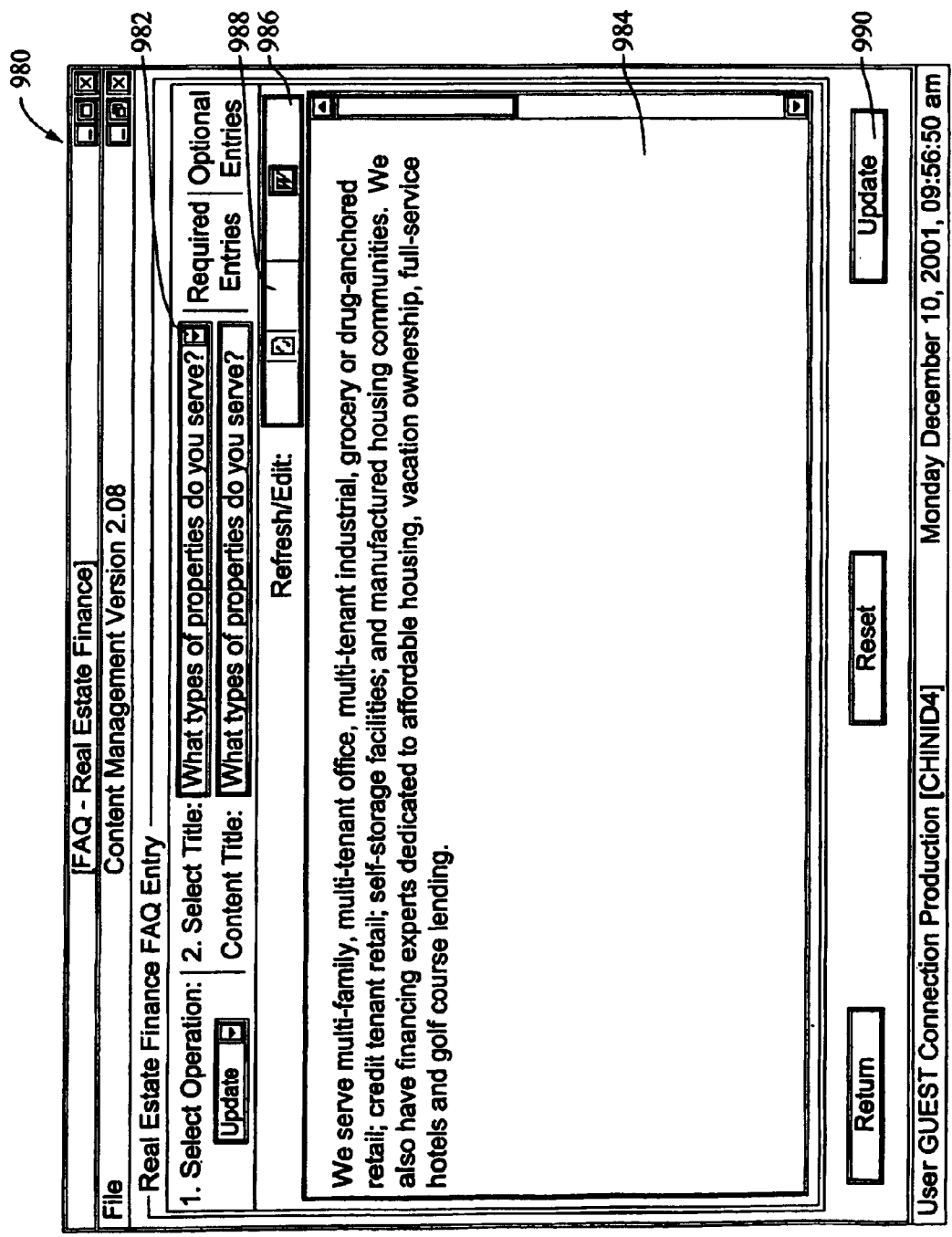
FIG. 33 is an example embodiment of a user interface of a WCMS displaying a home page for inputting frequently asked question information relating to a business entity.
Figure 35A:
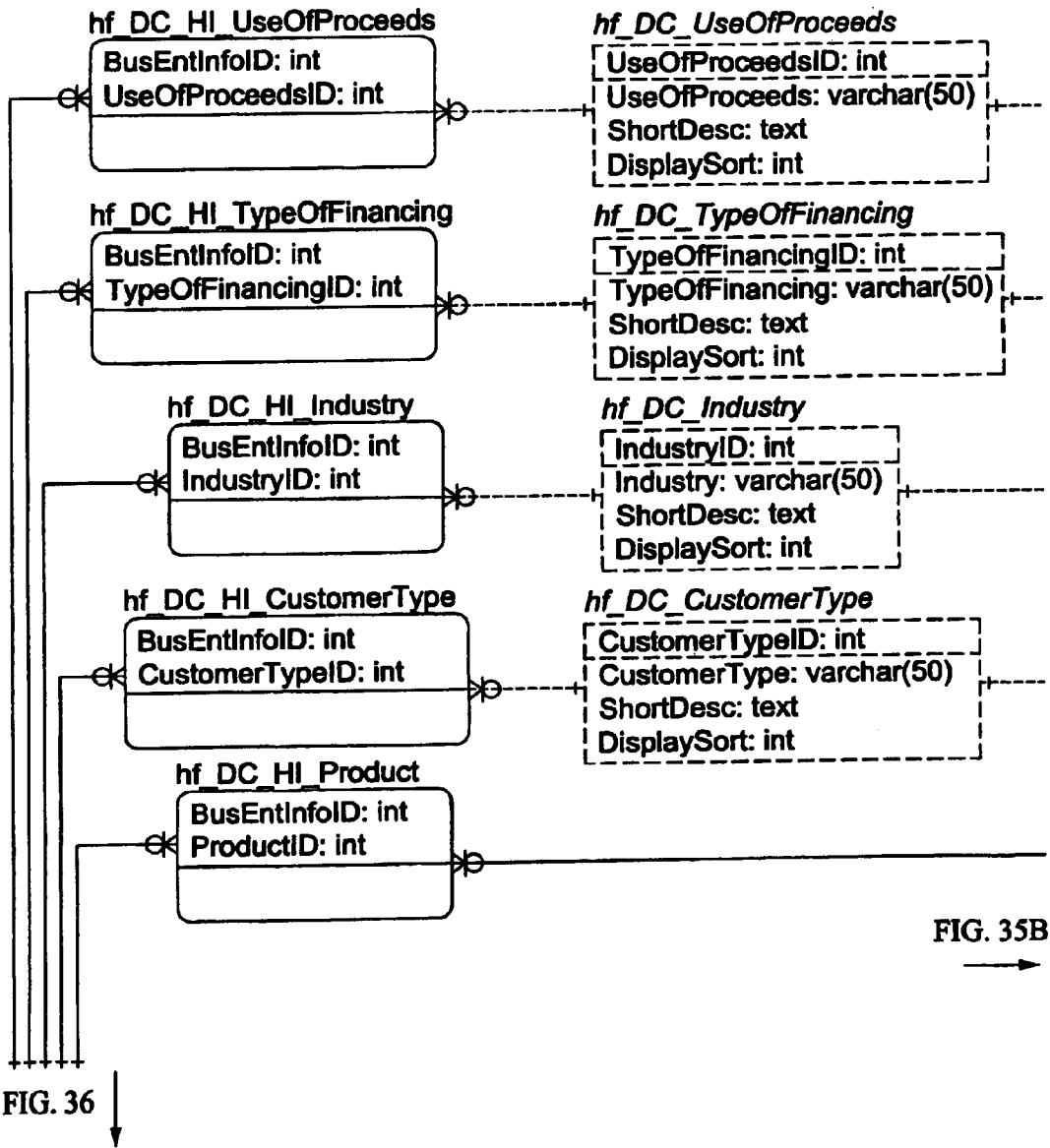
FIGS. 35A and 35B illustrate a first portion of an example embodiment of at least one data specification chart for a WMCS.
Figures 35A, 35B, 36:
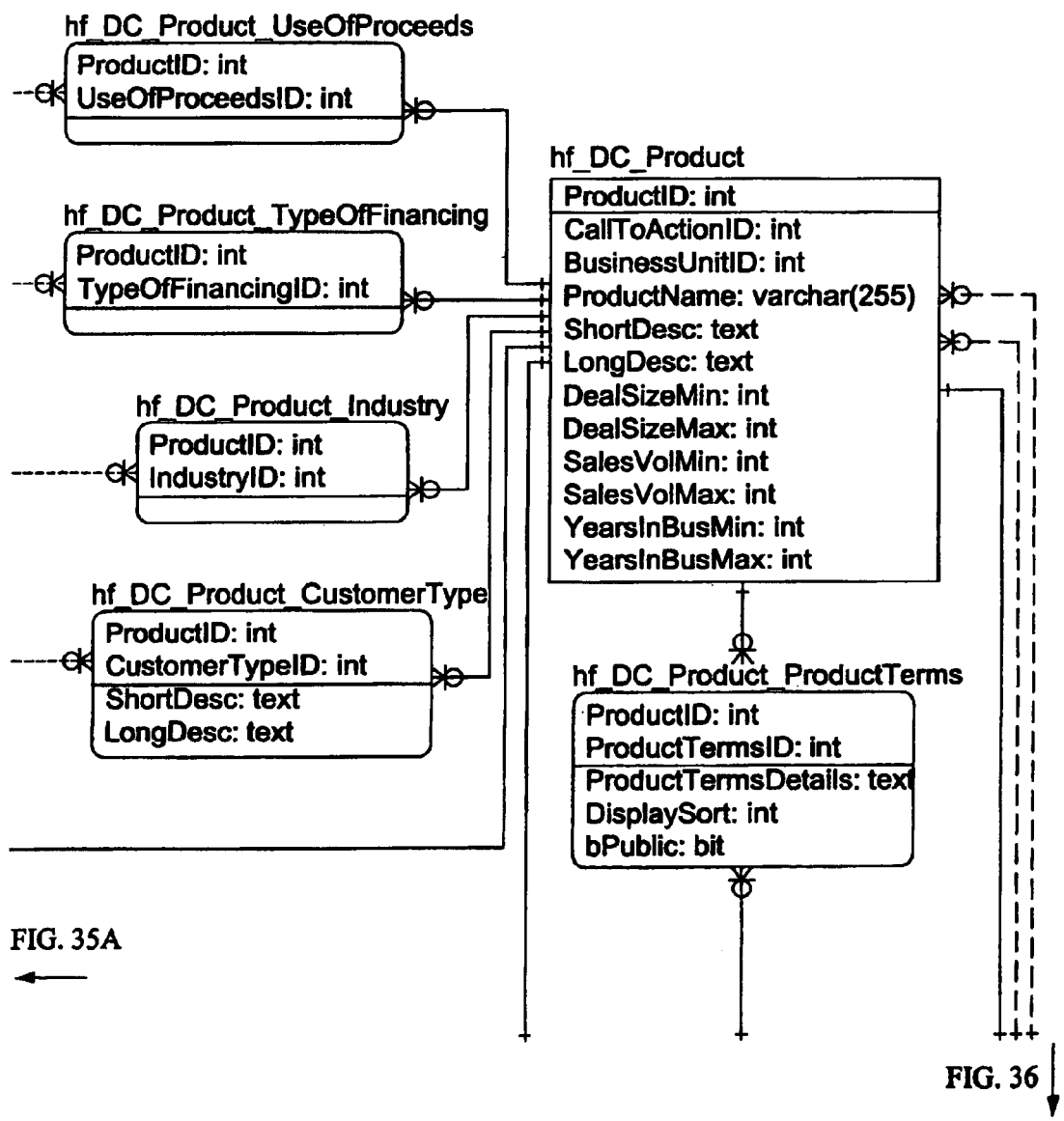
Figure 36A:
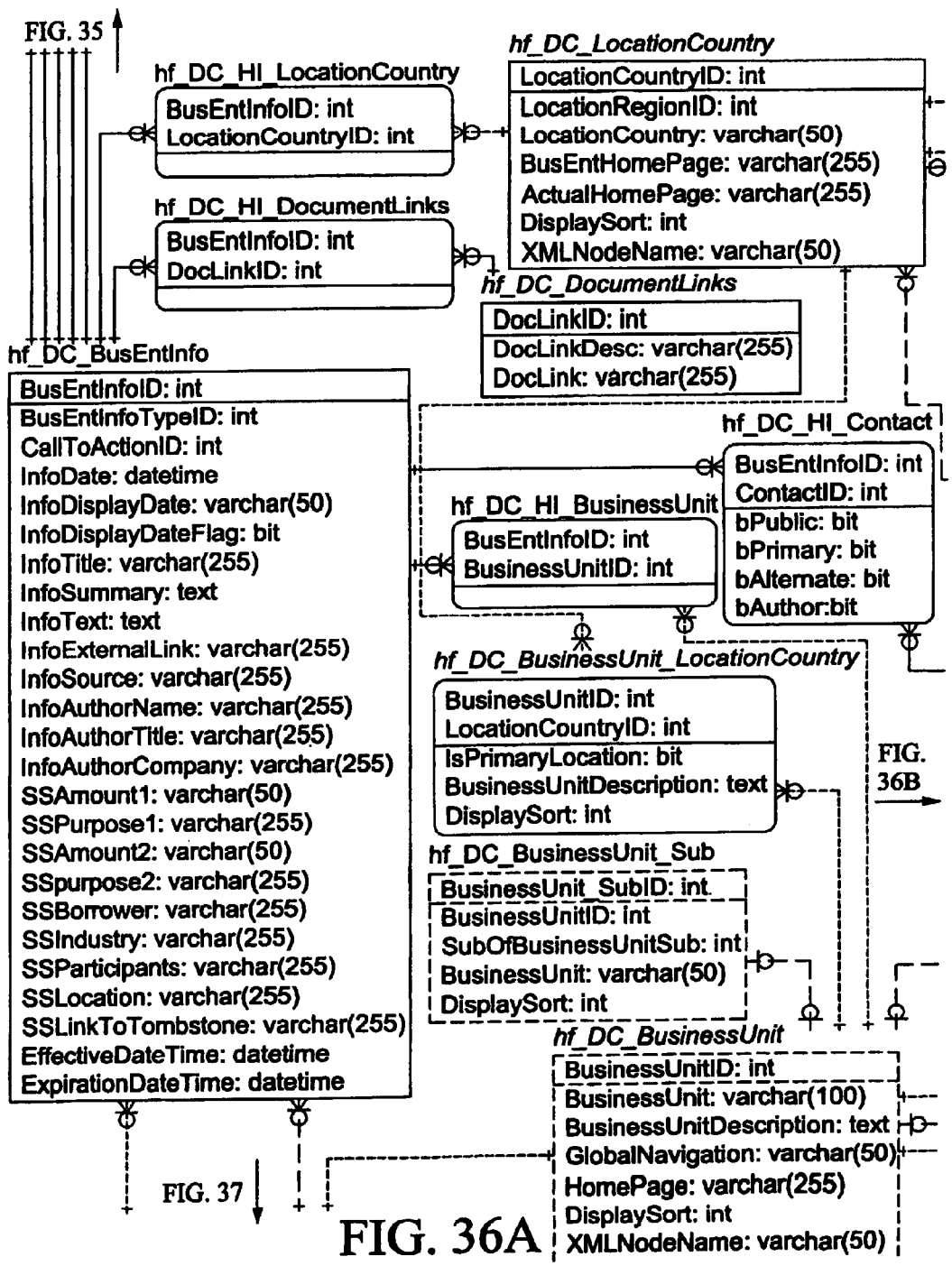
FIGS. 36A and 36B illustrate a second portion of an example embodiment of at least one data specification chart for a WMCS.
Figure 36B:
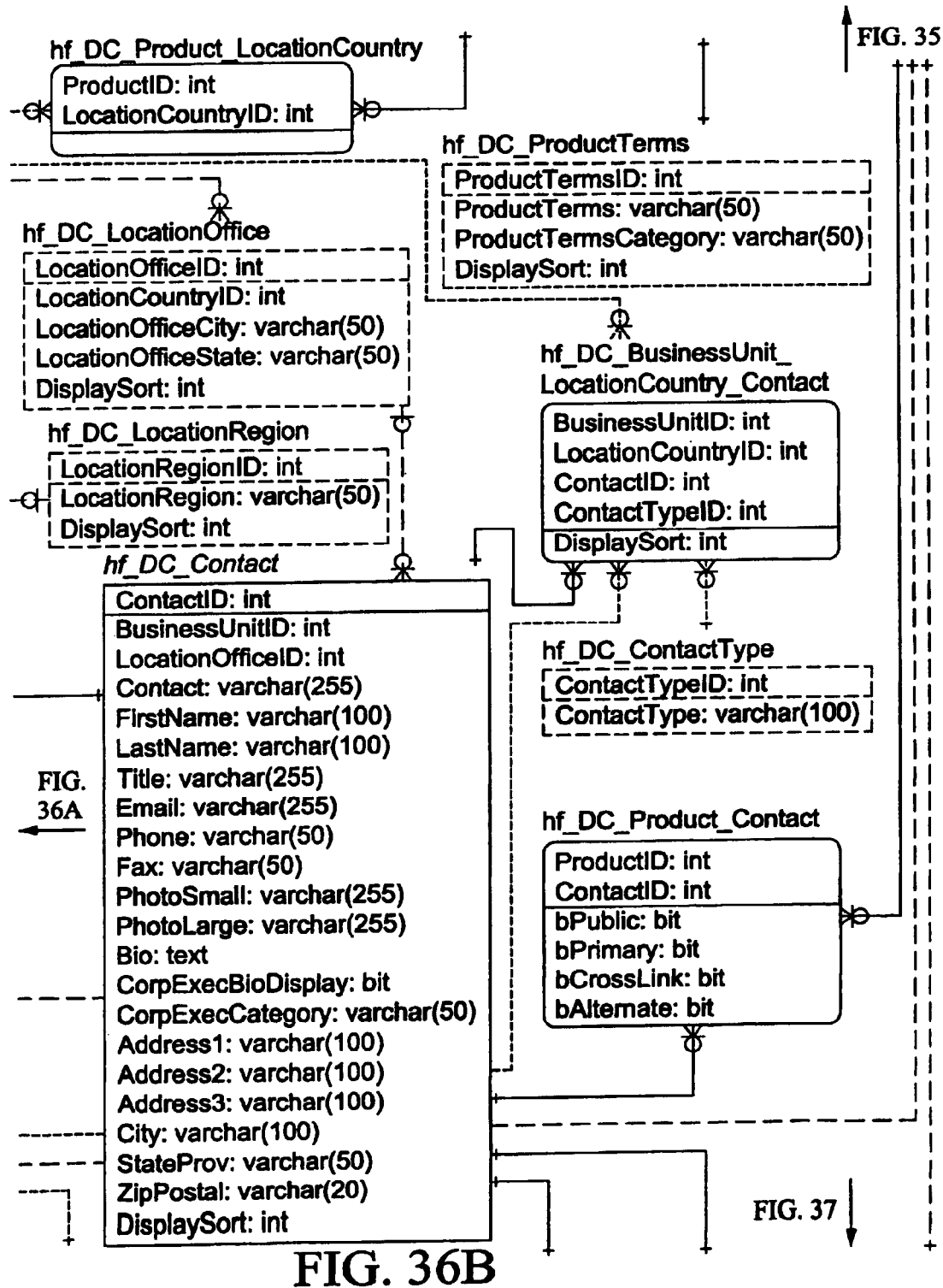
Figure 37A:
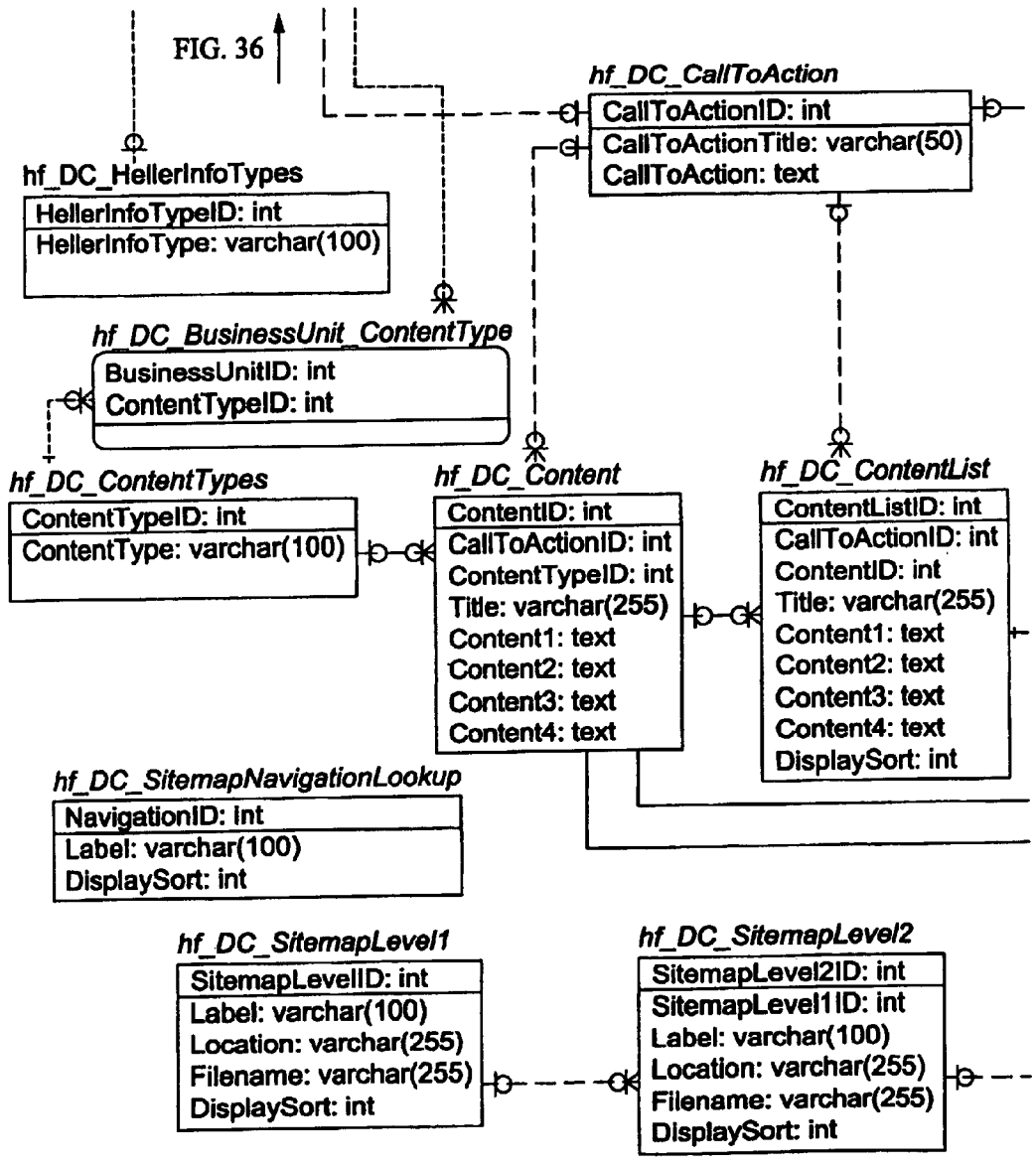

FIG. 33 is an example embodiment of a user interface 980 displaying a home page in WCMS 10 (shown in FIG. 1) after a user has selected business group 151 (shown in FIG. 7), FAQ 212 (shown in FIG. 7), and OK button 412 (shown in FIG. 7). User interface 980 enables a user to input and display frequently asked questions (FAQ) and responses to the FAQ for each business group within the business entity. The FAQ is inputted and displayed in data field 982, and the response to the FAQ is inputted and displayed in data field 984. In the example embodiment, user interface 980 permits the user to format the FAQ information, including the response, utilizing a word processing editor, for example Microsoft Word™ (Word is a trademark of Microsoft Corporation, Redmond, Wash.), which can be accessed directly from user interface 980 by selecting a Microsoft Word™ icon 986. In the example embodiment, when the user has completed using the word processing program for inputting the FAQ information, the user selects a save button in the word processing interface and then refreshes user interface 980 by selecting a refresh/edit icon 988 to display the updated FAQ information. After the user has input business information 150 (shown in FIGS. 3 and 4) into WCMS 10, the user selects Update button 990. WCMS 10 then updates business information 150 stored on database 28 (shown in FIGS. 3 and 4) such that business information 150, including dynamic and re-purposed information, displayed on the business entity's web site is updated on all web pages within the web site.

Figure 34:
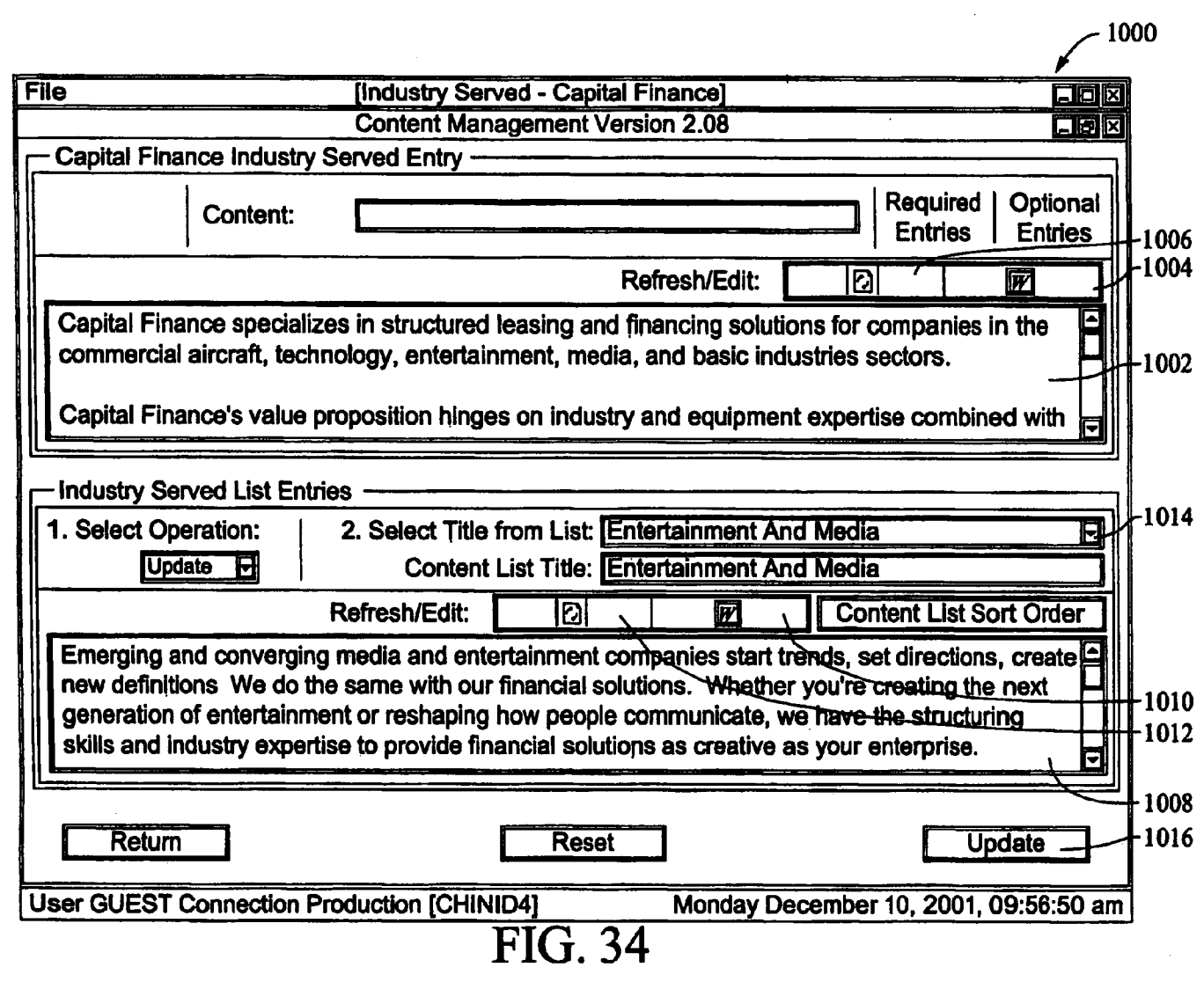

FIG. 34 is an example embodiment of a user interface 1000 displaying a home page in WCMS 10 (shown in FIG. 1) after a user has selected business group 151 (shown in FIG. 7), Industry Served 214 (shown in FIG. 7), and OK button 412 (shown in FIG. 7). User interface 1000 enables a user to input the industries served by each business group within a business entity. In the example embodiment, user interface 1000 permits the user to generally input the industries served by a business group in general data field 1002. User interface 1000 permits the user to format the general information using a word processing editor, for example Microsoft Word™ (Word is a trademark of Microsoft Corporation, Redmond, Wash.), which can be accessed directly from user interface 1000 by selecting a Microsoft Word™ icon 1004. In the example embodiment, when the user has completed using the word processing program for inputting the general industries served information, the user selects a save button in the word processing interface and then refreshes user interface 1000 by selecting a refresh/edit button 1006 to display the updated information.

In the example embodiment, user interface 1000 also permits the user to input specific information relating to the industries served by each business group within the business entity. The user inputs the specific information in specific data field 1008. User interface 1000 permits the user to format the specific information using a word processing editor, for example Microsoft Word™ (Word is a trademark of Microsoft Corporation, Redmond, Wash.), which can be accessed directly from user interface 1000 by selecting a Microsoft Word™ icon 1010. In the example embodiment, when the user has completed using the word processing program for inputting the specific expertise information, the user selects a save button in the word processing interface and then refreshes user interface 1000 by selecting a refresh/edit button 1012 to display the updated information. User interface 1000 also displays a content list pull-down field 1014, which includes a list of various industries served by the corresponding business group that the user can select from. After the user has input the appropriate industries served information, the user selects an Update button 1016. WCMS 10 then updates business information 150 (shown in FIGS. 3 and 4) stored on database 28 (shown in FIGS. 3 and 4) such that business information 150, including dynamic and re-purposed information, displayed on the business entity's web site is updated on all web pages within the web site.

FIGS. 35A, 35B, 36A, 36B, 37A, and 37B illustrate an exemplary embodiment of at least one data specification chart for WMCS 10 (shown in FIG. 1).

WCMS 10 therefore enables a user to manage, including collecting, tracking, displaying, and disseminating, real time business information on a web site. More specifically, WCMS 10 enables a user to add, update and delete dynamic and re-purposed business information displayed on a business entity's web site from a single location on a single workstation. In other words, WCMS 10 enables a user to add, update, and delete business information that may be displayed on multiple web pages within a web site in a single location on a single workstation. Finally, WCMS 10 enables a user to validate the business information added, updated, and deleted on a business entity's web site prior to adding, updating, and deleting the selected business information. By enabling a business entity to better manage business information on a web site, including dynamic and re-purposed information, WMCS 10 facilitates reducing multiple data entry, data entry time, and the likelihood of incorrect or inconsistent information appearing on different web pages within a business entity's web site.

While the invention has been described in terms of various specific embodiments, those skilled in the art will recognize that the invention can be practiced with modification within the spirit and scope of the claims.

What is claimed is:

1. A method for managing information on a web site for a business entity using a server system coupled to a centralized database and at least one client system, said method comprising:
   storing information in the centralized database;
   displaying, on more than one web page within the business entity web site, data including at least a portion of the information stored in the database;
   accessing a content management tool to display at least one pre-defined template on the client system for prompting a user to enter new information including at least one of newly added information, updated existing information, and deleted existing information;
   entering the new information into the at least one pre-defined template displayed on the client system;
   updating the centralized database by storing the new information therein;
   tracking the information including the new information stored in the database by:
      parsing the new information into a plurality of data segments for storing within a plurality of corresponding sections included within the database;
      automatically storing the plurality of data segments within the plurality of corresponding sections of the database; and
      linking each of the plurality of data segments stored within the database with multiple locations displayed on multiple web pages included within the business entity web site; and
   automatically updating each web page included within the business entity web site that displays information corresponding with the new information by accessing the plurality of data segments linked to each web page being updated within the database and updating the corresponding information displayed on each web page with the new information.

2. The method in accordance with claim 1 wherein accessing a content management tool to display at least one pre-defined template on the client system further comprises providing a plurality of pre-defined templates displayable on the client system for prompting a user to enter new information relating to financial products and services offered by the business entity, wherein the plurality of pre-defined templates include a type of financing template, a use of proceeds template, a type of industry template, a location template, a customer type template, a contacts template, and a product terms template.

3. The method in accordance with claim 2 wherein receiving information comprises receiving business information that includes products and services offered by the business entity along with news, earnings releases, press releases, newsletters, papers, presentations, articles, perspectives, success stories, contact information, expertise, locations, recommended Internet links, frequently asked questions, and industries served by the business entity.

4. The method in accordance with claim 2 wherein receiving information comprises receiving information input through the client system for the business entity.

5. The method in accordance with claim 2 wherein receiving information comprises utilizing a word processing computer program to enter information into the server system through the client system.

6. The method in accordance with claim 1 wherein tracking information comprises compiling a report that includes information relating to the business entity including at least one of source information, use of proceeds, industry, location, customer type, contacts, document links, types of financing, products, and business units.

7. The method in accordance with claim 1 wherein tracking information comprises compiling a report that includes information relating to a contact person within each business group in the business entity including at least one of address and telephone number, biographies, and location.

8. The method in accordance with claim 1 wherein tracking information comprises compiling a report that includes information relating to at least one of a business entity's expertise, worldwide presence, recommended Internet links, frequently asked questions and industries served.

9. The method in accordance with claim 1 wherein accessing a content management tool further comprises:
   comparing the new information to the existing information stored in the centralized database;
   determining the information to be updated by the new information;
   selecting each web page included within the business entity web site that displays information to be updated by the new information; and
   automatically updating each selected web page included within the business entity web site with the new information.

10. The method in accordance with claim 1 wherein accessing a content management tool further comprises:
    receiving the new information at the server system on a single occasion through a single client system;
    validating the new information received through the client system;
    comparing the new information to the existing information stored on the centralized database;
    determining the information to be updated by the new information;
    selecting each web page included within the business entity web site that displays information to be updated by the new information; and
    automatically updating each selected web page included within the business entity web site with the new information including updating dynamic and re-purposed information displayed on more than one web page within the business entity web site.

11. The method in accordance with claim 1 further comprising providing information stored in the centralized database in response to an inquiry.

12. The method in accordance with claim 11 wherein providing information comprises:
    displaying designated business groups within the business entity on the client system for a user; and
    receiving an inquiry from the client system regarding at least one of the business groups.

13. The method in accordance with claim 11 wherein providing information comprises:
    displaying information on the client system regarding at least one of a product and service offered by the business entity, information relating to the business entity, information relating to a contact person within each business group in the business entity, and information relating to at least one of a business entity's expertise, worldwide presence, recommended Internet links, frequently asked questions, and industries served; and
    receiving an inquiry from the client system regarding at least one of a product and service offered by the business entity, information relating to the business entity, information relating to a contact person within each business group in the business entity, and information relating to at least one of a business entity's expertise, worldwide presence, recommended Internet links, frequently asked questions, and industries served.

14. The method in accordance with claim 11 wherein providing information comprises:
    accessing the centralized database;
    searching the database regarding the specific inquiry;
    retrieving information from the database; and
    transmitting the retrieved information to the client system for display by the client system.

15. The method in accordance with claim 1 further comprising connecting the client system and the server system via a network that includes one of a wide area network, a local area network, an intranet and the Internet.

16. A method for managing business information on a web site for a business entity using a server system coupled to a centralized database and at least one client system, said method comprising:
    receiving at the server system through the client system business information including data relating to products and services offered by the business entity along with at least one of news, earnings releases, press releases, newsletters, papers, presentations, articles, perspectives, success stories, contact information, expertise, locations, net links, frequently asked questions, and industries served by the business entity;
    validating the business information;
    storing the validated business information in the centralized database;
    displaying, on more than one web page within the business entity web site, data including at least a portion of the validated business information stored in the database;
    accessing a content management tool to display at least one pre-defined template on the client system for prompting a user to enter new business information including at least one of newly added business information, updated existing business information, and deleted existing business information;
    entering the new business information into the at least one pre-defined template displayed on the client system;
    updating the centralized database by storing the new business information therein;
    selecting each web page included within the business entity web site that displays business information updated by the new business information; and
    automatically updating each selected web page based on the new business information stored within the database, the automatic update is initiated without a request from the at least one client system.

17. The method in accordance with claim 16 wherein receiving at the server system business information comprises utilizing a word processing computer program to format the business information entered into the server system through the client system.

18. The method in accordance with claim 16 wherein validating business information comprises confirming that the business information entered into the server system through the client system has been accurately entered.

19. The method in accordance with claim 16 further comprising tracking business information stored in the centralized database.

20. The method in accordance with claim 19 wherein tracking business information comprises:

compiling a report that includes information relating to at least one of a product and service offered by the business entity including at least one of a type of financing, a use of proceeds, a type of industry, a location, a customer type, a contact person, and a product term;

compiling a report that includes information relating to the business entity including at least one of source information, use of proceeds, industry, location, customer type, contacts, document links, types of financing, products, and business units;

compiling a report that includes information relating to a contact person within each business group in the business entity including at least one of address and telephone number, biographies, and location; and compiling a report that includes information relating to at least one of the business entity's expertise, worldwide presence, recommended Internet links, frequently asked questions, and industries served.

21. The method in accordance with claim 16 wherein updating the centralized database comprises:

validating the new business information;

comparing the new business information to the existing business information stored in one centralized database;

determining the business information to be updated by the new business information;

selecting each web page included within the business entity web site that displays business information to be updated by the new business information; and automatically updating each selected web page included within the business entity web site with the new business information, wherein the automatic update is initiated without a request from the at least one client system.

22. The method in accordance with claim 16 wherein updating the centralized database comprises:

receiving new business information at the server system entered on a single occasion through a single web page on a single client system;

validating the new business information;

parsing the new business information into a plurality of data segments for storing within a plurality of corresponding sections included within the database;

automatically storing the plurality of data segments within the plurality of corresponding sections of the database;

linking each of the plurality of data segments stored within the database with multiple locations displayed on multiple web pages included within the business entity web site; and automatically updating each web page included within the business entity web site including updating dynamic and re-purposed information displayed on more than one web page within the business entity web site by updating at least one of the plurality of data segments stored within the database and linked to the web pages.

23. A network based system for managing business information on a web site for a business entity, said system comprising:

a client system comprising a browser;

a centralized database for storing information; and a server system configured to be coupled to said client system and said database, said server system further configured to:

store business information in said centralized database;

display, on more than one web page within the business entity web site, data including at least a portion of the business information stored in the database;

display at least one pre-defined template on the client system for prompting a user to enter new business information including at least one of newly added business information, updated existing business information, and deleted existing business information;

prompt the user to enter the new business information into the at least one pre-defined template displayed on the client system;

update said centralized database by storing the new business information therein;

track the information including the new information stored in said database by:

parsing the new business information into a plurality of data segments for storing within a plurality of corresponding sections included within said database, automatically storing the plurality of data segments within the plurality of corresponding sections of said database, and linking each of the plurality of data segments stored within said database with multiple locations displayed on multiple web pages included within the business entity web site; and automatically update each web page included within the business entity web site that displays business information corresponding with the new business information by accessing the plurality of data segments linked to each web page being updated and updating the corresponding business information displayed on each web page with the new business information.

24. The system in accordance with claim 23 wherein said client system further comprises at least one of:

a displaying component for displaying at least one of a pull-down list, a data field, a check box, and hypertext link options relating to said business information;

a sending component to send an inquiry to said server system so that said server system can process and download requested information to said client system;

a tracking component for tracking business information;

an accessing component for accessing said centralized database and causing requested information to be displayed on said client system;

a displaying component for displaying business information for at least one business group included in said business entity;

a receiving component for receiving business information including at least one of adding new business information, updating existing business information, and deleting existing business information;

a validating component for confirming the accuracy of the business information entered through said client system;

a collection component for collecting business information from users into said centralized database; and a processing component for updating said centralized database when new business information is received such that each web page within said business entity web site that displays business information displayed corresponding with the new business information is automatically updates to display the new business information.

25. The system in accordance with claim 23 wherein said server system further comprises a receiving component for receiving an inquiry to provide information from one of a plurality of users.

26. The system in accordance with claim 23 wherein said server system further comprises a tracking component that accomplishes at least one of:
  compiling a report that includes information relating to at least one of a product and service offered by the business entity including at least one of a type of financing, a use of proceeds, a type of industry, a location, a customer type, a contact person, and a product term;
  compiling a report that includes information relating to said business entity including at least one of source information, use of proceeds, industry, location, customer type, contacts, document links, types of financing, products, and business units;
  compiling a report that includes information relating to a contact person within each business group in said business entity including at least one of address and telephone number, biographies, and location; and
  compiling a report that includes information relating to at least one of said business entity's expertise, worldwide presence, recommended Internet links, frequently asked questions, and industries served.

27. The system in accordance with claim 23 wherein said server system further comprises a receiving component that receives business information from said client system regarding at least one of products and services, news, earnings releases, press releases, newsletters, papers, presentations, articles, perspectives, success stories, contact information, expertise, locations, recommended Internet links, frequently asked questions, and industries served by said business entity.

28. A network based system for managing, storing, and disseminating business information on a web site for a business entity, said system comprising:
  a client system comprising an external browser, an internal browser, and a content management tool;
  a centralized database for storing information connected to said content management tool;
  a server system comprising a staging site in communication with an administrative site, said server system configured such that said staging site and said administrative site communicate with said client system though said internal browser, and said administrative site communicates with said database, said server system further configured to:
  receive business information from said client system, said business information comprising products and services offered by the business entity along with at least one of news, earnings releases, press releases, newsletters, papers, presentations, articles, perspectives, success stories, contact information, expertise, locations, net links, frequently asked questions, and industries served by said business entity;
  store business information in said centralized database;
  display, on more than one web page within the business entity web site, data including at least a portion of the business information stored in the database;
  access the content management tool to display at least one pre-defined template on the client system for prompting a user to enter new business information including at least one of newly added business information, updated existing business information, and deleted existing business information;
  prompt the user to enter the new business information into the at least one pre-defined template displayed on the client system;
  utilize said content management tool to update said centralized database by storing the new business information therein;
  track the business information including the new business information stored in said database by:
    parsing the new business information into a plurality of data segments for storing within a plurality of corresponding sections included within said database;
    automatically storing the plurality of data segments within the plurality of corresponding sections of said database, and
    linking each of the plurality of data segments stored within said database with multiple locations displayed on multiple web pages included within the business entity web site; and
  automatically update each web page included within the business entity web site that displays business information corresponding with the new business information by accessing the plurality of data segments linked to each web page being updated and updating the corresponding business information displayed on each web page with the new business information.

29. The system in accordance with claim 28 wherein said content management tool comprises a data entry tool for adding, updating, and deleting business information stored in said database, said content management tool configured to:
  determine each web page included within the business entity web site that displays business information to be updated by the new business information; and
  automatically update each determined web page included within the business entity web site with the new business information including updating dynamic and re-purposed business information displayed on each respective web page within said business entity web site.

30. The system in accordance with claim 28 wherein said content management tool comprises a data entry tool for managing business information within said server system, said content management tool is stored on said client system and configured to communicate with said database.

31. The system in accordance with claim 30 wherein said content management tool is further configured to restrict communication with the Internet.

32. A database for storing information used on a web site for a business entity, said database comprising:
  a first receiving component for receiving information;
  a first storing component for storing information in said database;
  an accessing component for accessing a content management tool to display at least one pre-defined template on a client system for prompting a user to enter new information including at least one of newly added information, updated existing information, and deleted existing information;
  a second receiving component for receiving new information;
  a second storing component for storing new information in said database;
  a tracking component for tracking the information including the new information stored in said database by:
    parsing the new information into a plurality of data segments for storing within a plurality of corresponding sections included within said database, automatically storing the plurality of data segments within the plurality of corresponding sections of said database, and linking each of the plurality of data segments stored within said database with multiple locations displayed on multiple web pages included within the business entity web site; and an updating component for automatically updating each web page included within the business entity web site that displays information corresponding with the new information by accessing the plurality of data segments linked to each web page being updated and updating the corresponding information displayed on each web page with the new information.

33. The database in accordance with claim 32 wherein said first receiving component receives business information from said client system comprising at least one of products and services, news, earnings releases, press releases, newsletters, papers, presentations, articles, perspectives, success stories, contact information, expertise, locations, recommended Internet links, frequently asked questions, and industries served by said business entity.

34. The database in accordance with claim 32 wherein said first receiving component receives business information inputted through a word processing computer program on said client system.

35. The database in accordance with claim 32 wherein said database further comprises a validating component for confirming the accuracy of said business information entered through said client system.

36. The database in accordance with claim 32 wherein said database is configured to:

receive new information at the server system entered through said client system;

validate said new information; and change said existing information stored in said database with said new information such that at least one of dynamic and re-purposed information displayed on more than one web page within said business entity web site is changed on each respective web page configured to display said information.

37. A computer program embodied on a computer readable medium for managing business information on a web site for a business entity, said program comprising a code segment that receives business information and then:

maintains a database by adding, deleting and updating said business information;

provides users with access to said business information;

displays, on more than one web page within the business entity web site, data including at least a portion of the business information stored in the database;

accesses a content management tool to display at least one pre-defined template on a client system for prompting a user to enter new business information including at least one of newly added business information, updated existing business information, and deleted existing business information;

receives new business information through said client system, said business information including at least one of products and services offered by the business entity along with news, earnings releases, press releases, newsletters, papers, presentations, articles, perspectives, success stories, contact information, expertise, locations, net links, frequently asked questions, and industries sewed by the business entity;

validates new business information received through said client system;

stores said new business information in said centralized database;

tracks the business information including the new business information stored in said database by:

parsing the new business information into a plurality of data segments for storing within a plurality of corresponding sections included within said database, automatically storing the plurality of data segments within the plurality of corresponding sections of said database, and linking each of the plurality of data segments stored within said database with multiple locations displayed on multiple web pages included within the business entity web site; and automatically updates each web page included within the business entity web site that displays business information corresponding with the new business information by accessing the plurality of data segments linked to each web page being updated and updating the corresponding business information displayed on each web page with the new business information.

38. The computer program in accordance with claim 37 further comprising a code segment that updates each web page within said business entity web site after said business information is entered through a single web page on said client system.

39. The computer program in accordance with claim 37 further comprising a code segment that updates at least one of dynamic and re-purposed information within said business entity web site after said business information is entered into said server system through said client system.

40. The computer program in accordance with claim 37 further comprising:

a code segment that accesses said database;

a code segment that searches said database in response to an inquiry;

a code segment that retrieves information from said database;

a code segment that causes retrieved information to be displayed on a client system;

a code segment that receives business information at said server system through said client system;

a code segment that validates said business information entered into said server system; and a code segment that updates duplicative information displayed on more than one web page within said business entity web site with validated business information.

41. The computer program in accordance with claim 37 further comprising a code segment that monitors the security of the system by restricting access to authorized individuals.

* * * * *